(12) United States Patent
Mostofi et al.

(10) Patent No.: US 12,054,664 B2
(45) Date of Patent: Aug. 6, 2024

(54) DRILLING FLUIDS AND USES THEREOF

(71) Applicant: MINEX CRC LTD, Kensington (AU)

(72) Inventors: Masood Mostofi, Como (AU); Frank Samani, Ardross (AU); Yiwen Wang, Parkwood (AU)

(73) Assignee: MINEX CRC LTD, Kensington (AU)

( * ) Notice: Subject to any disclaimer, the term of this patent is extended or adjusted under 35 U.S.C. 154(b) by 0 days.

(21) Appl. No.: 17/056,437

(22) PCT Filed: May 20, 2019

(86) PCT No.: PCT/AU2019/050486
§ 371 (c)(1),
(2) Date: Nov. 18, 2020

(87) PCT Pub. No.: WO2019/222795
PCT Pub. Date: Nov. 28, 2019

(65) Prior Publication Data
US 2022/0162493 A1    May 26, 2022

(30) Foreign Application Priority Data
May 21, 2018  (AU) ................... 2018901763

(51) Int. Cl.
*C09K 8/035* (2006.01)
*C09K 8/03* (2006.01)
*E21B 21/00* (2006.01)

(52) U.S. Cl.
CPC ............ *C09K 8/035* (2013.01); *C09K 8/032* (2013.01); *E21B 21/003* (2013.01); *C09K 2208/08* (2013.01)

(58) Field of Classification Search
CPC ............ C09K 8/035; C09K 8/08; C09K 8/10; C09K 8/02; C09K 8/508; C09K 8/514
See application file for complete search history.

(56) References Cited

U.S. PATENT DOCUMENTS 3,738,437 A * 6/1973 Scheuerman ............ C09K 8/24
507/120
5,076,373 A   12/1991 Hale et al.
(Continued)

FOREIGN PATENT DOCUMENTS

| CN | 104610943 A | 5/2015 |
| CN | 105018051 A | 11/2015 |
| EP | 0634468 A1 | 1/1995 |

OTHER PUBLICATIONS

Extended European Search Report issued to European Application No. 19806779.5, dated Dec. 21, 2021.
(Continued)

*Primary Examiner* — Aiqun Li
(74) *Attorney, Agent, or Firm* — MARSHALL, GERSTEIN & BORUN LLP; Michael P. Furmanek

(57) ABSTRACT

The present invention relates to drilling fluids which reduce fluid and cutting loss during the drilling of subterranean wells. More specifically, the drilling fluids disclosed herein comprise natural and synthetic polymer blends that are effective to provide the fluid with a high viscosity under low shear rates and a low viscosity under high shear rates. The present invention also relates to methods for using the drilling fluids for reducing fluid and cutting loss during drilling.

10 Claims, 20 Drawing Sheets

(56) References Cited

U.S. PATENT DOCUMENTS

| | | | |
|---|---|---|---|
| 2005/0187113 A1* | 8/2005 | Hayes | C09K 8/03 507/119 |
| 2011/0036579 A1 | 2/2011 | Xiang et al. | |
| 2012/0247763 A1 | 10/2012 | Rakitsky et al. | |
| 2013/0203636 A1 | 8/2013 | Xiang et al. | |
| 2017/0218250 A1 | 8/2017 | Boul et al. | |
| 2019/0136111 A1 | 5/2019 | Hutchings et al. | |

OTHER PUBLICATIONS

Office Action for Application No. 202003000 issued to Chile, Instituto Nacional de Propiedad Industrial, dated Aug. 3, 2021.
International Preliminary Report on Patentability dated Apr. 30, 2020.
International Search Report and Written Opinion for International Application No. PCT/AU2019/050486, dated Jul. 31, 2019.
Li, Ming, et al., "*Research on the influence of polyanionic cellulose on the microstructure and properties of oil well cement*", Construction and Building Materials 259 (2020) 119841, https://doi.org/10.1016/j.conbuildmat.2020.119841, Jun. 2020.
First Office Action for Application No. 201980034657.0 issued to China, dated Jul. 11, 2022.
American Petroleum Institute, "Specification for Drilling Fluids Materials" Specification 13A, Eighteenth Edition, Feb. 2010.

\* cited by examiner

DRILLING FLUIDS AND USES THEREOF

PRIORITY CLAIM

This is the US national phase of International Patent Application No. PCT/AU2019/050486, filed May 20, 2019, which claims priority to Australian provisional patent application number 2018901763, filed May 21, 2018, the entire contents of each of which are hereby incorporated herein by reference.

FIELD OF THE INVENTION

The present invention relates generally to drilling fluids which reduce fluid and cutting loss during the drilling of subterranean wells. More specifically, the drilling fluids disclosed herein comprise natural and synthetic polymer blends that are effective to provide the fluid with a high viscosity under low shear rates and a low viscosity under high shear rates.

BACKGROUND OF THE INVENTION

Mineral exploration and extraction require the drilling of subterranean wells, also referred to as boreholes, from the surface of land under investigation. This is typically achieved through the use of rotating drill strings (being a series of attached, rigid, pipe sections) with drill bits attached at one end to drill into the earth. As a rotating drill bit drills into the earth to form a borehole, additional pipe sections are added in order to drill deeper, while the opposite occurs as the drill bit is withdrawn from the borehole. Alternative drilling techniques rely on coiled tubing instead of drill strings, wherein the coiled tubing is generally of a ductile metal available in virtually unlimited lengths. In most coiled tubing drilling, a bottom hole assembly (BHA) located at the bottom of the tubing typically includes a mud motor that powers and rotates a drill bit (given that the coiled tubing does not itself rotate), the mud motor being powered by the motion of drilling fluid pumped from the surface. In other forms of coiled tubing drilling, above-ground apparatus have been developed to allow for the rotation of the coiled tubing about its longitudinal axis.

Regardless of the technique employed, a drilling fluid (or mud) is used to facilitate the drilling operation. Drilling fluids are specially designed fluids that are circulated through a well as the borehole is being drilled. Drilling fluids serve a number of functions, including but not limited to promoting borehole stability, cooling and lubricating the drill bit and the drill string, assisting in the removal of drill cuttings from the well, aiding in support of the drill pipe and drill bit, transmitting hydraulic horsepower to a drilling motor, and stabilising and minimising fluid loss into a formation through which a well is being drilled.

An important property of the drilling fluid is its rheology, and specific rheological parameters are intended for drilling and circulating the fluid through the well. The fluid should be sufficiently viscous to suspend drilled cuttings and to carry the cuttings to the well surface. However, the fluid should not be so viscous as to interfere with the drilling operation.

A common problem in drilling operations in mineral exploration, and petroleum and geothermal drilling, is the loss of valuable drilling fluids and drill cuttings. For example, cuttings that encapsulate information about the mineralogy of the extracted rock can be lost into unconsolidated or fractured formations. Drilling fluid can also be lost into fractures induced by excessive mud pressure, pre-existing open porosity/fractures, or large caverns in the formation. Indeed, fluid loss is a drilling challenge that can result in increases in tool wear, decreases in drilling rate, and can trigger borehole instability eventually leading to the complete loss of the well.

The conventional approach to control fluid and cutting loss is to use lost circulation materials to provide a physical barrier between the borehole and the permeable formations. Lost circulation materials such as graded calcium carbonates, fibres and nutshells can be added to the drilling fluid, which decrease the permeability and conductivity of the loss zone, and therefore results in fluid loss control. However, downhole motors typically used in drilling operations are often sensitive to, and therefore can be damaged by, the presence of solid particles in the drilling fluid. Furthermore, solid bridging agents may plug pore throats in the reservoir rock. Finally, the effectiveness of existing drilling fluids is far from ideal with respect to fluid and cutting loss control during drilling.

Accordingly, there is a need for the formulation of borehole drilling fluids which have desired rheology and fluid and cutting loss control properties, including without the need to use solid bridging reagents.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY OF THE INVENTION

The present invention is predicated, in part, on the surprising finding that a drilling fluid comprising particular combinations of natural and synthetic polymers is capable of imparting superior fluid and cutting loss control during borehole drilling when compared to a polymer drilling fluid comprising the individual polymers or components in isolation, or compared to existing drilling fluids. The inventors have found that the borehole drilling fluid of the present invention has a unique shear thinning property. It exhibits a low viscosity when exposed to high shear rates, for example when it drives downhole motors and carries the cuttings in an annulus. However, the viscosity of the drilling fluid increases significantly as the fluid penetrates into fractured and unconsolidated formations, where the fluid is under orders of magnitude smaller shear rates. The increase in viscosity results in an ability of the drilling fluid to block the loss zone and improve drilling fluid and cuttings recovery.

Accordingly, in a first aspect, the present invention provides a borehole drilling fluid comprising:
(i) xanthan gum;
(ii) low molecular weight partially-hydrolysed polyacrylamide (PHPA); and
(iii) low viscosity polyanionic cellulose (Pac-LV).

In a second aspect the present invention provides a method of reducing borehole drilling fluid loss and cutting loss during borehole drilling, the method comprising conducting the borehole drilling using a borehole drilling fluid comprising:
(i) xanthan gum;
(ii) low molecular weight partially-hydrolysed polyacrylamide (PHPA); and
(iii) low viscosity polyanionic cellulose (Pac-LV).

In some embodiments the drilling fluid exhibits an increase in viscosity under low shear rates. In some embodiments, when the shear rate of the drilling fluid is less than about 0.01 1/s, the viscosity of the drilling fluid is about 10000 cp or higher as measured at about 23° C. to about 25° C. In some embodiments, when the shear rate of the drilling fluid is about 0.01 1/s, the viscosity of the drilling fluid is about 6,100 cp or higher as measured at about 23° C. to about 25° C.

In some embodiments the drilling fluid exhibits a decrease in viscosity under high shear rates. In some embodiments, when the shear rate of the drilling fluid is about 1000 1/s or more, the viscosity of the drilling fluid is about 12 cp or lower as measured at about 23° C. to about 25° C.

In some embodiments the drilling fluid comprises about 0.1% to about 0.5% w/w xanthan gum, about 0.02% to about 0.1% w/w PHPA, and about 0.02% to about 0.1% w/w Pac-LV. In some embodiments the drilling fluid comprises about 0.18% w/w xanthan gum, about 0.05% w/w PHPA, and about 0.02% w/w Pac-LV.

In some embodiments the drilling fluid further comprises guar gum. In some embodiments, the drilling fluid comprises up to about 0.1% w/w guar gum. In some embodiments, the drilling fluid comprises about 0.02% w/w guar gum. In some embodiments the drilling fluid comprises about 0.18% w/w xanthan gum, about 0.05% w/w PHPA, about 0.02% w/w Pac-LV, and about 0.02% guar gum.

In some embodiments the drilling fluid further comprises regular viscosity polyanionic cellulose (Pac-RV). In some embodiments, the drilling fluid comprises up to about 0.1% w/w Pac-RV. In some embodiments, the drilling fluid comprises about 0.01% w/w Pac-RV. In some embodiments, the drilling fluid comprises about 0.18% w/w xanthan gum, about 0.05% w/w PHPA, about 0.02% w/w Pac-LV, about 0.02% w/w guar gum, and about 0.01% w/w Pac-RV.

In some embodiments the drilling fluid further comprises potassium chloride. In some embodiments, the drilling fluid comprises up to about 8.0% w/w potassium chloride. In some embodiments, the drilling fluid comprises about 4% potassium chloride. In some embodiments, the drilling fluid comprises about 0.18% w/w xanthan gum, about 0.05% w/w PHPA, about 0.02% w/w Pac-LV, about 0.02% w/w guar gum, about 0.01% w/w Pac-RV, and about 4.0% w/w potassium chloride.

In some embodiments the drilling fluid is substantially free of solid particles.

In some embodiments, the borehole drilling fluid of the aforementioned aspects of the present invention can comprise solid particles for use in particular applications, such as when encountering significant fractures during drilling. In this regard, solid bridging agents can be added to the drilling fluid to control fluid and cutting loss.

Accordingly, in some embodiments the drilling fluid comprises bentonite. In some embodiments, the drilling fluid comprises about 0.01% to about 2.0% w/w bentonite. In some embodiments, the drilling fluid comprises about 1.2% w/w bentonite. In some embodiments, the drilling fluid comprises about 0.3% w/w xanthan gum, about 0.05% w/w PHPA, about 0.02% w/w Pac-LV, and about 1.2% bentonite.

In some embodiments, the drilling fluid further comprises fibre. In some embodiments, the drilling fluid comprises up to about 5.0% w/w fibre. In some embodiments, the drilling fluid comprises about 4.8% w/w fibre.

In some embodiments, the drilling fluid comprises about 0.3% w/w xanthan gum, about 0.05% w/w PHPA, about 0.02% w/w Pac-LV, about 0.02% w/w guar gum, about 0.01% w/w Pac-RV, about 1.2% w/w bentonite, and about 4.8% w/w fibre.

In some embodiments, the drilling fluid further comprises graphite. In some embodiments, the drilling fluid comprises about 1.0% to about 10% w/w graphite. In some embodiments, the drilling fluid comprises about 6.0% w/w graphite. In some embodiments, the drilling fluid comprises about 0.3% w/w xanthan gum, about 0.05% w/w PHPA, about 0.05% w/w Pac-LV, about 0.02% w/w guar gum, about 1.2% bentonite, and about 6.0% w/w graphite.

BRIEF DESCRIPTION OF THE FIGURES

For a further understanding of the aspects and advantages of the present invention, reference should be made to the following detailed description, taken in conjunction with the accompanying figures which illustrate certain embodiments of the present invention.

FIG. 3A pulls data from FIG. 2A in the moderate shear rate range (0 to 200 1/s). FIG. 3B shows the variation in shear stress placed on the fluid over this moderate range of shear rates over time.

FIG. 4A pulls data from FIG. 2A in the low shear rate range (0 to 0.1 1/s). FIG. 4B shows the variation in shear stress placed on the fluid over this low range of shear rates over time.

DETAILED DESCRIPTION OF THE INVENTION

Figure 1:
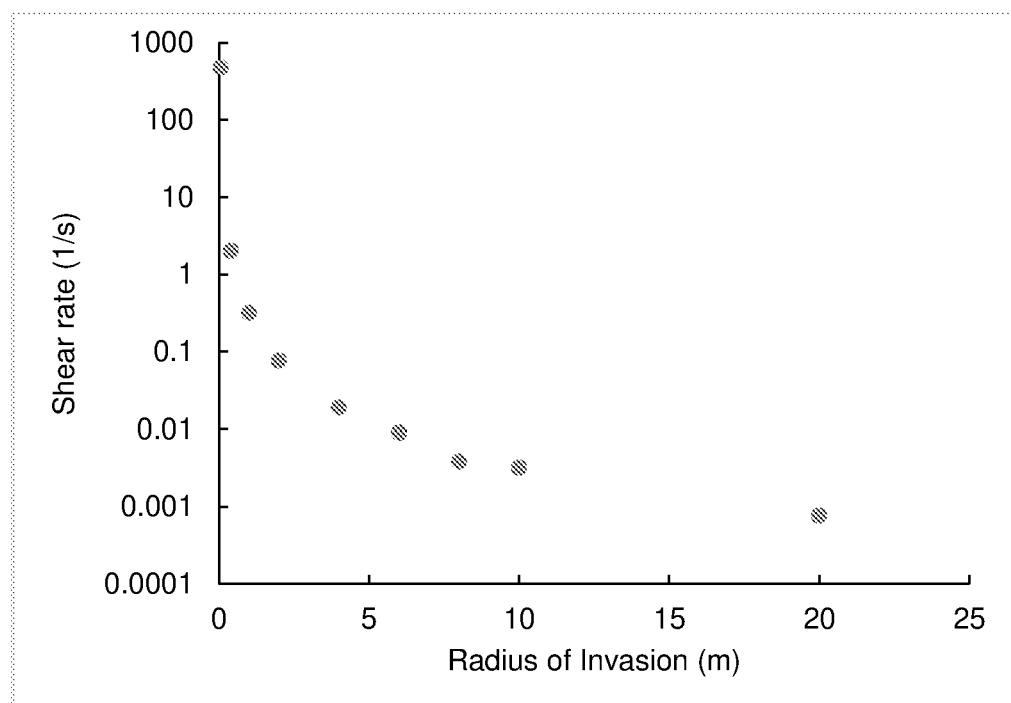
FIG. 1—is a graph showing the variation of drilling fluid shear rate on fracture walls away from a borehole when the fluid loss is 100 litres/minute passing through a 1 mm aperture fracture. The estimations are for a fluid with a power index of 0.6.

The inventors have determined that drilling fluid and cutting loss during borehole drilling can be controlled by increasing the pressure drop of drilling fluid flowing into fractures and unconsolidated ground. This can be achieved by extending the non-Newtonian behaviour of the drilling fluid, where the fluid exhibits a high viscosity under low shear rates and a low viscosity at high shear rates. Particular drilling fluid formulations/compositions have been identified by the inventor, which fulfil these properties.

Accordingly, certain disclosed embodiments provide compositions, methods, products, and uses thereof that have one or more advantages. For example, some of the advantages of some embodiments disclosed herein include one or more of the following: new drilling fluid compositions for borehole drilling; drilling fluid compositions that improve the control of fluid and cutting loss during borehole drilling; drilling fluid compositions that are substantially free of solid particles and which are compatible with downhole motors used in drilling operations; new methods for borehole drilling which make use of the drilling fluid compositions described herein; new methods for reducing fluid and cutting loss during borehole drilling; or the provision of a commercial alternative to existing drilling fluids and methods. Other advantages of some embodiments of the present disclosure are provided herein.

In one embodiment, the present invention provides a borehole drilling fluid comprising the following polymer components:
  (i) xanthan gum;
  (ii) low molecular weight partially-hydrolysed polyacrylamide (PHPA); and
  (iii) low viscosity polyanionic cellulose (Pac-LV).

As used herein, the term "borehole" (and like terms such a "well" and "wellbore") refers to a hole drilled into, or penetrating, the earth. This may include a hole drilled on land or on a seabed. A borehole includes any cased or uncased portions of the drilled well or any other tubulars in the drilled well. A borehole can have portions that are vertical, horizontal, or anything in between, and it can have portions that are straight, curved, or branched.

Xanthan gum (CAS Registry Number 111-38-66-2) is an extracellular polymer produced by Gram negative bacteria of the genus *Xanthomonas*. Being a branched polysaccharide, it has a backbone of cellobiose as the repeating unit and side-chains consisting of a trisaccharide composed of D-mannose ($\beta$-1,4), D-glucuronic acid ($\beta$-1,2) and D-mannose, which are attached to alternate glucose residues in the backbone by $\alpha$-1,3 linkages. The average composition of xanthan chains depends on the *Xanthomonas* pathovar used and fermentation conditions. Typical *Xanthomonas* pathovars used to produce xanthan gum include *X. arboricola, X. axonopodis, X. campestris, X. citri, X. fragaria, X. gummisudans, X. juglandis, X. phaseoli, X. vasculorium*. However, *Xanthomonas campestris* is the most common pathovar employed for industrial production of xanthan gum.

The effect of production parameters, such as type of bioreactor, continuous or batch operation, type and concentration of nutrients in the growth medium, optimum pH and temperature of growth medium and oxygen transfer rate, on the fermentation yield and xanthan molecular characteristics are well reported and well known to those skilled in the art.

As indicated above, the industrial production of xanthan is mainly based on the fermentation of glucose using *X. campestris*. After the fermentation process the broth is pasteurized to eliminate microorganisms, xanthan is precipitated in alcohol, spray-dried, or re-suspended in water and precipitated. However, xanthan gum is readily commercially available and can be obtained from sources such as general glossary shops, pharmaceutical companies, and drilling fluid manufacturers/distributors such as the Australian Mud Company (Balcatta, Western Australia, Australia), Baker Hughes (Houston, Tex., USA), M-I Swaco (USA), etc.

Xanthan gum is also known as Actigum CX 9, ADM 40, AMC XAN BORE, B 1459, Biopolymer 9702, Biopolymer XB 23, Biozan R, Bisfect XA 200, Bistop, Ceroga, Chemicogel, Dehydroxanthan gum, Duovis, E 415, Echogum, Echogum 630, Echogum F, Echogum GM, Echogum RD, Echogum SF, Echogum T, Eco-Gum, Eco-Gum F, Ekogum ketorol, Enorflo X, Flocon 1035, Flocon 4800, Flocon 4800C, Flodrill S, Galaxy XB, goma Xantham, Gomme xanthane, GUM, XANTHAN, Gumixan K, Gums, xanthomonas, Idvis, Inagel V 10, Inagel V 10K, Inagel V 7T, Jungbunzlauer ST, K 5C151, K 9C57, Kelco BT, Kelco CGT, Keldent, Kelflo, KELTROL, Keltrol 1000, Keltrol 630, Keltrol ASXT, Keltrol BT, Keltrol CG, Keltrol CGSFT, Keltrol CGT, Keltrol F, Keltrol HP, Keltrol K 5C151, Keltrol RD, Keltrol SF, Keltrol T, Keltrol TF, Keltrol TF 1000, Kelzan, Kelzan 140X, Kelzan AR, Kelzan ASX, Kelzan ASXT, Kelzan D, Kelzan F, Kelzan HP, Kelzan M, Kelzan MF, Kelzan RD, Kelzan S, Kelzan SS 4000, Kelzan ST, Kelzan T, Kelzan XC, Kelzan XCD, Kelzan XG, Kelzan ZN 4471116, Kem-Kh, Monad Gum DA, Monat Gum DA, Monat Gum GS, Monategum GS, Neosoft XC, Neosoft XKK, Neosoft XO, Nomcort Z, Nomcort ZZ, Novaxan 200, N-VIS, OptiXan D, Orno X, PH Rapid, Polysaccharide B 1459, Polysaccharide gum, Rheoflow CD 1, Rheoflow CD 4, Rheogel, Rhodicare S, Rhodicare T, Rhodigel, Rhodigel 200, Rhodigel 23, Rhodigel 80, Rhodigel Clear, Rhodigel Ultra, Rhodoflood XR 75, Rhodopol 23, Rhodopol 23P, Rhodopol 23U, Rhodopol 50MD, Rhodopol R 23, Rhodopol T, Rhodopol XGD, Saboksan, San Ace, San Ace BS, San Ace C, San Ace E-S, San Ace NXG-C, San Ace NXG-S, Saraksan, Saraksan T, Satiaxane CX 90, Satiaxane CX 90T, Satiaxane CX 910, Satiaxane CX 911, Shellflo XA, SHELL-FLO XA 140, Soaxan, Soaxan XG 550, Statoil XC 44F4, TGCS, Ultra Xanthan, Ultra Xanthan V 7, Vanzan, Vanzan NF, VIS TOP D 3000, VIS TOP D 3000C, VIS TOP D 3000DF-C, VS 900, VT 819, WT 5100, Xanbore, Xanflood, Xantham gum, Xanthan, Xanthan biopolymer, Xanthan Gum 614, Xanthan Gum ST, Xanthan Gummi, Xanthane gum, Xanthomonas gum, Xanthural 75, Xantural 180, Xantural 75, Xanvis, XB 23, XC 8511-F4, XCD, XG 550, and X-VIS.

In some embodiments, the amount of xanthan gum present in the borehole drilling fluid of the present invention may be in the range of about 0.1% to about 0.5% by weight (w/w) of the drilling fluid, encompassing any value and range therebetween. For example, the xanthan gum may be present in a range of about 0.1% to 0.48%, 0.1% to 0.46%, 0.1% to 0.44%, 0.1% to 0.42%, 0.1% to 0.4%, 0.1% to 0.38%, 0.1% to 0.36%, 0.1% to 0.34%, 0.1% to 0.32%, 0.1% to 0.3%, 0.1% to 0.28%, 0.1% to 0.26%, 0.1% to 0.24%, 0.1% to 0.22%, 0.1% to 0.2%, 0.1% to 0.18%, 0.1% to 0.16%, 0.1% to 0.14%, 0.1% to 0.12%, 0.12% to 0.5%, 0.12% to 0.48%, 0.12% to 0.46%, 0.12% to 0.44%, 0.12% to 0.42%, 0.12% to 0.4%, 0.12% to 0.38%, 0.12% to 0.36%, 0.12% to 0.34%, 0.12% to 0.32%, 0.12% to 0.3%, 0.12% to 0.28%, 0.12% to 0.26%, 0.12% to 0.24%, 0.12% to 0.22%, 0.12% to 0.2%, 0.12% to 0.18%, 0.12% to 0.16%, 0.12% to 0.14%, 0.14% to 0.5%, 0.14% to 0.48%, 0.14% to 0.46%, 0.14% to 0.44%, 0.14% to 0.42%, 0.14% to 0.4%, 0.14% to 0.38%, 0.14% to 0.36%, 0.14% to 0.34%, 0.14% to 0.32%, 0.14% to 0.3%, 0.14% to 0.28%, 0.14% to 0.26%, 0.14% to 0.24%, 0.14% to 0.22%, 0.14% to 0.2%, 0.14% to 0.18%, 0.14% to 0.16%, 0.16% to 0.5%, 0.16% to 0.48%, 0.16% to 0.46%, 0.16% to 0.44%, 0.16% to 0.42%, 0.16% to 0.4%, 0.16% to 0.38%, 0.16% to 0.36%, 0.16% to 0.34%, 0.16% to 0.32%, 0.16% to 0.3%, 0.16% to 0.28%, 0.16% to 0.26%, 0.16% to 0.24%, 0.16% to 0.22%, 0.16% to 0.2%, 0.16% to 0.18%, 0.18% to 0.5%, 0.18% to 0.48%, 0.18% to 0.46%, 0.18% to 0.44%, 0.18% to 0.42%, 0.18% to 0.4%, 0.18% to 0.38%, 0.18% to 0.36%, 0.18% to 0.34%, 0.18% to 0.32%, 0.18% to 0.3%, 0.18% to 0.28%, 0.18% to 0.26%, 0.18% to 0.24%, 0.18% to 0.22%, 0.18% to 0.2%, 0.2% to 0.5%, 0.2% to 0.48%, 0.2% to 0.46%, 0.2% to 0.44%, 0.2% to 0.42%, 0.2% to 0.4%, 0.2% to 0.38%, 0.2% to 0.36%, 0.2% to 0.34%, 0.2% to 0.32%, 0.2% to 0.3%, 0.2% to 0.28%, 0.2% to 0.26%, 0.2% to 0.24%, 0.2% to 0.22%, 0.22% to 0.5%, 0.22% to 0.48%, 0.22% to 0.46%, 0.22% to 0.44%, 0.22% to 0.42%, 0.22% to 0.4%, 0.22% to 0.38%, 0.22% to 0.36%, 0.22% to 0.34%, 0.22% to 0.32%, 0.22% to 0.5%, 0.22% to 0.48%, 0.22% to 0.46%, 0.22% to 0.44%, 0.22% to 0.042%, 0.22% to 0.4%, 0.22% to 0.38%, 0.22% to 0.36%, 0.22% to 0.34%, 0.22% to 0.32%, 0.22% to 0.3%, 0.22% to 0.28%, 0.22% to 0.26%, 0.22% to 0.24%, 0.24% to 0.5%, 0.24% to 0.48%, 0.24% to 0.46%, 0.24% to 0.44%, 0.24% to 0.42%, 0.24% to 0.4%, 0.24% to 0.38%, 0.24% to 0.36%, 0.24% to 0.34%, 0.24% to 0.32%, 0.24% to 0.3%, 0.24% to 0.28%, 0.24% to 0.26%, 0.26% to 0.5%, 0.26% to 0.48%, 0.26% to 0.46%, 0.26% to 0.44%, 0.26% to 0.42%, 0.26% to 0.4%, 0.26% to 0.38%, 0.26% to 0.36%, 0.26% to 0.34%, 0.26% to 0.32%, 0.26% to 0.3%, 0.26% to 0.28%, 0.28% to 0.5%, 0.28% to 0.48%, 0.28% to 0.46%, 0.28% to 0.44%, 0.28% to 0.42%, 0.28% to 0.4%, 0.28% to 0.38%, 0.28% to 0.36%, 0.28% to 0.34%, 0.28% to 0.32%, 0.28% to 0.3%, 0.3% to 0.5%, 0.3% to 0.48%, 0.3% to 0.46%, 0.3% to 0.44%, 0.3% to 0.42%, 0.3% to 0.4%, 0.3% to 0.38%, 0.3% to 0.36%, 0.3% to 0.34%, 0.3% to 0.32%, 0.32% to 0.5%, 0.32% to 0.48%, 0.32% to 0.46%, 0.32% to 0.44%, 0.32% to 0.42%, 0.32% to 0.4%, 0.32% to 0.38%, 0.32% to 0.36%, 0.32% to 0.34%, 0.34% to 0.5%, 0.34% to 0.48%, 0.34% to 0.46%, 0.34% to 0.44%, 0.34% to 0.42%, 0.34% to 0.4%, 0.34% to 0.38%, 0.34% to 0.36%, 0.36% to 0.5%, 0.36% to 0.48%, 0.36% to 0.46%, 0.36% to 0.44%, 0.36% to 0.42%, 0.36% to 0.4%, 0.36% to 0.38%, 0.38% to 0.5%, 0.38% to 0.48%, 0.38% to 0.46%, 0.38% to 0.44%, 0.38% to 0.42%, 0.38% to 0.4%, 0.4% to 0.5%, 0.4% to 0.48%, 0.4% to 0.46%, 0.4% to 0.44%, 0.4% to 0.42%, 0.42% to 0.5%, 0.42% to 0.48%, 0.42% to 0.46%, 0.42% to 0.44%, 0.44% to 0.5%, 0.44% to 0.48%, 0.44% to 0.46%, 0.46% to 0.5%, 0.46% to 0.48%, and 0.48% to 0.5%, by w/w of the drilling fluid.

In some embodiments, the xanthan gum is present in an amount of up to about 0.18% w/w of the drilling fluid. In some embodiments, the xanthan gum is present in an amount of about 0.18% w/w of the drilling fluid. However, it would be appreciated by a person skilled in the art that higher concentrations of xanthan gum (for example up to about 0.5% (w/w)) can be used at elevated temperatures such as those observed at drilling depths beyond 500 metres.

As indicated above, low molecular weight partially-hydrolysed polyacrylamide is another polymer component of the borehole drilling fluid of the present invention. Partially-hydrolysed polyacrylamide (also known as "PHPA") is a synthetic polymer and can comprise polymers formed by polymerizing and subsequently hydrolyzing acrylamide (or a lower homolog of acrylamide) or copolymerizing acrylamide with an acrylate, or the like. Such synthesis techniques are well known to a person skilled in the art. When polyacrylamide is manufactured commercially, it normally contains 1 to 2 mole percent hydrolyzed (carboxylate) content that is inadvertently imparted during the manufacturing process. Indeed, polyacrylamide is normally not referred to as PHPA until the carboxylate content exceeds approximately 2 mole percent.

In some embodiments, the hydrolysis percentage of the PHPA (and/or the proportion of the amide groups of the polyacrylamide that are carboxyl groups or have been hydrolyzed to form carboxyl groups) may be in the range of a lower limit of about 5.0%, 7.5%, 10%, 12.5%, 15%, 17.5%, 20%, 22.5%, and 25% to an upper limit of about 50%, 47.5%, 45%, 42.5%, 40%, 37.5%, 35%, 32.5%, 30%, 27.5%, and 25%, encompassing any value and subset therebetween. For example, in some embodiments, the hydrolysis percentage of the PHPA may be in the range of from about 20% to about 40%, encompassing any value and subset therebetween.

The molecular weight of the PHPA may be in the range of a lower limit of about 10000 Da, 100000 Da, 1000000 Da, 2000000 Da, 3000000 Da, 4000000 Da, 5000000 Da, 6000000 Da, 7000000 Da, 8000000 Da, 9000000 Da, and 10000000 Da to an upper limit of about 22000000 Da, 21000000 Da, 20000000 Da, 19000000 Da, 18000000 Da, 17000000 Da, 16000000 Da, 15000000 Da, 14000000 Da, 13000000 Da, 12000000 Da, 11000000 Da, and 10000000 Da, encompassing any value and subset therebetween. For example, in some embodiments, the molecular weight of the PHPA may be in the range of from about 5000000 Da to about 22000000 Da, encompassing any value and subset therebetween.

The PHPA to be used in the drilling fluid of the present invention may be in either an acid form or a salt form. In some embodiments, the PHPA is in a salt form, preferably a sodium salt form.

Examples of such PHPA polymers that are commercially available include polymer distributors such as SNF Floerger (France), BASF (Houston, Tex., USA), and also various drilling fluid suppliers such as Xinhai (China) and Beijing Hengju Chemical Group Corporation (China).

In some embodiments, the amount of PHPA present in the borehole drilling fluid of the present invention may be in the range of about 0.02% to about 0.1% by weight (w/w) of the drilling fluid, encompassing any value and range therebetween. For example, the PHPA may be present in a range of about 0.02% to 0.09%, 0.02% to 0.08%, 0.02% to 0.07%, 0.02% to 0.06%, 0.02% to 0.05%, 0.02% to 0.04%, 0.02% to 0.03%, 0.03% to 0.1%, 0.03% to 0.09%, 0.03% to 0.08%, 0.03% to 0.07%, 0.03% to 0.06%, 0.03% to 0.05%, 0.03% to 0.04%, 0.04% to 0.1%, 0.04% to 0.09%, 0.04% to 0.08%, 0.04% to 0.07%, 0.04% to 0.06%, 0.04% to 0.05%, 0.05% to 0.1%, 0.05% to 0.09%, 0.05% to 0.08%, 0.05% to 0.07%, 0.05% to 0.06%, 0.06% to 0.1%, 0.06% to 0.09%, 0.06% to 0.08%, 0.06% to 0.07%, 0.07% to 0.1%, 0.07% to 0.09%, 0.07% to 0.08%, 0.08% to 0.1%, 0.08% to 0.09%, and 0.09% to 0.1% by w/w of the drilling fluid.

In some embodiments, the PHPA is present in an amount of up to about 0.05% w/w of the drilling fluid. In some embodiments, the PHPA is present in an amount of about 0.05% w/w of the drilling fluid. However, it would be appreciated by a person skilled in the art that concentrations of PHPA higher and lower than this (and falling in the range of about 0.02% to about 0.1% w/w of the drilling fluid) may be used.

Low viscosity polyanionic cellulose (herein referred to as "Pac-LV") is another polymer component of the borehole drilling fluid of the present invention. Polyanionic cellulose (PAC) is a water-soluble cellulose ether derivative made from natural cellulose by chemical modification. PAC is a white powder, is non-toxic, odorless, and is soluble in water to form a viscous solution. PAC belongs to the polymer anionic electrolytes, and is typically obtained from the isopropyl alcohol solution of alkali cellulose and chloroacetic acid by an etherification reaction. The raw materials for the production of PAC are similar to those for the production of carboxymethyl cellulose, but in the production process, different degradation methods are employed so that substitution of the hydroxyl group in the ring structure of the β-glucose group is more uniform.

Pac-LV is also known as Pac-L and can be purchased from various drilling fluid suppliers such as the Australian Mud Company (Balcatta, Western Australia, Australia), Baker Hughes (Houston, Tex., USA), Sidley Chemical (LinYi City, China), Global Drilling Fluids and Chemicals Ltd (Delhi, India) and Mud Logic (Australia).

In some embodiments, the amount of Pac-LV present in the borehole drilling fluid of the present invention may be in the range of about 0.02% to about 0.1% by weight (w/w) of the drilling fluid, encompassing any value and range therebetween. For example, the Pac-LV may be present in a range of about 0.02% to 0.09%, 0.02% to 0.08%, 0.02% to 0.07%, 0.02% to 0.06%, 0.02% to 0.05%, 0.02% to 0.04%, 0.02% to 0.03%, 0.03% to 0.1%, 0.03% to 0.09%, 0.03% to 0.08%, 0.03% to 0.07%, 0.03% to 0.06%, 0.03% to 0.05%, 0.03% to 0.04%, 0.04% to 0.1%, 0.04% to 0.09%, 0.04% to 0.08%, 0.04% to 0.07%, 0.04% to 0.06%, 0.04% to 0.05%, 0.05% to 0.1%, 0.05% to 0.09%, 0.05% to 0.08%, 0.05% to 0.07%, 0.05% to 0.06%, 0.06% to 0.1%, 0.06% to 0.09%, 0.06% to 0.08%, 0.06% to 0.07%, 0.07% to 0.1%, 0.07% to 0.09%, 0.07% to 0.08%, 0.08% to 0.1%, 0.08% to 0.09%, and 0.09% to 0.1% by w/w of the drilling fluid.

In some embodiments, the Pac-LV is present in an amount of up to about 0.02% w/w of the drilling fluid. In some embodiments, the Pac-LV is present in an amount of about 0.02% w/w of the drilling fluid. However, it would be appreciated by a person skilled in the art that concentrations of Pac-Lv higher and lower than this (and falling in the range of about 0.02% to about 0.1% w/w of the drilling fluid) may be used.

In some embodiments of the present invention, the borehole drilling fluid comprises about 0.18% w/w xanthan gum, about 0.05% w/w PHPA, and about 0.02% w/w Pac-LV.

In some embodiments, the drilling fluid of the present invention further comprises guar gum. Guar gum (CAS Registry Number 9000-30-0) is a polysaccharide composed of the sugars galactose and mannose. The backbone of guar gum is a linear chain of β 1,4-linked mannose residues to which galactose residues are 1,6-linked at every second mannose, forming short side-branches.

Guar gum is made from guar beans which are principally grown in India, Pakistan, USA, Australia and Africa. The industrial production of guar gum typically uses roasting, differential attrition, sieving, and polishing processes. Guar seeds are separated from the plant and dried. Guar splits are soaked for prehydration, and then the soaked splits, which have reasonably high moisture content, are passed through a flaker. The flaked guar split is ground and then dried. Guar gum can also be purchased from a number of commercial suppliers such as health food shops and chemists, Agro Gums (India), Global Drilling Fluids and Chemicals Ltd (Delhi, India), and the Australian Mud Company (Balcatta, Western Australia, Australia).

Guar gum is also known as 1212A, Avicel CE 15, Burtonite V 7E, C 1000, C 1000 (gum), C 250, C 250 (gum), Celbond 7, Celca-Gum D 49D, CG 70, CP 3300, CSAA-M 80, CSA-M 175, Cyamopsis gum, Dealca TP 1, Dealca TP 2, Decorpa, Duck Gum 800, Dycol 4500, E 412, Edicol ULV 50, EGMB, Emcogum CSAA, Emulgum 200, Emulgum 200S, FFH 200, FG-HV, Fine Gum G, Fine Gum G 17, Frimulsion BM, G 50, Galactasol, Galactasol 20H5FI, Galactasol 211, Galactasol 270, Galactasol 30M1F, Galaxy 1083, Gendril Thik, Gendriv 162, goma guar, Gomme de guar, GR 10, Guapack PF 20, Guapack PN, Guar, Guar 5200, Guar flour, Guar gum (cyamopsis tetragonolobus), Guar Gummi, Guar HV 7000 CPS, Guar Supercol U Fine, Guar WW250F, Guaran, Guarcel 302, Guarcol U 40, Guargel D 15, Gum cyamopsis, Gum guar, GUM, GUAR, Gums, guar, GV 23/2, GW 4, GW 4AFG, Herbapeck SF 08, Higum 551, HYDROXYPROPYL GALACTOMANNAN ETHER, Inagel GR 10, Inagel GR 10C, Indalca AG, Indalca AG-BV, Indalca AG-HV, J 2Fp, J 3000, Jaguar 170, Jaguar 2100, Jaguar 2204, Jaguar 2243, Jaguar 2513, Jaguar 2610, Jaguar 2638, Jaguar 387, Jaguar 6000, Jaguar 6003, Jaguar 6003VT, Jaguar 7500X, Jaguar 8200, Jaguar A 20B, Jaguar A 20D, Jaguar A 40F, Jaguar HP 140, Jaguar MDD, Jaguar MDD-I, K 4492, KWL 2000, Lameprint DX 9, Lamgum 200, Lej Guar, LGC 1, Lipocard, Loloss, Lycoid DR, Meyprofin M 175, Meyprogat 30, Meyprogat 7, Meypro-Guar 50, Meypro-Guar CSAA 200/50, Meypro-Guar CSAA-M 225, Meyprogum L, Meyprogum TC 47, Neosoft G 11, Newgelin G 100, NGL 8158, Oruno G 1, PAK-T 80, Papsize 7, PF 20, Polytex 100, Procol F, Procol S 1, Procol U, Rantec 4000, Rantec D 1, Regonol, Rein Guarin, RG 100, RT 3088, Soaguar RG 100, Solvent purified guar gum, Stamulcol ULV 500, Super Tack, Supercol, Supercol G 2H, Supercol G 2S, Supercol GF, Supercol U, Supercol U Powder, Syngum D 46D, Uni-Guar, Uniguar 80, Vidocreme A, Vidogum G 120/1501, Vidogum G 200-1, Vidogum GH 175, Vidogum GHK 175, VIS TOP B 20, VIS TOP D 1321, VIS TOP D 20, VIS TOP D 2022, VIS TOP D 2029, VIS TOP LH 303, Viscogum BCR 13/80, Viscogum HV 100T, Viscogum HV 3000, Viscogum HV 3000A, VLV, WG 15, WG 19, WG 1 L, WOGU 4401, X 5363, α-D-Galactopyrano-β-D-mannopyranan, and α-D-galacto-β-D-Mannan.

The amount of guar gum present in the borehole drilling fluid according to an embodiment of the present invention may be up to about 0.1% by weight (w/w) of the drilling fluid. For example, the guar gum may be present in the range of about 0.01% to about 0.1% w/w of the drilling fluid, encompassing any value and range therebetween. For example, the guar gum may be present in a range of about 0.01% to 0.09%, 0.01% to 0.08%, 0.01% to 0.07%, 0.01% to 0.06%, 0.01% to 0.05%, 0.01% to 0.04%, 0.01% to 0.03%, 0.01% to 0.02%, 0.02% to 0.09%, 0.02% to 0.08%, 0.02% to 0.07%, 0.02% to 0.06%, 0.02% to 0.05%, 0.02% to 0.04%, 0.02% to 0.03%, 0.03% to 0.1%, 0.03% to 0.09%, 0.03% to 0.08%, 0.03% to 0.07%, 0.03% to 0.06%, 0.03% to 0.05%, 0.03% to 0.04%, 0.04% to 0.1%, 0.04% to 0.09%, 0.04% to 0.08%, 0.04% to 0.07%, 0.04% to 0.06%, 0.04% to 0.05%, 0.05% to 0.1%, 0.05% to 0.09%, 0.05% to 0.08%, 0.05% to 0.07%, 0.05% to 0.06%, 0.06% to 0.1%, 0.06% to 0.09%, 0.06% to 0.08%, 0.06% to 0.07%, 0.07% to 0.1%, 0.07% to 0.09%, 0.07% to 0.08%, 0.08% to 0.1%, 0.08% to 0.09%, and 0.09% to 0.1% by w/w of the drilling fluid.

In some embodiments, the guar gum is present in an amount of about 0.02% w/w of the drilling fluid. However, it would be appreciated by a person skilled in the art that concentrations of guar gum higher and lower than this (and present in an amount up to about 0.1% w/w of the drilling fluid) may be used.

In some embodiments of the present invention, the borehole drilling fluid comprises about 0.18% w/w xanthan gum, about 0.05% w/w/PHPA, about 0.02% w/w Pac-LV, and about 0.02% guar gum.

In some embodiments, the drilling fluid of the present invention further comprises regular viscosity polyanionic cellulose (herein referred to as "Pac-RV"). Details regarding polyanionic cellulose are provided above. The difference between Pac-RV and Pac-LV is merely in the viscosity ranges of the polyanionic cellulose. In this regard, Pac-RV provides modifications at a wide range of shear rates, while Pac-LV mostly changes the low end rheology and in other applications can help with filtration of bentonite-base drilling fluids. Adding Pac-RV to water results in non-Newtonian behavior while adding Pac-LV increases the viscosity but mostly proportionally over the range of shear rates, i.e. fluid (Pac-LV and water) can be described as Newtonian. Pac-RV can be purchased from the same sources as Pac-LV as indicated above.

The amount of Pac-RV present in the borehole drilling fluid according to an embodiment of the present invention may be up to about 0.1% by weight (w/w) of the drilling fluid. For example, the Pac-RV may be present in the range of about 0.01% to about 0.1% w/w of the drilling fluid, encompassing any value and range therebetween. For example, the Pac-RV may be present in a range of about 0.01% to 0.09%, 0.01% to 0.08%, 0.01% to 0.07%, 0.01% to 0.06%, 0.01% to 0.05%, 0.01% to 0.04%, 0.01% to 0.03%, 0.01% to 0.02%, 0.02% to 0.09%, 0.02% to 0.08%, 0.02% to 0.07%, 0.02% to 0.06%, 0.02% to 0.05%, 0.02% to 0.04%, 0.02% to 0.03%, 0.03% to 0.1%, 0.03% to 0.09%, 0.03% to 0.08%, 0.03% to 0.07%, 0.03% to 0.06%, 0.03% to 0.05%, 0.03% to 0.04%, 0.04% to 0.1%, 0.04% to 0.09%, 0.04% to 0.08%, 0.04% to 0.07%, 0.04% to 0.06%, 0.04% to 0.05%, 0.05% to 0.1%, 0.05% to 0.09%, 0.05% to 0.08%, 0.05% to 0.07%, 0.05% to 0.06%, 0.06% to 0.1%, 0.06% to 0.09%, 0.06% to 0.08%, 0.06% to 0.07%, 0.07% to 0.1%, 0.07% to 0.09%, 0.07% to 0.08%, 0.08% to 0.1%, 0.08% to 0.09%, and 0.09% to 0.1% by w/w of the drilling fluid.

In some embodiments, the Pac-RV is present in an amount of about 0.01% w/w of the drilling fluid. However, it would be appreciated by a person skilled in the art that concentrations of Pac-RV higher and lower than this (and present in an amount up to about 0.1% w/w of the drilling fluid) may be used.

In some embodiments of the present invention, the borehole drilling fluid comprises about 0.18% w/w xanthan gum, about 0.05% w/w/PHPA, about 0.02% w/w Pac-LV, about 0.02% guar gum, and about 0.01% Pac-RV.

The aforementioned polymer components of the borehole drilling fluid of the present invention are contained in a base fluid, which may include any suitable fluid known in the art, such as aqueous fluids, non-aqueous fluids, or any combination thereof, provided that the components are compatible with the base fluid.

As an example, the base fluid may include an aqueous-based fluid, an aqueous-miscible fluid, a water-in-oil emulsion, an oil-in-water emulsion, and an oil-based fluid. The base fluid can be obtained from any source, provided that the fluid does not contain components that adversely affect the stability and/or performance of the borehole drilling fluid. Suitable fluid systems into which the principal components of the borehole drilling fluid may be incorporated therefore include water-based fluid systems, such as brines, and invert emulsion fluid systems.

Accordingly, in some embodiments, the borehole drilling fluid of the present invention is a water-based drilling fluid system, containing an aqueous base fluid. As used herein, "water-based" means that water or an aqueous solution is the dominant component of the drilling fluid (for example, greater than 50% by weight of the drilling fluid). In this regard, aqueous base fluids that are suitable may comprise water (from any source). For example, the aqueous base fluid may include fresh water or non-fresh water. Non-fresh water sources include surface water such as brackish water, seawater, brine (e.g., saturated salt water), returned water (sometimes referred to as flowback water) from the delivery of drilling fluid into a borehole, unused drilling fluid, produced water, salt water (e.g., water containing one or more salts dissolved therein), or a combination thereof.

Where the aqueous base fluid comprises water with one or more water-soluble salts dissolved therein, the one or more salts can may include inorganic salts, formate salts, or a combination thereof. Examples of inorganic salts include monovalent salts (e.g. KCl, NaCl), alkali metal halides, and ammonium halides. Inorganic salts may also include divalent salts, such as alkaline earth metal halides (e.g. $CaCl_2$, $CaBr_2$, etc) and zinc halides. In some embodiments of the present invention, the borehole drilling fluid comprises potassium chloride (KCl). KCl can be added to improve the inhibition capacity of the borehole drilling fluid against shale formations that cause borehole instability.

The amount of KCl present in the borehole drilling fluid according to an embodiment of the present invention may be up to about 8.0% by weight (w/w) of the drilling fluid. For example, the KCl may be present in an amount up to about 7.5%, 7.0%, 6.5%, 6.0%, 5.5%, 5.0%, 4.5%, 4.0%, 3.5%, 3.0%, 2.5%, 2.0%, 1.5%, 1.0%, 0.5%, down to about 0.1%. In some embodiments, the KCl is present in an amount of about 4.0% w/w of the drilling fluid.

In some embodiments of the present invention, the borehole drilling fluid comprises about 0.18% w/w xanthan gum, about 0.05% w/w/PHPA, about 0.02% w/w Pac-LV, about 0.02% guar gum, about 0.01% Pac-RV, and about 4.0% KCl.

In some embodiments, the aqueous base fluid can comprise a monovalent brine or a divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like.

In some embodiments, the density of the aqueous base fluid can be adjusted, among other purposes, to provide additional particulate transport and suspension of the principal components included in the borehole drilling fluid. In some embodiments, the pH of the aqueous base fluid may also be adjusted (e.g., by using a buffer or other pH adjusting agent) to a specific level, which may depend on, among other factors, the principal components included in the borehole drilling fluid. One of ordinary skill in the art will understand when such density and/or pH adjustments are appropriate. In some embodiments, the pH of the aqueous base fluid is in the range of about pH 8.0 to about pH 11.0 and any range or value therebetween.

Suitable aqueous-miscible base fluids may include alcohols (e.g., methanol, ethanol, n-propanol, isopropanol, n-butanol, sec-butanol, isobutanol, and t-butanol; glycerins); glycols (e.g., polyglycols, propylene glycol, and ethylene glycol); polyglycol amines; polyols; and any derivatives of the aforementioned. These may be included in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); and/or in combination with an aqueous-based fluid. Combinations of any of the aforementioned are also contemplated.

Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompassing any subset therebetween.

Examples of non-aqueous base fluids that may be suitable for use in the borehole drilling fluid of the present invention include, but are not limited to, oils, hydrocarbons, organic liquids, alcohols, (e.g., glycols), polar solvents, and the like. Suitable oil-based fluids may include alkanes, olefins, aromatic organic compounds, cyclic alkanes, paraffins, diesel fluids, mineral oils, desulfurized hydrogenated kerosenes, and any combination thereof.

In some embodiments, the borehole drilling fluid of the present invention may comprise a mixture of one or more fluids and/or gases, including but not limited to emulsions, foams, and the like. The base fluids for use in the present invention may additionally be gelled or foamed by any means known in the art.

In some embodiments, the drilling fluid is substantially free of solid particles. However, other conventional additives may be used in the fluid in combination with the aforementioned components. Examples of such additional additives include, emulsifiers, acids, alkalinity agents, pH buffers, fluorides, fluid loss control additives, gases, nitrogen, carbon dioxide, surface modifying agents, tackifying agents, foamers, corrosion inhibitors, scale inhibitors, catalysts, clay control agents, biocides, bactericides, friction reducers, antifoam agents, bridging agents, dispersants, flocculants, hhS scavengers, $CO_2$ scavengers, oxygen scavengers, friction reducers, viscosifiers, breakers, relative permeability modifiers, resins, wetting agents, coating enhancement agents, filter cake removal agents, rheology modifiers, filtration control agents, defoamers, surfactants, shale stabilizers, oils, and the like. One or more of these additives may comprise degradable materials that are capable of undergoing irreversible degradation downhole. A person skilled in the art will understand the types of additives that may be included in the borehole drilling fluid of the present invention.

In some embodiments, the term "substantially free of solid particles" is taken to mean no detectable levels of solid particles. However, the term also encompasses drilling fluids wherein solid particles have been removed from the fluid using a 50 micron filter.

In some embodiments of the present invention, the borehole drilling fluid does not comprise a surfactant.

The aforementioned borehole drilling fluids of the present invention exhibit advantageous rheology properties. Specifically, the drilling fluids exhibit an increase in viscosity under low shear rates, and a decrease in viscosity under high shear rates when compared to currently used drilling fluids and individual polymers used therein.

The viscosity of a fluid is its internal resistance to flow as measured in centipoise (cp) units. The coefficient of viscosity of a normal homogeneous fluid at a given temperature and pressure is a constant for that fluid and independent of the rate of shear or the velocity gradient. Fluids that obey this rule are "Newtonian" fluids. In fluids called "non-Newtonian fluids," this coefficient is not constant but is a function of the rate at which the fluid is sheared as well as of the relative concentration of the phases. The drilling fluids of the present invention are generally non-Newtonian fluids. Non-Newtonian fluids frequently exhibit plastic flow, in which the flowing behavior of the material occurs after the applied stress reaches a critical value or yield point (YP). Yield points in drilling fluids are frequently expressed in units of pounds per square 100 feet square, wherein the yield point is a function of the internal structure of the fluid. In drilling, once the critical value or yield point (YP) of the drilling fluid is achieved, the rate of flow or rate of shear typically increases with an increase in pressure, causing flow or shearing stress. The rate of flow change, known as plastic viscosity (PV), is analogous to viscosity in Newtonian fluids and is similarly measured in centipoise units.

The relationship between the shear stress and shear rate can be characterized by apparent viscosity. The apparent viscosity unlike the viscosity (for Newtonian Fluids) changes with shear rate. Different models have been proposed to characterize the variation of apparent viscosity (or rather shear stress) with shear rate. Examples include Yield Bingham, Power Law, Yield Power Law and Casson models. While the common practice of industry is to use Bingham, the drilling simulators and research papers often tend to prefer to use the Yield Power Law model.

The shear rate of a fluid is the rate at which the fluid is sheared or "worked" during flow. That is, it is the rate at which fluid layers or laminae move past each other. Shear rate is determined by both the geometry and speed of the flow of the fluid. For example, in the case of a fluid flowing in a pipeline, the flow rate is related to the level of shear rate and the pressure drop is correlated to the level of shear stress applied by the fluid on the pipe wall. The dimensions of shear rate is [1/T], e.g. 1/s, while Pa, lb/100 ft$^2$, or dial reading are commonly used in quantifying shear stress in rheology studies.

There are different methods to measure fluid rheology such as capillary, hydraulic, flow-through constriction, oscillatory and rotary. In some embodiments, a rotary rheometer may be used. A rheometer is comprised of an inner cylinder (called a bob) and an outer cylinder (called a rotor). The outer cylinder rotates while the torque applied by the fluid on the inner cylinder is measured. An advanced rheometer may also be used, which can provide viscosity measurements in a wide range of shear rates, for example from 0.001 1/s to 1900 1/s.

In some embodiments, when the shear rate of the drilling fluid of the present invention is less than about 0.01 1/s, the viscosity of the drilling fluid is about 10000 cp or higher as measured at about 23° C. to about 25° C.

In some embodiments, when the shear rate of the drilling fluid of the present invention is about 0.01 1/s, the viscosity of the drilling fluid is about 6,100 cp or higher as measured at about 23° C. to about 25° C.

In some embodiments, when the shear rate of the drilling fluid of the present invention is about 1000 1/s or more, the viscosity of the drilling fluid is about 12 cp or lower as measured at about 23° C. to about 25° C.

In some embodiments, the borehole drilling fluid of the present invention can comprise solid particles for use in particular applications, as described in further detail below. In this regard, one or more bridging and/or weighting agents may be added to the drilling fluid.

Specifically, when encountering significant fractures during drilling, solid bridging agents can be added to the drilling fluid to control fluid and cutting loss. In this regard, the usual approach to fluid-loss control in these circumstances is to substantially reduce the permeability of the matrix of the fracture zone with a fluid-loss control material that blocks the permeability at or near the face of the rock matrix of the fracture zone. For example, the fluid-loss control material may be a particulate that has a size selected to bridge and plug the pore throats of the matrix of the fracture. The higher the concentration of the appropriately sized particulate, the faster bridging will occur. As the fluid phase carrying the fluid-loss control material leaks into the fracture, the fluid-loss control material bridges the pore throats of the matrix of the fracture and builds up on the surface of the borehole or fracture face or penetrates only a little into the matrix. By accumulating solid particulate or other fluid-loss control material on the walls of a wellbore or a fracture, the fluid loss can be controlled. That is, the physical blockage of the conductivity of the fracture or unconsolidated formations by the lost circulation material helps in controlling the fluid loss.

Fluid-loss control agents can include, for example, a filter cake forming material, sometimes also known as a filtration control agent (such as clay (e.g., bentonite)) or an organic colloidal-sized solid particulate (e.g., a biopolymer, cellulose polymer, or starch, modified starch, plant tannin, a polyphosphate, a lignitic material, a lignosulfonate, or a synthetic polymer), a filter cake bridging material (such as graphite, a calcium carbonate particulate, a cellulose particulate, an asphalt particulate, and a gilsonite particulate), and a lost circulation material to block larger openings in the formation (such as an appropriately-sized particulate of walnut shells, fibre, or mica, etc).

In some embodiments, the drilling fluid of the present invention comprises bentonite. Bentonite is an absorbent aluminium phyllosilicate clay consisting mostly of montmorillonite. Bentonite is mined from clay rich formations, and after crushing and drying can be packed. There are different clay mines in the world producing different quality bentonite. Some of these bentonites might not have the required quality, and in that case some additional additives are required before packing the bentonite. Examples of these additives are mix metal oxides or Starch polymers. In some embodiments, raw bentonite (also known as API) can be used without any further additive.

Bentonite can be obtained from a number of commercial suppliers, including the Australian Mud Company (Balcatta, Western Australia, Australia), and Baker Hughes (Houston, Tex., USA).

The amount of bentonite present in the borehole drilling fluid according to an embodiment of the present invention may be up to about 2.0% by weight (w/w) of the drilling fluid. For example, the bentonite may be present in the range of about 0.01% to about 2.0% w/w of the drilling fluid, encompassing any value and range therebetween. For example, the bentonite may be present in a range of about 0.01% to 1.5%, 0.01% to 1.0%, 0.01% to 0.5%, 0.01% to 0.1%, 0.01% to 0.05%, 0.05% to 2.0%, 0.05% to 1.5%, 0.05% to 1.0%, 0.05% to 0.5%, 0.05% to 0.1%, 0.1% to 2.0%, 0.1% to 1.5%, 0.1% to 1.0%, 0.1% to 0.5%, 0.5% to 2.0%, 0.5% to 1.5%, 0.5% to 1.0%, 1.0% to 2.0%, 1.0% to 1.9%, 1.0% to 1.8%, 1.0% to 1.7%, 1.0% to 1.6%, 1.0% to 1.5%, 1.0% to 1.4%, 1.0% to 1.3%, 1.0% to 1.2%, 1.0% to 1.1%, 1.1% to 2.0%, 1.1% to 1.9%, 1.1% to 1.8%, 1.1% to 1.7%, 1.1% to 1.6%, 1.1% to 1.5%, 1.1% to 1.4%, 1.1% to 1.3%, 1.1% to 1.2%, 1.2% to 2.0%, 1.2% to 1.9%, 1.2% to 1.8%, 1.2% to 1.7%, 1.2% to 1.6%, 1.2% to 1.5%, 1.2% to 1.4%, 1.2% to 1.3%, 1.3% to 2.0%, 1.3% to 1.9%, 1.3% to 1.8%, 1.3% to 1.7%, 1.3% to 1.6%, 1.3% to 1.5%, 1.3% to 1.4%, 1.4% to 2.0%, 1.4% to 1.9%, 1.4% to 1.8%, 1.4% to 1.7%, 1.4% to 1.6%, 1.4% to 1.5%, 1.5% to 2.0%, 1.5% to 1.9%, 1.5% to 1.8%, 1.5% to 1.7%, 1.5% to 1.6%, 1.6% to 2.0%, 1.6% to 1.9%, 1.6% to 1.8%, 1.6% to 1.7%, 1.7% to 2.0%, 1.7% to 1.9%, 1.7% to 1.8%, 1.8% to 1.9%, and 1.9% to 2.0%, by w/w of the drilling fluid.

In some embodiments, the bentonite is present in an amount of about 1.2% w/w of the drilling fluid. However, it would be appreciated by a person skilled in the art that concentrations of bentonite higher or lower than this (and present in an amount up to about 2.0% w/w of the drilling fluid) may be used as dictated by the extent of the fracture and accompanying fluid loss.

In some embodiments of the present invention, the borehole drilling fluid comprises about 0.3% w/w xanthan gum, about 0.05% w/w PHPA, about 0.02% w/w Pac-LV, and about 1.2% w/w bentonite.

Fibre is another solid bridging agent that may be added to the drilling fluid of the present invention. The fibre can be synthetic or natural. The fibre does not change the fluid rheology of the base fluid, however it can block the aperture of fractured formations. Fibre can be purchased from commercial sources such as the Australian Mud Company (Balcatta, Western Australia, Australia).

The amount of fibre present in the borehole drilling fluid according to an embodiment of the present invention may be up to about 5.0% by weight (w/w) of the drilling fluid. For example, the fibre may be present in the range of about 0.1% to about 5.0% w/w of the drilling fluid, encompassing any value and range therebetween. For example, the fibre may be present in a range of about 0.1% to 4.8%, 0.1% to 4.6%, 0.1% to 4.4%, 0.1% to 4.2%, 0.1% to 4.0%, 0.1% to 3.5%, 0.1% to 3.0%, 0.1% to 2.5%, 0.1% to 2.0%, 0.1% to 1.5%, 0.1% to 1.0%, 0.1% to 0.5%, 0.5% to 5.0%, 0.5% to 4.8%, 0.5% to 4.6%, 0.5% to 4.4%, 0.5% to 4.2%, 0.5% to 4.0%, 0.5% to 3.5%, 0.5% to 3.0%, 0.5% to 2.5%, 0.5% to 2.0%, 0.5% to 1.5%, 0.5% to 1.0%, 1.0% to 5.0%, 1.0% to 4.8%, 1.0% to 4.6%, 1.0% to 4.4%, 1.0% to 4.2%, 1.0% to 4.0%, 1.0% to 3.5%, 1.0% to 3.0%, 1.0% to 2.5%, 1.0% to 2.0%, 1.0% to 1.5%, 1.5% to 5.0%, 1.5% to 4.8%, 1.5% to 4.6%, 1.5% to 4.4%, 1.5% to 4.2%, 1.5% to 4.0%, 1.5% to 3.5%, 1.5% to 3.0%, 1.5% to 2.5%, 1.5% to 2.0%, 2.0% to 5.0%, 2.0% to 4.8%, 2.0% to 4.6%, 2.0% to 4.4%, 2.0% to 4.2%, 2.0% to 4.0%, 2.0% to 3.5%, 2.0% to 3.0%, 3.0% to 5.0%, 3.0% to 4.8%, 3.0% to 4.6%, 3.0% to 4.4%, 3.0% to 4.2%, 3.0% to 4.0%, 3.0% to 3.5%, 4.0% to 5.0%, 4.0% to 4.8%, 4.0% to 4.6%, 4.0% to 4.4%, 4.0% to 4.2%, 4.2% to 5.0%, 4.4% to 5.0%, 4.4% to 5.0%, 4.8% to 5.0%, by w/w of the drilling fluid.

In some embodiments, the fibre is present in an amount of about 4.8% w/w of the drilling fluid. However, it would be appreciated by a person skilled in the art that concentrations of fibre higher or lower than this (and present in an amount up to about 5.0% w/w of the drilling fluid) may be used as dictated by the extent of the fracture and accompanying fluid loss.

In some embodiments of the present invention, the borehole drilling fluid comprises about 0.3% w/w xanthan gum, about 0.02% w/w Pac-LV, about 0.02% w/w guar gum, about 0.01% w/w Pac-RV, about 1.2% w/w bentonite, and about 4.8% w/w fibre.

In some embodiments of the present invention, the borehole drilling fluid comprises about 0.3% w/w xanthan gum, about 0.05% w/w PHPA, about 0.02% w/w Pac-LV, about 0.02% w/w guar gum, about 0.01% w/w Pac-RV, about 1.2% w/w bentonite, and about 4.8% w/w fibre.

As indicated above, graphite is another bridging material that may be used as a lost circulation material in the drilling fluid of the present invention. It has been demonstrated herein that the inclusion of graphite improves low end rheology of the drilling fluid and improves the seal/bridging capacity of the drilling fluid with respect to substantial fracture formations. The graphite is in powder form and can be obtained from a number of commercial sources such as M-I Swaco (Houston, Tex., USA). In some embodiments, the median particle size (D50) of the graphite powder is in the range of 300 to 500 μm.

The amount of graphite present in the borehole drilling fluid according to an embodiment of the present invention may be up to about 10.0% by weight (w/w) of the drilling fluid. For example, the graphite may be present in the range of about 1.0% to about 10.0% w/w of the drilling fluid, encompassing any value and range therebetween. For example, the graphite may be present in a range of about 1.0% to 9.0%, 1.0% to 8.0%, 1.0% to 7.0%, 1.0% to 6.0%, 1.0% to 5.0%, 1.0% to 4.0%, 1.0% to 3.0%, 1.0% to 2.0%, 2.0% to 10.0%, 2.0% to 9.0%, 2.0% to 8.0%, 2.0% to 7.0%, 2.0% to 6.0%, 2.0% to 5.0%, 2.0% to 4.0%, 2.0% to 3.0%, 3.0% to 10.0%, 3.0% to 9.0%, 3.0% to 8.0%, 3.0% to 7.0%, 3.0% to 6.0%, 3.0% to 5.0%, 3.0% to 4.0%, 4.0% to 10.0%, 4.0% to 9.0%, 4.0% to 8.0%, 4.0% to 7.0%, 4.0% to 6.0%, 4.0% to 5.0%, 5.0% to 10.0%, 5.0% to 9.0%, 5.0% to 8.0%, 5.0% to 7.0%, 5.0% to 6.0%, 6.0% to 10.0%, 6.0% to 9.0%, 6.0% to 8.0%, 6.0% to 7.0%, 7.0% to 10.0%, 7.0% to 9.0%, 7.0% to 8.0%, 8.0% to 10.0%, 8.0% to 9.0%, and 9.0% to 10.0%, by w/w of the drilling fluid.

In some embodiments, the graphite is present in an amount of about 6.0% w/w of the drilling fluid. However, it would be appreciated by a person skilled in the art that concentrations of graphite higher or lower than this (and present in an amount up to about 10.0% w/w of the drilling fluid) may be used as dictated by the extent of the fracture and accompanying fluid loss.

In some embodiments of the present invention, the borehole drilling fluid comprises about 0.3% w/w xanthan gum, about 0.05% w/w PHPA, about 0.05% w/w Pac-LV, about 0.02% w/w guar gum, about 1.2% w/w bentonite, and about 6.0% w/w graphite.

Borehole drilling fluids according to the present invention may be prepared by any method suitable for a given application. For example, certain components of the borehole drilling fluid of embodiments of the present invention may be provided in a pre-blended liquid or powder or a dispersion of powder in an aqueous or non-aqueous liquid, which may be combined with a base fluid at a subsequent time. After the pre-blended liquids and the base fluid have been combined, other suitable additives as described above may be added prior to introduction into the borehole. Those of ordinary skill in the art, with the benefit of this disclosure will be able to determine other suitable methods for the preparation of the borehole drilling fluids of the present invention. For example, for laboratory-based development, the components can be combined using Hamilton mixers which are API standard mixers. In the field, the components can be added to water using hoppers, which utilize the venturi effect to introduce the components to a stream of water.

As indicated above, in some embodiments, the principal components of the borehole drilling fluid of the present invention include xanthan gum, PHPA and Pac-LV. This combination of polymers and additives has been shown by the present inventors to exhibit surprising and advantageous rheology characteristics which enable a reduction in drilling fluid loss and cutting loss during borehole drilling when compared to existing drilling fluids and when compared to the individual components of the drilling fluid when used alone.

Accordingly, in a second aspect the present invention provides a method of reducing borehole drilling fluid loss and cutting loss during borehole drilling, the method comprising conducting the borehole drilling using a borehole drilling fluid comprising:

(i) xanthan gum;

(ii) low molecular weight partially-hydrolysed polyacrylamide (PHPA); and (iii) low viscosity polyanionic cellulose (Pac-LV).

These components, their source and the amounts useful are described in detail above. This combination of principal components may be used alone or may be combined with one or more of guar gum, Pac-RV, and KCl. Accordingly, in some embodiments of the second aspect of the invention, the borehole drilling fluid also includes one or more of guar gum, Pac-RV, and KCl. These components, their source and the amounts useful have also been described above in detail.

In some embodiments of the second aspect of the present invention, the drilling fluid is substantially free of solid particles.

However, as indicated above when encountering significant underground formations/fractures during drilling, solid bridging agents (lost circulation materials) can be added to the drilling fluid to control fluid and cutting loss.

Lost circulation involves the partial or complete loss of whole mud (both solid and continuous phase) to the underground formation Lost circulation is one challenge that has plagued oil and gas drilling and exploration for decades. In fact, it has been argued that lost circulation is one of the most cost inflating and time-consuming problems faced by the oil and gas industry with an estimated annual cost of over one billion dollars in rig time, materials (mud additives, etc.) and other resources. Lost circulation may occur naturally while drilling through highly permeable, cavernous formations, faults, and fissures, or may be induced because of fractures created by excessive overbalance, or drilling in a formation with a narrow mud weight window, or improper drilling practices such as tripping too fast. Regardless of the mechanism, lost circulation results in unwanted cost and non-productive time during drilling. Therefore, the use of lost circulation materials (LCMs) as fluid loss additives can be used.

In this regard, in some embodiments of the second aspect of the present invention, the solid bridging reagents may include bentonite, fibre, and/or graphite. These components, their source and the amounts useful have also been described above in detail.

It is to be noted that where a range of values is expressed, it will be clearly understood that this range encompasses the upper and lower limits of the range, and all numerical values or sub-ranges in between these limits as if each numerical value and sub-range is explicitly recited. For example, a range of "about 0.02% to about 0.1%", or "about 0.02% to 0.1%", or like terminology, should be interpreted to include not just about 0.02% to about 0.1%, but also the individual values (e.g., about 0.03%, about 0.04%, about 0.05%, about 0.06%, up to about 0.1%) and the sub-ranges (e.g., about 0.03% to about 0.1%, about 0.04% to about 0.1%, about 0.05% to about 0.1%, etc) within the indicated range. The statement "about X % to Y %" has the same meaning as "about X % to about Y %," unless indicated otherwise.

The term "about" as used in the specification means approximately or nearly and in the context of a numerical value or range set forth herein is meant to encompass variations of +/−10% or less, +/−5% or less, +/−1% or less, or +/−0.1% or less of and from the numerical value or range recited or claimed.

As used herein, the singular forms "a," "an," and "the" may refer to plural articles unless specifically stated otherwise.

Throughout this specification, unless the context requires otherwise, the word "comprise", or variations such as "comprises" or "comprising", will be understood to imply the inclusion of a stated element or integer or group of elements or integers but not the exclusion of any other element or integer or group of elements or integers.

All methods described herein can be performed in any suitable order unless indicated otherwise herein or clearly contradicted by context. The use of any and all examples, or exemplary language (e.g., "such as") provided herein, is intended merely to better illuminate the example embodiments and does not pose a limitation on the scope of the claimed invention unless otherwise claimed. No language in the specification should be construed as indicating any non-claimed element as essential.

It will be apparent to the person skilled in the art that while the invention has been described in some detail for the purposes of clarity and understanding, various modifications and alterations to the embodiments and methods described herein may be made without departing from the scope of the inventive concept disclosed in this specification.

Furthermore, the description provided herein is in relation to several embodiments which may share common characteristics and features. It is to be understood that one or more features of one embodiment may be combinable with one or more features of the other embodiments. In addition, a single feature or combination of features of the embodiments may constitute additional embodiments.

The subject headings used herein are included only for the ease of reference of the reader and should not be used to limit the subject matter found throughout the disclosure or the claims. The subject headings should not be used in construing the scope of the claims or the claim limitations.

The invention is further illustrated in the following examples. The examples are for the purpose of describing particular embodiments only and are not intended to be limiting with respect to the above description. It will be appreciated by those skilled in the art that the disclosure may be embodied in many other forms.

Example 1

Rheology Analysis of Drilling Fluid Formulations

The purpose of the present study was to use fluid rheology to identify drilling fluid formulations useful for controlling fluid and cutting loss during borehole drilling.

The common practice is to characterise drilling fluid properties using an API rotary viscometer, for example. Using this machine, three main measurements are recorded at rotary speeds of 3 rpm, 300 rpm and 600 rpm, which correspond to shear rates of 5.1 1/s, 510 1/s and 1021 1/s, respectively. The latter two readings are typically used to characterise the fluid response using rheological models such as the Bingham model and power law models.

These measurements can provide a reasonable engineering estimation of the fluid behaviour for drilling fluid hydraulics and cuttings transportation. However, the fluid is under a much smaller range of shear rates when it is being lost into a formation. In order to show the relevant range of shear rates, here a horizontal fracture intersecting the borehole with a fracture aperture of 1 mm is considered. A theoretical model developed earlier for rectangular channels can be used to predict the shear rate range ($\gamma_w$) at various stages of the fluid loss:

$$\dot{\gamma}_w = \dot{\gamma}_a \times \left(\frac{2}{3}\right)\left(\frac{b^*}{f^*} + \frac{a^*}{f^*}\frac{1}{n}\right)$$

$$\dot{\gamma}_a = \left(\frac{6q}{wh^2}\right)\left(1 + \frac{h}{w}\right) \times f^*\left(\frac{H}{w}\right)$$

where q is the fluid loss into the fracture, h is the aperture, and w is the width of the fracture. The parameter $f^*$ is related to geometry of the fracture and is dependent on the width and aperture ratios, and n is the power index (Son Y, 2007, *Polymer*, 48(2): 632-637). Considering a fluid loss of 100 lit/min into a 1 mm fracture, as shown in FIG. 1 the fluid shear rate evolves at various radii. In these equations, a* and b* are coefficients characterizing the geometry of a slit, and are a function of the width and height of the fracture.

As is evident from FIG. 1, the drilling fluid is under a very small range of shear rates. Particularly, it is evident that after the fluid is a few meters away from the borehole, it is under shear rates lower than 0.05 1/s. This is in stark contrast to the shear rates encountered by the drilling fluid during the drilling process.

In development of the drilling fluid formulations of the present invention, a rheometer was used (instead of a viscometer) so as to allow evaluation of the rheology of the drilling fluid formulations in a very broad shear rate range (from 0.001 1/s to 1900 1/s), thereby catering for the actual changes in shear rates that may occur in the field during drilling and fracture encounters.

In this regard, a HAAKE Mars rheometer (from Thermo Fisher Scientific) was used in the testing of various drilling fluid formulations using standard methodology. The samples were prepared using the same procedure with a 20 minute mixing time using Hamilton mixers. A rotary concentric sensor was used on the machine for most of the experiments, as it lended to more consistent results. The temperature was always set at 25° C., which was controlled using a water bath. Before placing the sample, the machine carries out a series of calibrations. Once the sample is placed, a shear rate sweep test was performed. The same procedure was used for all the samples. The duration of each shear rate was selected based on trial and error. As the duration can be as long as 6 minutes for smaller shear rates, the experiments were often conducted over a few hours. The collected data was then exported to excel files, which were then analyzed using a matlab code to measure the average of stabilized shear stress and viscosity at each shear rate.

Figure 2:
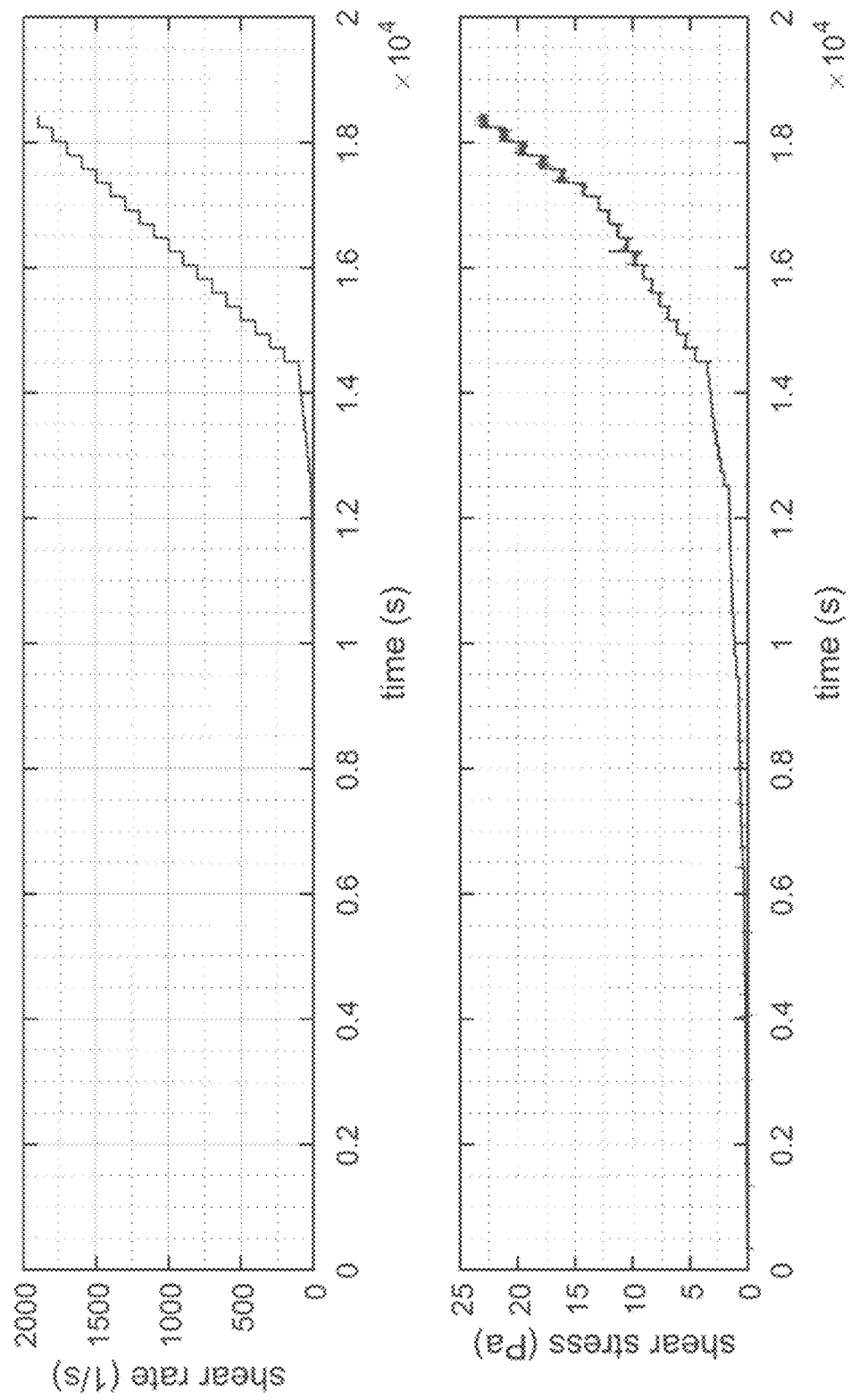
FIG. 2—graphs of the results of rheology testing of an exemplary drilling fluid using a HAAKE rheometer showing the variation in shear rate (FIG. 2A) and corresponding shear stress (FIG. 2B) placed on the fluid over time.
Figure 3:
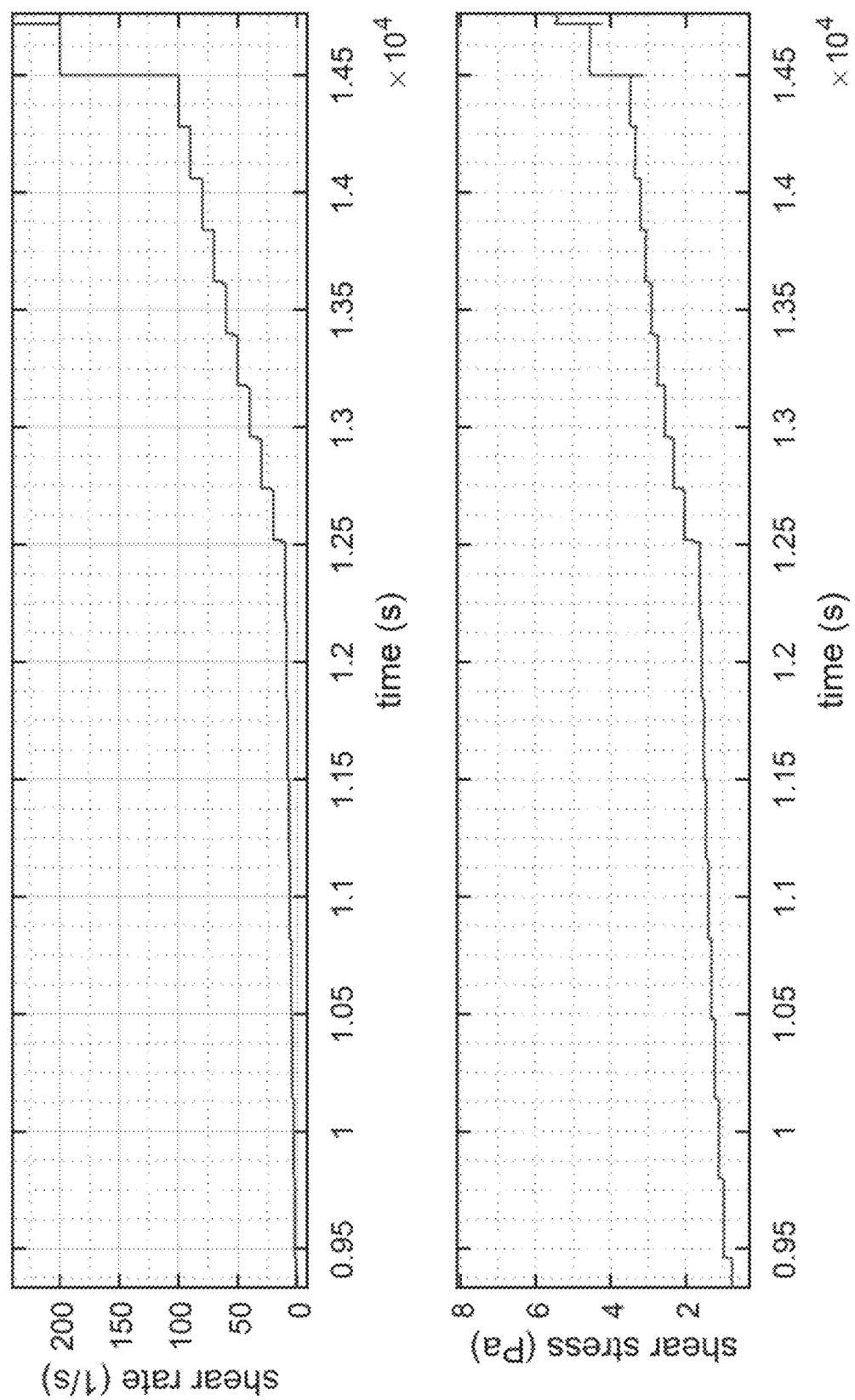
FIG. 3—graphs of the results of rheology testing of the exemplary drilling fluid in FIG. 2 over a moderate range of shear rates.
Figure 4:
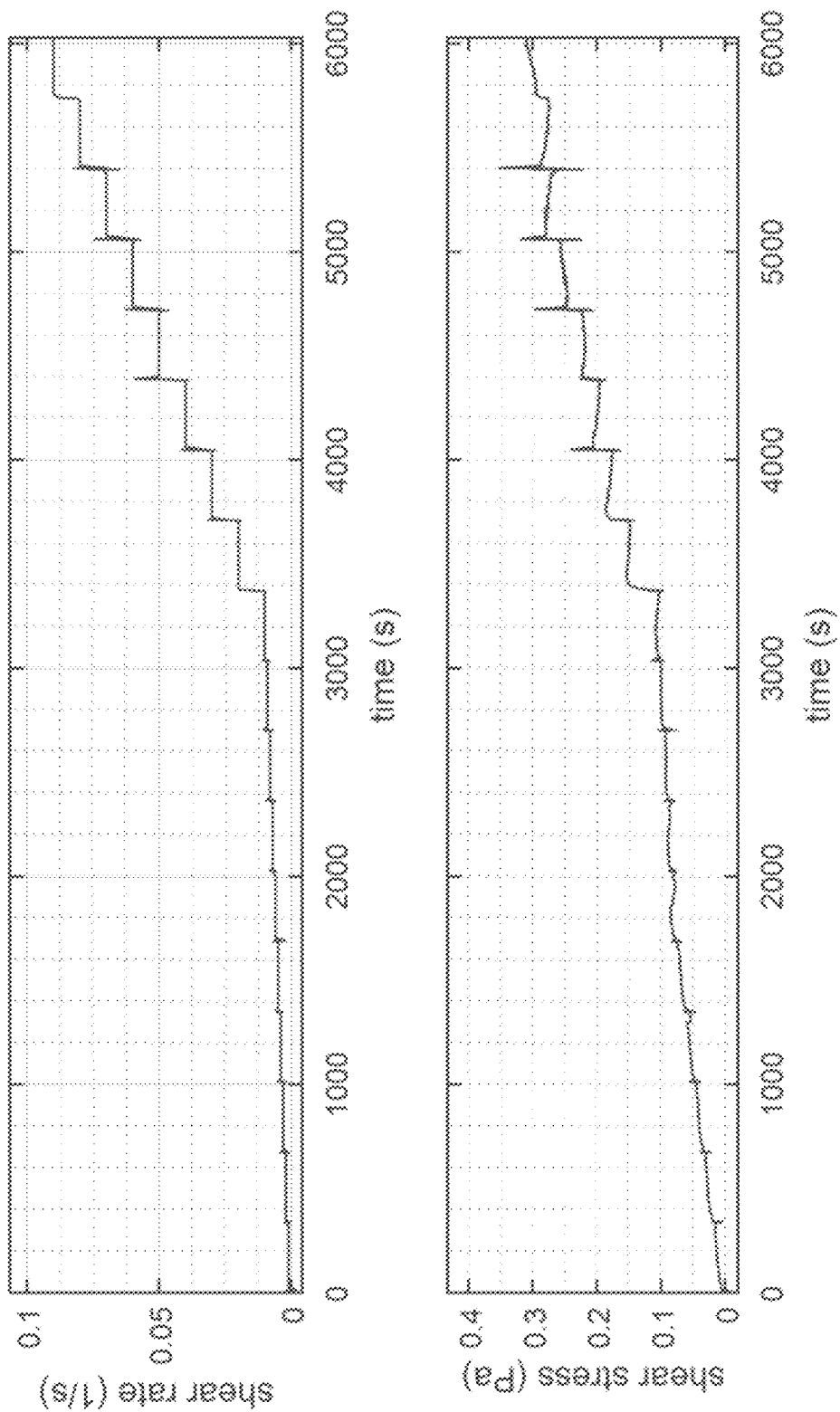
FIG. 4—graphs of the results of rheology testing of the exemplary drilling fluid in FIG. 2 over a low range of shear rates.

Exemplary graphs showing the results of rheology testing on a polymer solution (0.2% w/w xanthan gum/0.03% w/w PHPA/0.03% w/w Pac-LV/0.02% w/w guar gum) are shown in FIGS. 2 to 4. These graphs show that for the exemplary fluid tested, the viscosity of a glycerin sample remains relatively constant over the tested range of shear rate, while the polymer solution exhibits higher viscosities at low shear rates and lower viscosities at higher shear rates. These experiments were carried out using an Ofite API rotary viscometer (Model 900 fitted with an R1B1 head)(OFI Testing Equipment, Inc., Houston, Tex., USA).

The same rheology testing was applied to various fluid formulations that were prepared using combinations of synthetic and natural polymers, and other additives. The rheology of these formulations was compared to the rheology of commercially available drilling fluids and to the rheology of individual components of the fluid formulations being tested. Examples of fluids tested are as follows:

Xanthan Gum (XG) alone (0.1% to 0.5% w/w) —The desired amount of Xanthan Gum was slowly added to water under constant agitation. The rate of addition of the polymer was sufficiently slow to ensure proper mixing and to ensure that no fish eyes were formed. Xanthan Gum stock from which desired dilutions were made was obtained from the Australian Mud Company (Balcatta, Western Australia, Australia).

Partially-hydrolysed polyacrylamide (PHPA) alone (0.02% to 0.1% w/w) —The desired amount of PHPA was slowly added to water under constant agitation. The rate of addition of the polymer was sufficiently slow to ensure proper mixing and to ensure that no fish eyes were formed. PHPA stock from which desired dilutions were made was obtained from a local distributor (Canitis), with the original product supplied by Xinhai (China) under the name Hengfloc 6008.

Low viscosity polyanionic cellulose (Pac-LV) alone (0.02% to 0.1% w/w) —The desired amount of Pac-LV was slowly added to water under constant agitation. The rate of addition of the polymer was sufficiently slow to ensure proper mixing and to ensure that no fish eyes were formed. Pac-LV stock from which desired dilutions were made was obtained from the Australian Mud Company or Mud Logic (Australia).

Guar Gum (GG) alone (0.02% to 0.1% w/w) —The desired amount of guar gum powder was slowly added to water under constant agitation. The rate of addition of the powder was sufficiently slow to ensure proper mixing and to ensure that no fish eyes were formed. Guar gum stock from which desired dilutions were made was obtained the Australian Mud Company or Mud Logic (Australia).

Bentonite alone (0.01% to 2.0% w/w) —The desired amount of bentonite powder was slowly added to water under constant agitation. The rate of addition of the powder was sufficiently slow to ensure proper mixing and to ensure that no fish eyes were formed. Bentonite stock from which desired dilutions were made was obtained from the Australian Mud Company (Balcatta, Western Australia, Australia) and Baker Hughes (Houston, Tex., USA).

Regular viscosity polyanionic cellulose (Pac-RV) alone (0.01% to 0.1% w/w) —The desired amount of Pac-RV was slowly added to water under constant agitation. The rate of addition of the polymer was sufficiently slow to ensure proper mixing and to ensure that no fish eyes were formed. Pac-RV stock from which desired dilutions were made was obtained the Australian Mud Company.

Xantham Gum (0.1% to 0.5% w/w)+PHPA (0.02% to 0.1% w/w)+Pac-LV (0.02% to 0.1% w/w) —The desired amount of these three components was slowly added to water under constant agitation. The rate of addition of the polymers was sufficiently slow to ensure proper mixing and to ensure that no fish eyes were formed.

Xantham Gum (0.1% to 0.5% w/w)+PHPA (0.02% to 0.1% w/w)+Pac-LV (0.02% to 0.1% w/w)+Guar Gum (0.01% to 0.1% w/w) —The desired amount of these four components was slowly added to water under constant agitation. The rate of addition of the polymers was sufficiently slow to ensure proper mixing and to ensure that no fish eyes were formed.

Xantham Gum (0.1% to 0.5% w/w)+PHPA (0.02% to 0.1% w/w)+Pac-LV (0.02% to 0.1% w/w)+Guar Gum (0.01% to 0.1% w/w)+Pac-RV (0.01% to 0.1% w/w) —The desired amount of these five components was slowly added to water under constant agitation. The rate of addition of the polymers was sufficiently slow to ensure proper mixing and to ensure that no fish eyes were formed.

Xantham Gum (0.1% to 0.5% w/w)+PHPA (0.02% to 0.1% w/w)+Pac-LV (0.02% to 0.1% w/w)+Bentonite (0.01% to 2.0% w/w) —The desired amount of these four components was slowly added to water under constant agitation. The rate of addition of the components was sufficiently slow to ensure proper mixing and to ensure that no fish eyes were formed.

Corewell, Spectrocap and CR650

These three drilling fluids are commercially available and known. Corewell and Spectrocap are blends of polymers and CR650 is a PHPA drilling polymer. All three products were purchased from a commercial supplier (the Australian Mud Company, Balcatta, Australia). These three products were tested at concentrations between 0.2-0.35% w/w until the prepared solutions had a similar high end viscosity at 1020 1/s (corresponding to 600 rpm).

Results of the rheology testing are shown in the tables below and accompanying figures.

TABLE 1

| | Rheology testing of XanthanGum alone (0.2% w/w) - low end rheology | | | | |
|---|---|---|---|---|---|
| t in s | t_seg in s | Á in 1/s | , in Pa | f in mPas | T in ° C. |
| | | Experiment 1 | | | |
| 481.4369 | 151.5232 | 0.003 | 0.0315 | 10486.381 | 25.434 |
| 823.9627 | 169.6154 | 0.004 | 0.0409 | 10204.246 | 25.432 |
| 1154.523 | 175.6455 | 0.005 | 0.0493 | 9850.970 | 25.440 |
| 1462.453 | 159.0599 | 0.006 | 0.0549 | 9144.264 | 25.440 |
| 1790.459 | 159.8159 | 0.007 | 0.0616 | 8794.075 | 25.429 |
| | | Experiment 2 | | | |
| 496.8818 | 165.8484 | 0.003 | 0.03 | 9441.03 | 25.43 |
| 831.6734 | 175.6425 | 0.004 | 0.04 | 8864.80 | 25.43 |
| 1150.808 | 169.6143 | 0.005 | 0.04 | 7613.34 | 25.43 |
| 1505.523 | 199.0092 | 0.006 | 0.04 | 7128.33 | 25.43 |
| 1814.239 | 182.4298 | 0.007 | 0.05 | 6870.95 | 25.43 |
| 2127.6 | 170.4223 | 0.008 | 0.05 | 6620.05 | 25.43 |
| 2436.778 | 154.5387 | 0.009 | 0.06 | 6305.24 | 25.43 |
| 2794.263 | 187.7044 | 0.01 | 0.06 | 5624.53 | 25.43 |
| 3113.221 | 181.6721 | 0.02 | 0.09 | 4291.25 | 25.43 |
| | | Experiment 3 | | | |
| 875.181 | 157.5554 | 0.003 | 0.030516 | 10172.9 | 24.3502 |
| 1231.352 | 169.6152 | 0.004 | 0.037626 | 9406.893 | 24.34402 |
| 1568.455 | 163.5796 | 0.005 | 0.043433 | 8687.255 | 24.33382 |
| 1918.699 | 170.3661 | 0.005999 | 0.047331 | 7889.106 | 24.3215 |
| 2252.13 | 159.8179 | 0.007 | 0.051823 | 7403.779 | 24.30519 |
| 2612.54 | 177.9512 | 0.007999 | 0.057685 | 7211.071 | 24.29726 |
| 2936.712 | 160.6211 | 0.009 | 0.062118 | 6902.373 | 24.28915 |
| 3295.992 | 171.1211 | 0.01 | 0.064126 | 6412.763 | 24.27458 |
| 3597.15 | 128.2251 | 0.02 | 0.092396 | 4619.882 | 24.25913 |
| 4042.2 | 229.9225 | 0.03 | 0.10485 | 3495.2 | 24.255 |
| 4378.645 | 222.3726 | 0.04 | 0.116145 | 2901.581 | 24.25081 |
| | | Experiment 4 | | | |
| 490.5468 | 158.3071 | 0.003 | 0.022 | 7389.631 | 25.442 |
| 827.9073 | 170.3671 | 0.004 | 0.030 | 7500.708 | 25.439 |
| 1171.431 | 188.4761 | 0.005 | 0.036 | 7137.284 | 25.436 |
| 1495.644 | 184.6967 | 0.006 | 0.041 | 6785.400 | 25.432 |
| 1822.169 | 186.2629 | 0.007 | 0.045 | 6362.919 | 25.433 |
| 2139.021 | 177.9095 | 0.008 | 0.049 | 6079.621 | 25.427 |
| 2443.784 | 157.5517 | 0.009 | 0.051 | 5709.304 | 25.429 |
| 2761.514 | 150.0158 | 0.010 | 0.054 | 5363.171 | 25.425 |
| 3085.142 | 148.5072 | 0.020 | 0.078 | 3910.088 | 25.430 |
| | | Experiment 5 | | | |
| 235.1571 | 230.6667 | 0.003 | 0.036406 | 12482.47 | 25.43556 |
| 593 | 264.5789 | 0.004 | 0.047489 | 10763.29 | 25.44132 |
| 868.4048 | 216.344 | 0.005 | 0.059504 | 9594.784 | 25.43786 |
| 1173.36 | 198.2554 | 0.006 | 0.067488 | 8734.823 | 25.4411 |
| 1505.057 | 206.5455 | 0.007 | 0.112138 | 8068.282 | 25.43707 |
| 1812.352 | 189.9619 | 0.008 | 0.138133 | 7531.927 | 25.44114 |
| 2161.75 | 214.8309 | 0.009 | 0.156426 | 7088.642 | 25.43809 |
| 2490.416 | 220.1079 | 0.010 | 0.198 | 6714.38 | 25.43461 |
| 2769.027 | 174.9138 | 0.020 | 0.327649 | 4698.508 | 25.43937 |
| | | Average | | | |
| | | 0.003 | | 9994.482 | |
| | | 0.004 | | 9347.987 | |
| | | 0.005 | | 8576.727 | |
| | | 0.006 | | 7936.385 | |
| | | 0.007 | | 7500 | |
| | | 0.008 | | 6860.667 | |
| | | 0.009 | | 6501.39 | |
| | | 0.010 | | 6028.712 | |
| | | 0.020 | | 4379.932 | |
| | | 0.030 | | 3495.2 | |
| | | 0.040 | | 2901.581 | |

Note:
t = time; s = seconds; Á in 1/s = shear rate; f in mPas = viscosity (cp); T = temperature

TABLE 2

Rheology testing of Xanthan Gum alone (0.2% w/w) - high end rheology

| Á in 1/s | , in Pa | f in mPas | T in ° C. |
|---|---|---|---|
| 100 | 5.95172 | 59.51756 | 25.45049 |
| 200 | 8.006271 | 40.03146 | 25.45444 |
| 300 | 9.4824 | 31.60858 | 25.45033 |
| 400 | 10.9991 | 27.49701 | 25.45063 |
| 500 | 12.84425 | 25.69 | 25.452 |
| 600 | 14.10945 | 23.51567 | 25.45669 |
| 700 | 15.37769 | 21.968 | 25.45423 |
| 800 | 16.54439 | 20.68123 | 25.45289 |
| 900 | 17.73983 | 19.71034 | 25.45538 |
| 1000 | 18.50234 | 18.50234 | 25.45584 |
| 1100 | 19.1495 | 17.40844 | 25.45469 |
| 1200 | 19.99728 | 16.66422 | 25.45116 |
| 1300 | 20.79256 | 15.99453 | 25.45427 |
| 1400 | 21.64892 | 15.46331 | 25.45701 |
| 1500 | 22.6648 | 15.1098 | 25.4521 |
| 1600 | 23.85268 | 14.90756 | 25.45827 |
| 1700 | 25.15163 | 14.79523 | 25.45261 |
| 1800 | 26.35965 | 14.64358 | 25.44775 |
| 1900 | 27.64196 | 14.54843 | 25.4515 |

TABLE 3

Rheology testing of PHPA alone (0.25% w/w)

| t in s | t_seg in s | Á in 1/s | , in Pa | f in mPas | T in ° C. |
|---|---|---|---|---|---|
| 107.7706 | 101.5268 | 0.003 | 0.01425 | 4750.643 | 25.44318 |
| 352.5921 | 120.9838 | 0.005 | 0.025276 | 5055.539 | 25.44274 |
| 573.1704 | 116.62 | 0.007 | 0.034687 | 4955.35 | 25.44337 |
| 813.9237 | 131.3046 | 0.01 | 0.040588 | 4058.73 | 25.44522 |
| 1019.827 | 113.0046 | 0.03 | 0.090315 | 3010.492 | 25.44014 |
| 1254.35 | 122.6273 | 0.05 | 0.125148 | 2503.137 | 25.44601 |
| 1481.369 | 124.1348 | 0.07 | 0.152777 | 2183.238 | 25.44547 |
| 1704.5 | 122.1268 | 0.1 | 0.185956 | 1859.781 | 25.44294 |
| 1933.5 | 126.1448 | 0.3 | 0.371764 | 1239.141 | 25.44155 |
| 2163.18 | 130.6688 | 0.5 | 0.474849 | 949.7043 | 25.44157 |
| 2366.37 | 108.5587 | 0.7 | 0.557626 | 796.6484 | 25.44208 |
| 2585.405 | 102.5287 | 1 | 0.655151 | 655.1506 | 25.44145 |
| 1451.338 | 146.2434 | 3 | 0.988328 | 329.4421 | 25.44251 |
| 1815.698 | 186.2013 | 5 | 1.196513 | 239.3075 | 25.4479 |
| 2105.376 | 150.768 | 7 | 1.356107 | 193.7279 | 25.44322 |
| 2416.011 | 136.4466 | 10 | 1.540553 | 154.0563 | 25.44704 |
| 2761.387 | 156.7964 | 30 | 2.314417 | 77.14682 | 25.44316 |
| 3050.73 | 121.3896 | 50 | 2.822095 | 56.44243 | 25.44319 |
| 3417.713 | 163.5846 | 70 | 3.241367 | 46.30508 | 25.44587 |
| 3742.533 | 163.6068 | 100 | 3.77484 | 37.74888 | 25.44478 |
| 4094.961 | 188.4587 | 300 | 6.27974 | 20.93255 | 25.44617 |
| 4400.885 | 169.6095 | 500 | 8.249778 | 16.4996 | 25.44021 |
| 4713.323 | 157.5546 | 700 | 9.99863 | 14.28381 | 25.44267 |
| 5010.411 | 129.6651 | 1000 | 12.56722 | 12.56734 | 25.44282 |
| 5355.619 | 150.0158 | 1300 | 18.16979 | 13.97695 | 25.44224 |
| 5668.459 | 137.9547 | 1500 | 21.34214 | 14.2278 | 25.44098 |
| 6033.049 | 177.9057 | 1700 | 24.68356 | 14.51982 | 25.44379 |
| 6324.326 | 143.9813 | 1900 | 28.17431 | 14.82875 | 25.44117 |

TABLE 4

Rheology testing of Pac-LV alone (1.6% w/w)

| Á in 1/s | SS, in Pa | f in mPas | T in ° C. |
|---|---|---|---|
| 0.020007 | 0.010372 | 518.4099 | 25.73079 |
| 0.030009 | 0.014007 | 466.7756 | 25.62659 |
| 0.040007 | 0.016334 | 408.2933 | 25.57672 |
| 0.050009 | 0.019019 | 380.3237 | 25.5539 |
| 0.06001 | 0.021323 | 355.3221 | 25.54192 |
| 0.070008 | 0.021295 | 304.1721 | 25.53106 |
| 0.080011 | 0.016075 | 200.907 | 25.52544 |
| 0.459763 | 0.011574 | 23.64457 | 25.4672 |
| 0.668286 | 0.007743 | 10.23025 | 25.38908 |
| 0.849162 | 0.033114 | 39.00379 | 25.35123 |
| 1 | 0.038164 | 38.16574 | 25.34311 |
| 2.626433 | 0.053563 | 20.85174 | 25.33333 |
| 4 | 0.062769 | 15.69367 | 25.31333 |
| 5 | 0.074606 | 14.92238 | 25.31946 |
| 5.999844 | 0.087957 | 14.66306 | 25.31014 |
| 6.945159 | 0.098164 | 14.15088 | 25.29633 |
| 8.481502 | 0.095877 | 11.26925 | 25.30105 |
| 9.456285 | 0.108751 | 11.48205 | 25.29609 |
| 14.61302 | 0.17788 | 11.85501 | 25.27487 |
| 24.1749 | 0.28362 | 11.59703 | 25.27596 |
| 34.25049 | 0.428225 | 12.43685 | 25.26394 |
| 43.72733 | 0.51305 | 11.68389 | 25.25783 |
| 60 | 0.731994 | 12.20012 | 25.26196 |
| 70 | 0.847187 | 12.10268 | 25.25358 |
| 80 | 0.97168 | 12.14701 | 25.24299 |
| 89.99991 | 1.091212 | 12.12434 | 25.24478 |
| 99.99994 | 1.224221 | 12.24233 | 25.23975 |
| 200 | 2.440153 | 12.20127 | 25.237 |
| 300 | 3.673347 | 12.24493 | 25.22987 |
| 400 | 4.925526 | 12.31526 | 25.21442 |
| 499.9988 | 6.2005 | 12.40194 | 25.19525 |
| 599.9409 | 7.509364 | 12.51669 | 25.19221 |
| 699.9 | 8.830963 | 12.61706 | 25.17423 |
| 799.9 | 10.18035 | 12.72682 | 25.16543 |
| 899.9 | 11.57769 | 12.8651 | 25.15173 |
| 999.9 | 12.98921 | 12.9909 | 25.14644 |
| 1100 | 14.43265 | 13.12291 | 25.1406 |
| 1200 | 15.90573 | 13.25667 | 25.14347 |
| 1300 | 17.41738 | 13.39953 | 25.15916 |
| 1400 | 18.96351 | 13.54608 | 25.16763 |
| 1500 | 20.54171 | 13.69547 | 25.1794 |
| 1600 | 22.13862 | 13.8377 | 25.17908 |
| 1700 | 23.775 | 13.98625 | 25.17646 |
| 1800 | 25.43597 | 14.13229 | 25.17583 |
| 1900 | 27.06514 | 14.24557 | 25.18771 |
| 1900 | 27.07751 | 14.25203 | 25.18802 |
| 2000 | 34.73916 | 17.3715 | 25.17178 |
| 2100 | 36.89519 | 17.5724 | 25.10413 |
| 2199.935 | 39.12565 | 17.78812 | 25.07266 |
| 2299.008 | 41.30244 | 17.96142 | 25.05472 |
| 2399 | 47.26972 | 19.70113 | 25.03423 |
| 2499 | 46.6228 | 18.65602 | 24.92247 |
| 2599 | 47.37625 | 18.22975 | 24.87633 |
| 2699 | 48.55631 | 17.99369 | 24.79274 |

TABLE 5

Rheology testing of 0.18% XG/0.05% PHPA/0.02% Pac-LV

| t in s | t_seg in s | Á in 1/s | , in Pa | f in mPas | T in ° C. |
|---|---|---|---|---|---|
| 257.2791 | 241.2232558 | 0.001 | 0.014568 | 14572.09 | 24.55651 |
| 558.1933 | 206.5460674 | 0.002 | 0.028531 | 14268.65 | 24.53449 |
| 881.49 | 192.2266667 | 0.003 | 0.041935 | 13979.56 | 24.50322 |
| 1219.795 | 192.2284091 | 0.004 | 0.056265 | 14067.84 | 24.47136 |
| 1532.676 | 166.5985294 | 0.005 | 0.069336 | 13867.79 | 24.44015 |
| 1881.521 | 178.6570548 | 0.006 | 0.081716 | 13619.66 | 24.40219 |
| 2213.193 | 173.3825185 | 0.007 | 0.087956 | 12565.41 | 24.36874 |
| 2537.211 | 160.5670423 | 0.008 | 0.09228 | 11535.7 | 24.33845 |
| 2885.799 | 171.8720863 | 0.009 | 0.100017 | 11115.4 | 24.31504 |
| 3213.194 | 162.0735484 | 0.01 | 0.106758 | 10671.45 | 24.28944 |

TABLE 5-continued

Rheology testing of 0.18% XG/0.05% PHPA/0.02% Pac-LV

| t in s | t_seg in s | Á in 1/s | , in Pa | f in mPas | T in ° C. |
|---|---|---|---|---|---|
| 3537.953 | 150.015 | 0.02 | 0.1508 | 7540.647 | 24.26327 |
| 3891.994 | 168.1083117 | 0.03 | 0.179974 | 5997.955 | 24.23532 |
| 4273.279 | 211.8221154 | 0.04 | 0.197308 | 4932.212 | 24.20587 |
| 4575.615 | 176.3940559 | 0.049998 | 0.219587 | 4391.231 | 24.18622 |
| 4904.554 | 167.3490286 | 0.059997 | 0.25108 | 4185.989 | 24.17211 |
| 5254.425 | 178.6574167 | 0.069999 | 0.275692 | 3938.508 | 24.15908 |
| 5641.901 | 227.6549451 | 0.079998 | 0.275813 | 3447.604 | 24.14099 |
| 5946.971 | 193.7321014 | 0.089998 | 0.304768 | 3386.37 | 24.12399 |
| 6272.598 | 180.3106557 | 0.099995 | 0.31727 | 3172.918 | 24.10926 |
| 6576.765 | 146.9991912 | 0.2 | 0.433353 | 2166.912 | 24.09757 |
| 6926.864 | 159.0803704 | 0.3 | 0.505136 | 1683.778 | 24.08549 |
| 7297.4 | 189.9672414 | 0.4 | 0.562552 | 1406.469 | 24.07207 |
| 7600.624 | 154.5349438 | 0.5 | 0.612534 | 1224.994 | 24.0623 |
| 7940.526 | 156.04875 | 0.6 | 0.653 | 1088.365 | 24.05313 |
| 8281.61 | 159.0593023 | 0.7 | 0.686581 | 980.8483 | 24.04256 |
| 8625.111 | 162.8308187 | 0.8 | 0.718585 | 898.2205 | 24.00415 |
| 8946.011 | 145.4926966 | 0.9 | 0.747393 | 830.4461 | 23.96742 |
| 9271.513 | 131.9245625 | 1 | 0.771613 | 771.585 | 23.94938 |
| 9635.086 | 156.8016 | 2 | 0.982154 | 491.0886 | 23.89423 |
| 9964.052 | 146.2451852 | 3 | 1.121007 | 373.6674 | 23.83326 |
| 10315.78 | 159.8129814 | 4 | 1.225739 | 306.4447 | 23.80416 |
| 10645.65 | 150.7680745 | 5 | 1.312752 | 262.5497 | 23.7787 |
| 10990.96 | 156.7979641 | 6 | 1.390814 | 231.803 | 23.71796 |
| 11305.44 | 130.4188125 | 7 | 1.460288 | 208.6144 | 23.67938 |
| 11681.07 | 166.5971429 | 8 | 1.517007 | 189.6279 | 23.66321 |
| 12016.12 | 162.8238776 | 9 | 1.569374 | 174.3789 | 23.62293 |
| 12355.78 | 162.8247619 | 10 | 1.622401 | 162.2415 | 23.5685 |
| 9636.601 | 158.3083916 | 2 | 0.982699 | 491.3545 | 23.89427 |
| 9976.87 | 159.0580137 | 3 | 1.120582 | 373.5219 | 23.83171 |
| 10300.71 | 144.7368085 | 4 | 1.225851 | 306.4759 | 23.80461 |
| 10641.14 | 146.2453293 | 5 | 1.31285 | 262.5677 | 23.77928 |
| 11005.31 | 171.119 | 6 | 1.390931 | 231.8238 | 23.71575 |
| 11306.19 | 131.1734694 | 7 | 1.460374 | 208.6252 | 23.67905 |
| 11681.07 | 166.5971429 | 8 | 1.517007 | 189.6279 | 23.66321 |
| 12010.84 | 157.5475325 | 9 | 1.569409 | 174.3818 | 23.62383 |
| 12350.52 | 157.5485065 | 10 | 1.622357 | 162.237 | 23.56942 |
| 12645.45 | 111.7234821 | 20 | 2.026688 | 101.3375 | 23.54152 |
| 12850.24 | 97.70502994 | 30 | 2.316222 | 77.20832 | 23.53455 |
| 13075.48 | 102.2216774 | 40 | 2.549497 | 63.73723 | 23.52213 |
| 13280.48 | 88.205 | 50 | 2.744 | 54.87982 | 23.4897 |
| 13495.49 | 82.32736842 | 60 | 2.911564 | 48.52594 | 23.44812 |
| 13735.49 | 104.0381203 | 70 | 3.066594 | 43.80752 | 23.41887 |
| 13940.48 | 84.58785542 | 80 | 3.211596 | 40.14536 | 23.40843 |
| 14160.21 | 85.03937931 | 90 | 3.348386 | 37.20497 | 23.40469 |
| 14390.53 | 94.99034921 | 100 | 3.473566 | 34.73577 | 23.38794 |
| 14605.45 | 90.01429487 | 200 | 4.559083 | 22.79526 | 23.35583 |
| 14825.32 | 90.05602564 | 300 | 5.400359 | 18.00109 | 23.32064 |
| 15040.12 | 85.04228144 | 400 | 6.179952 | 15.45042 | 23.30419 |
| 15260.49 | 85.49278689 | 500 | 6.931344 | 13.86262 | 23.29672 |
| 15471.27 | 74.63599229 | 600 | 7.66488 | 12.77452 | 23.29801 |
| 15710.49 | 93.63423611 | 700 | 8.347063 | 11.92438 | 23.28104 |
| 15925.77 | 91.82448718 | 800 | 9.062776 | 11.3284 | 23.24885 |
| 16135.77 | 81.92211538 | 900 | 9.782295 | 10.86917 | 23.22218 |
| 16355.49 | 82.3293985 | 1000 | 10.52128 | 10.52128 | 23.20714 |
| 16585.49 | 94.08443609 | 1100 | 11.28917 | 10.26286 | 23.20165 |
| 16795.45 | 83.69794872 | 1200 | 12.09808 | 10.08192 | 23.20359 |
| 17040.59 | 107.7230693 | 1300 | 12.97723 | 9.982485 | 23.18911 |
| 17235.11 | 82.78995506 | 1400 | 14.26961 | 10.19225 | 23.1591 |
| 17455.58 | 83.6825641 | 1500 | 16.09474 | 10.72987 | 23.13083 |
| 17690.57 | 99.51292683 | 1600 | 17.83577 | 11.14789 | 23.11675 |
| 17895.3 | 83.79567164 | 1700 | 19.57164 | 11.51276 | 23.11149 |
| 18095.49 | 64.23449624 | 1800 | 21.2515 | 11.80594 | 23.11226 |
| 18350.49 | 98.15423611 | 1900 | 22.93319 | 12.07042 | 23.11764 |

Figure 5:
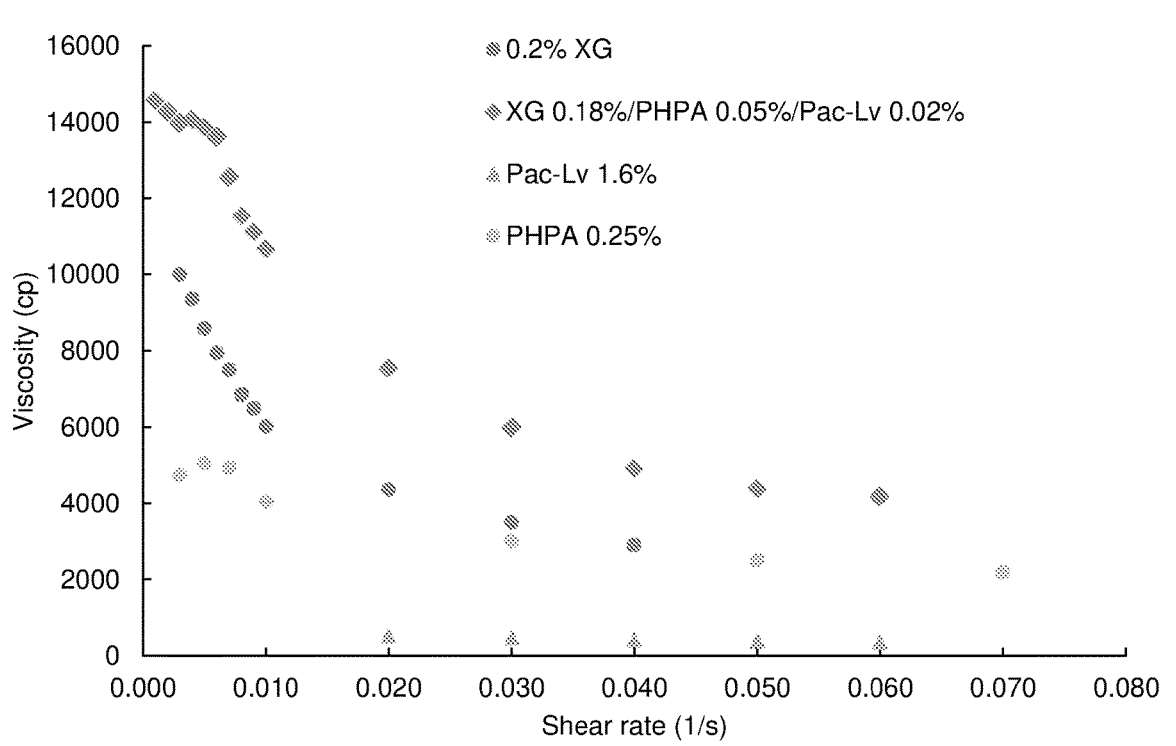
FIG. 5—is a graph of the results of rheology testing (low shear rate range) of a drilling fluid according to an embodiment of the present invention (0.18% XG/0.05% PHPA/0.02% Pac-LV) compared to the individual components of the drilling fluid alone.

As can be seen from FIG. 5, the drilling fluid formulation of 0.18% w/w xanthan gum/0.05% w/w PHPA/0.02% Pac-LV demonstrated surprising superior low end rheology (increased viscosity under low shear rates) compared to xanthan gum, PHPA and Pac-LV alone. For example, at any given shear rate, the viscosity of the XG/PHPA/Pac-LV formulation was higher than a fluid comprising XG, PHPA or Pac-LV alone. Specifically, when the shear rate of the XG/PHPA/Pac-LV formulation is less than about 0.01 1/s, the viscosity of the formulation is about 10000 cp or higher. Indeed, while the fluid comprising XG alone was the next best performing fluid with respect to low end rheology, the viscosity of the fluid was only 6028 cp at a shear rate of 0.01 1/s. In contrast, the viscosity of the XG/PHPA/Pac-LV formulation was 10671 cp at a shear rate of 0.01 1/s.

Figure 6:
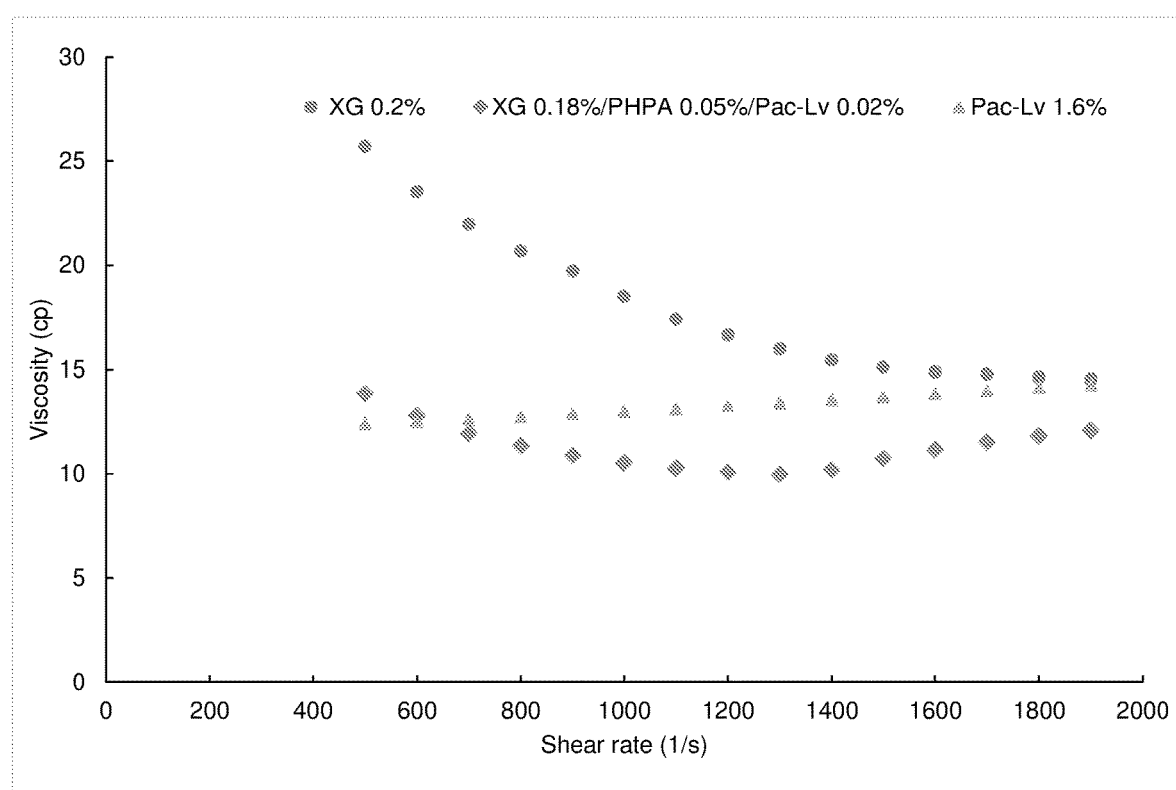
FIG. 6—is a graph of the results of rheology testing (high shear rate range) of a drilling fluid according to an embodiment of the present invention (0.18% XG/0.05% PHPA/0.02% Pac-LV) compared to the individual components of the drilling fluid alone.

Furthermore, as can be seen from FIG. 6, the high end rheology of the XG/PHPA/Pac-LV formulation was also surprisingly superior (i.e. decreased viscosity under high shear rates) compared to the individual components of the drilling fluid alone. For example, at shear rates beyond 1000 1/s, the viscosity of the XG/PHPA/Pac-LV formulation was lower than a fluid comprising XG or Pac-LV alone. Specifically, when the shear rate of the XG/PHPA/Pac-LV formulation is about 1000 1/s or more, the viscosity of the formulation is about 12 cp or lower. Indeed, while the fluid comprising Pac-LV alone was the next best performing fluid with respect to high end rheology, the viscosity of the fluid was not less than about 13 cp at shear rates above 1000 1/s.

Additional polymers were added to the core XG/PHPA/Pac-LV formulation and the results of the rheology testing are presented in Tables 6 to 9 below, and in FIGS. 7 to 9.

TABLE 6

| Rheology testing of Guar Gum alone (0.375% w/w) | | | | | |
|---|---|---|---|---|---|
| t in s | t_seg in s | Á in 1/s | , in Pa | f in mPas | T in ° C. |
| 299.7676 | 88.65826 | 0.003 | 0.002016 | 672.1632 | 25.44973 |
| 513.5688 | 97.28365 | 0.004 | 0.002087 | 521.7447 | 25.44912 |
| 703.291 | 81.99679 | 0.005 | 0.002175 | 435.1287 | 25.45258 |
| 919.4851 | 93.18149 | 0.006 | 0.002213 | 368.8731 | 25.4456 |
| 1126.535 | 94.99615 | 0.007 | 0.002268 | 323.9925 | 25.44374 |
| 1330.661 | 94.08836 | 0.008 | 0.002357 | 294.7028 | 25.44424 |
| 1539.321 | 97.24978 | 0.009 | 0.002191 | 243.4842 | 25.44755 |
| 1742.644 | 95.44314 | 0.009999 | 0.001763 | 176.3521 | 25.45064 |
| 1948.59 | 96.79907 | 0.02 | 0.002763 | 138.1464 | 25.44918 |
| 2146.774 | 90.47497 | 0.029999 | 0.004045 | 134.8264 | 25.44365 |
| 2354.055 | 96.80006 | 0.039999 | 0.004791 | 119.7775 | 25.44337 |
| 2556.24 | 94.08474 | 0.049998 | 0.005561 | 111.2287 | 25.44415 |
| 2761.989 | 94.55209 | 0.059997 | 0.007725 | 128.7644 | 25.44697 |
| 2972.606 | 99.96644 | 0.069998 | 0.013272 | 189.6091 | 25.45288 |
| 3171.645 | 93.63157 | 0.079998 | 0.016831 | 210.394 | 25.45042 |
| 3571.244 | 82.77871 | 0.099995 | 0.014783 | 147.8396 | 25.44799 |
| 3775.954 | 82.32425 | 0.2 | 0.036457 | 182.2935 | 25.44451 |
| 4002.293 | 103.5846 | 0.3 | 0.051676 | 172.26 | 25.45533 |
| 4192.349 | 88.6568 | 0.4 | 0.069199 | 173.0024 | 25.45337 |
| 4394.466 | 85.53905 | 0.5 | 0.085247 | 170.4932 | 25.45095 |
| 4615.028 | 100.4158 | 0.6 | 0.100448 | 167.4214 | 25.44903 |
| 4822.253 | 102.6799 | 0.7 | 0.114886 | 164.1313 | 25.44488 |
| 5017.542 | 92.73056 | 0.8 | 0.130221 | 162.7705 | 25.448 |
| 5222.455 | 92.27659 | 0.9 | 0.144521 | 160.5862 | 25.45533 |
| 5455.229 | 34.53922 | 2 | 0.297035 | 148.5018 | 25.44818 |
| 5539.458 | 33.14497 | 3.000006 | 0.417603 | 139.1933 | 25.44743 |
| 5628.273 | 36.9492 | 4 | 0.52774 | 131.942 | 25.4462 |
| 5713.538 | 36.26609 | 5.000006 | 0.629563 | 125.9133 | 25.44335 |
| 5795.683 | 32.99786 | 5.999994 | 0.725806 | 120.9628 | 25.45233 |
| 5881.649 | 33.93407 | 7 | 0.816569 | 116.6494 | 25.44816 |
| 6050.279 | 31.50598 | 9 | 0.982658 | 109.1863 | 25.45132 |
| 6140.643 | 36.94825 | 10 | 1.06076 | 106.076 | 25.45143 |
| 6223.578 | 34.03928 | 20 | 1.709434 | 85.47168 | 25.45029 |
| 6305.122 | 30.4733 | 30 | 2.208132 | 73.60462 | 25.45365 |
| 6397.096 | 36.56265 | 40 | 2.619288 | 65.48333 | 25.44756 |
| 6477.119 | 31.67395 | 50 | 2.982571 | 59.65164 | 25.44384 |
| 6566.639 | 34.83847 | 60 | 3.308657 | 55.1444 | 25.4459 |
| 6906.978 | 32.84885 | 100 | 4.391287 | 43.91326 | 25.44773 |
| 6994.189 | 35.18037 | 200 | 6.249366 | 31.24671 | 25.44549 |
| 7082.653 | 34.38684 | 300 | 7.667533 | 25.5588 | 25.44683 |
| 7169.744 | 36.0465 | 400 | 8.924131 | 22.31031 | 25.446 |
| 7250.133 | 30.61667 | 500 | 10.08408 | 20.16781 | 25.45138 |
| 7339.766 | 34.68908 | 600 | 11.17042 | 18.6182 | 25.4512 |
| 7422.572 | 31.97644 | 700 | 12.26102 | 17.51428 | 25.45203 |
| 7510.647 | 34.38786 | 800 | 13.33329 | 16.66719 | 25.45299 |
| 7592.56 | 30.7679 | 900 | 14.38819 | 15.98689 | 25.44482 |
| 7681.743 | 34.38684 | 1000 | 15.48174 | 15.48186 | 25.44485 |
| 7762.688 | 29.86416 | 1100 | 16.56543 | 15.0594 | 25.44221 |
| 7854.154 | 35.74397 | 1200 | 17.66949 | 14.72462 | 25.4475 |
| 7941.253 | 37.2512 | 1300 | 18.76753 | 14.4366 | 25.4516 |
| 8022.164 | 32.60966 | 1400 | 19.95328 | 14.25268 | 25.44962 |
| 8112.201 | 34.63348 | 1500 | 21.12462 | 14.08343 | 25.44396 |
| 8193.188 | 30.46523 | 1600 | 22.26807 | 13.91721 | 25.44802 |
| 8282.131 | 33.63264 | 1700 | 23.46801 | 13.80528 | 25.45017 |
| 8366.148 | 31.97583 | 1800 | 24.60033 | 13.66694 | 25.44503 |
| 8454.146 | 34.38813 | 1900 | 25.61398 | 13.48081 | 25.44935 |

TABLE 7

Rheology testing of 0.18% XG/0.05% PHPA/0.02% Pac-LV/0.02% GG

| t in s | t_seg in s | Á in 1/s | , in Pa | f in mPas | T in ° C. |
|---|---|---|---|---|---|
| 490.4221 | 159.8121379 | 0.003 | 0.045 | 15075.793 | 25.437 |
| 822.3254 | 166.595 | 0.004 | 0.057 | 14227.887 | 25.433 |
| 1148.429 | 168.1035714 | 0.005 | 0.068 | 13652.286 | 25.430 |
| 1475.27 | 169.6130159 | 0.006 | 0.076 | 12735.873 | 25.438 |
| 1819.548 | 188.4541481 | 0.007 | 0.082 | 11681.481 | 25.438 |
| 2131.951 | 175.6446479 | 0.008 | 0.085 | 10607.676 | 25.425 |
| 2453.924 | 172.6462879 | 0.009 | 0.087 | 9660.886 | 25.434 |
| 2779.025 | 173.4107563 | 0.010 | 0.090 | 9014.420 | 25.438 |
| 3090.763 | 158.3066187 | 0.020 | 0.128 | 6417.633 | 25.443 |

TABLE 8

Rheology testing of Pac-RV alone (0.275% w/w)

| t in s | t_seg in s | Á in 1/s | , in Pa | f in mPas | T in ° C. |
|---|---|---|---|---|---|
| 307.3168 | 96.84746 | 0.003 | −0.00353 | −1176.87 | 25.4473 |
| 515.4927 | 99.96404 | 0.004 | −0.00256 | −640.474 | 25.45298 |
| 718.4363 | 97.70391 | 0.005 | −0.00014 | −27.0654 | 25.45006 |
| 921.9448 | 95.89552 | 0.006 | 0.003014 | 502.374 | 25.44624 |
| 1125.774 | 94.53877 | 0.007 | 0.007375 | 1053.588 | 25.44621 |
| 1330.756 | 93.14878 | 0.008 | 0.005702 | 712.7273 | 25.4487 |
| 1537.388 | 95.45569 | 0.009 | −0.00035 | −39.2672 | 25.45559 |
| 1744.006 | 96.80323 | 0.009999 | −1.28E−05 | −1.27641 | 25.44784 |
| 1957.741 | 105.3908 | 0.02 | 0.003062 | 153.1211 | 25.44657 |
| 2155.304 | 99.61646 | 0.029998 | 0.001839 | 61.30447 | 25.45037 |
| 2356.665 | 93.63511 | 0.04 | 0.006701 | 167.521 | 25.45182 |
| 2569.994 | 101.775 | 0.049998 | 0.012804 | 256.0873 | 25.45024 |
| 2778.443 | 104.9386 | 0.059999 | 0.009522 | 158.7107 | 25.44966 |
| 2977.393 | 98.60759 | 0.069998 | 0.003088 | 44.12083 | 25.44979 |
| 3176.882 | 92.72927 | 0.079998 | 0.00079 | 9.869708 | 25.45022 |
| 3587.439 | 92.72915 | 0.099994 | 0.008507 | 85.07768 | 25.44262 |
| 3792.305 | 92.27461 | 0.2 | 0.010185 | 50.92509 | 25.44766 |
| 4002.631 | 97.24994 | 0.3 | 0.0191 | 63.66794 | 25.449 |
| 4204.989 | 94.09583 | 0.4 | 0.023753 | 59.38326 | 25.44726 |
| 4413.298 | 96.79867 | 0.5 | 0.028683 | 57.36541 | 25.45099 |
| 4620.989 | 99.05944 | 0.6 | 0.035334 | 58.89067 | 25.44683 |
| 4824.096 | 96.8012 | 0.7 | 0.040077 | 57.25311 | 25.44814 |
| 5028.166 | 95.89369 | 0.8 | 0.044889 | 56.11059 | 25.45449 |
| 5545.942 | 31.65523 | 3 | 0.152672 | 50.89704 | 25.44799 |
| 5629.755 | 30.01477 | 4.000005 | 0.20252 | 50.6291 | 25.4488 |
| 5716.615 | 31.20863 | 5 | 0.25051 | 50.10594 | 25.44656 |
| 5802.909 | 31.95433 | 6 | 0.298561 | 49.75888 | 25.44807 |
| 5886.239 | 29.86617 | 7 | 0.344597 | 49.22876 | 25.45234 |
| 5975.418 | 33.44381 | 8 | 0.391249 | 48.90638 | 25.44763 |
| 6058.557 | 31.20766 | 9 | 0.437557 | 48.62104 | 25.45167 |
| 6142.701 | 29.86752 | 10 | 0.483657 | 48.36522 | 25.45055 |
| 6233.518 | 35.0799 | 20 | 0.912163 | 45.60892 | 25.45578 |
| 6316.12 | 32.57898 | 30 | 1.302967 | 43.43158 | 25.45322 |
| 6402.667 | 32.99556 | 40 | 1.661572 | 41.53883 | 25.44883 |
| 6489.453 | 34.18814 | 50 | 1.991331 | 39.82698 | 25.44436 |
| 6574.833 | 33.88996 | 60 | 2.295247 | 38.25362 | 25.44678 |
| 6663.096 | 36.56284 | 70 | 2.578686 | 36.83942 | 25.44577 |
| 7002.669 | 34.23633 | 200 | 5.414783 | 27.07428 | 25.45108 |
| 7088.653 | 34.03811 | 300 | 7.100977 | 23.67006 | 25.44948 |
| 7175.994 | 35.68743 | 400 | 8.590309 | 21.47562 | 25.44877 |
| 7257.897 | 30.76142 | 500 | 9.973277 | 19.94662 | 25.45282 |
| 7343.279 | 30.46171 | 600 | 11.28949 | 18.81604 | 25.44919 |
| 7430.143 | 31.65476 | 700.0005 | 12.54799 | 17.92577 | 25.45079 |
| 7516.478 | 32.40105 | 800 | 13.76973 | 17.21136 | 25.45168 |
| 7601.141 | 31.82328 | 900 | 14.96353 | 16.62663 | 25.45397 |
| 7691.179 | 35.67631 | 1000 | 16.14019 | 16.14025 | 25.44926 |
| 7775.94 | 34.78183 | 1100 | 17.29935 | 15.72702 | 25.44815 |
| 7857.694 | 31.22196 | 1200 | 18.44269 | 15.36892 | 25.45226 |
| 7948.693 | 36.49739 | 1300 | 19.57353 | 15.05712 | 25.44771 |
| 8031.598 | 33.14674 | 1400 | 20.69469 | 14.78106 | 25.45156 |
| 8119.538 | 35.74481 | 1500 | 21.80744 | 14.53925 | 25.44919 |
| 8200.158 | 30.61753 | 1600 | 22.90684 | 14.31791 | 25.45133 |
| 8292.35 | 36.41581 | 1700 | 24.00229 | 14.11968 | 25.45229 |
| 8372.104 | 30.77018 | 1800 | 25.09366 | 13.94049 | 25.44738 |
| 8450.471 | 23.22958 | 1900 | 26.18071 | 13.77961 | 25.44948 |

TABLE 9

Rheology testing of 0.18% XG/0.05% PHPA/0.02% Pac-LV/0.02% GG/0.01% Pac-RV

| t in s | t_seg in s | Á in 1/s | , in Pa | f in mPas | T in ° C. |
|---|---|---|---|---|---|
| 257.2791 | 241.2233 | 0.001 | 0.014568 | 14572.09 | 24.55651 |
| 558.1933 | 206.5461 | 0.002 | 0.028531 | 14268.65 | 24.53449 |
| 881.49 | 192.2267 | 0.003 | 0.041935 | 13979.56 | 24.50322 |
| 1219.795 | 192.2284 | 0.004 | 0.056265 | 14067.84 | 24.47136 |
| 1532.676 | 166.5985 | 0.005 | 0.069336 | 13867.79 | 24.44015 |
| 1881.521 | 178.6571 | 0.006 | 0.081716 | 13619.66 | 24.40219 |
| 2213.193 | 173.3825 | 0.007 | 0.087956 | 12565.41 | 24.36874 |
| 2537.211 | 160.567 | 0.008 | 0.09228 | 11535.7 | 24.33845 |
| 2885.799 | 171.8721 | 0.009 | 0.100017 | 11115.4 | 24.31504 |
| 3213.194 | 162.0735 | 0.01 | 0.106758 | 10671.45 | 24.28944 |
| 3537.953 | 150.015 | 0.02 | 0.1508 | 7540.647 | 24.26327 |
| 3891.994 | 168.1083 | 0.03 | 0.179974 | 5997.955 | 24.23532 |
| 4273.279 | 211.8221 | 0.04 | 0.197308 | 4932.212 | 24.20587 |
| 4575.615 | 176.3941 | 0.049998 | 0.219587 | 4391.231 | 24.18622 |
| 4904.554 | 167.349 | 0.059997 | 0.25108 | 4185.989 | 24.17211 |
| 5254.425 | 178.6574 | 0.069999 | 0.275692 | 3938.508 | 24.15908 |
| 5641.901 | 227.6549 | 0.079998 | 0.275813 | 3447.604 | 24.14099 |
| 5946.971 | 193.7321 | 0.089998 | 0.304768 | 3386.37 | 24.12399 |
| 6272.598 | 180.3107 | 0.099995 | 0.31727 | 3172.918 | 24.10926 |
| 6576.765 | 146.9992 | 0.2 | 0.433353 | 2166.912 | 24.09757 |
| 6926.864 | 159.0804 | 0.3 | 0.505136 | 1683.778 | 24.08549 |
| 7297.4 | 189.9672 | 0.4 | 0.562552 | 1406.469 | 24.07207 |
| 7600.624 | 154.5349 | 0.5 | 0.612534 | 1224.994 | 24.0623 |
| 7940.526 | 156.0488 | 0.6 | 0.653 | 1088.365 | 24.05313 |
| 8281.61 | 159.0593 | 0.7 | 0.686581 | 980.8483 | 24.04256 |
| 8625.111 | 162.8308 | 0.8 | 0.718585 | 898.2205 | 24.00415 |
| 8946.011 | 145.4927 | 0.9 | 0.747393 | 830.4461 | 23.96742 |
| 9271.513 | 131.9246 | 1 | 0.771613 | 771.585 | 23.94938 |
| 9635.086 | 156.8016 | 2 | 0.982154 | 491.0886 | 23.89423 |
| 9964.052 | 146.2452 | 3 | 1.121007 | 373.6674 | 23.83326 |
| 10315.78 | 159.813 | 4 | 1.225739 | 306.4447 | 23.80416 |
| 10645.65 | 150.7681 | 5 | 1.312752 | 262.5497 | 23.7787 |
| 10990.96 | 156.798 | 6 | 1.390814 | 231.803 | 23.71796 |
| 11305.44 | 130.4188 | 7 | 1.460288 | 208.6144 | 23.67938 |
| 11681.07 | 166.5971 | 8 | 1.517007 | 189.6279 | 23.66321 |
| 12016.12 | 162.8239 | 9 | 1.569374 | 174.3789 | 23.62293 |
| 12355.78 | 162.8248 | 10 | 1.622401 | 162.2415 | 23.5685 |
| 9636.601 | 158.3084 | 2 | 0.982699 | 491.3545 | 23.89427 |
| 9976.87 | 159.058 | 3 | 1.120582 | 373.5219 | 23.83171 |
| 10300.71 | 144.7368 | 4 | 1.225851 | 306.4759 | 23.80461 |
| 10641.14 | 146.2453 | 5 | 1.31285 | 262.5677 | 23.77928 |
| 11005.31 | 171.119 | 6 | 1.390931 | 231.8238 | 23.71575 |
| 11306.19 | 131.1735 | 7 | 1.460374 | 208.6252 | 23.67905 |
| 11681.07 | 166.5971 | 8 | 1.517007 | 189.6279 | 23.66321 |
| 12010.84 | 157.5475 | 9 | 1.569409 | 174.3818 | 23.62383 |
| 12350.52 | 157.5485 | 10 | 1.622357 | 162.237 | 23.56942 |
| 12645.45 | 111.7235 | 20 | 2.026688 | 101.3375 | 23.54152 |
| 12850.24 | 97.70503 | 30 | 2.316222 | 77.20832 | 23.53455 |
| 13075.48 | 102.2217 | 40 | 2.549497 | 63.73723 | 23.52213 |
| 13280.48 | 88.205 | 50 | 2.744 | 54.87982 | 23.4897 |
| 13495.49 | 82.32737 | 60 | 2.911564 | 48.52594 | 23.44812 |
| 13735.49 | 104.0381 | 70 | 3.066594 | 43.80752 | 23.41887 |
| 13940.48 | 84.58786 | 80 | 3.211596 | 40.14536 | 23.40843 |
| 14160.21 | 85.03938 | 90 | 3.348386 | 37.20497 | 23.40469 |
| 14390.53 | 94.99035 | 100 | 3.473566 | 34.73577 | 23.38794 |
| 14605.45 | 90.01429 | 200 | 4.559083 | 22.79526 | 23.35583 |
| 14825.32 | 90.05603 | 300 | 5.400359 | 18.00109 | 23.32064 |
| 15040.12 | 85.04228 | 400 | 6.179952 | 15.45042 | 23.30419 |
| 15260.49 | 85.49279 | 500 | 6.931344 | 13.86262 | 23.29672 |
| 15471.27 | 74.63599 | 600 | 7.66488 | 12.77452 | 23.29801 |
| 15710.49 | 93.63424 | 700 | 8.347063 | 11.92438 | 23.28104 |
| 15925.77 | 91.82449 | 800 | 9.062776 | 11.3284 | 23.24885 |
| 16135.77 | 81.92212 | 900 | 9.782295 | 10.86917 | 23.22218 |
| 16355.49 | 82.3294 | 1000 | 10.52128 | 10.52128 | 23.20714 |
| 16585.49 | 94.08444 | 1100 | 11.28917 | 10.26286 | 23.20165 |
| 16795.45 | 83.69795 | 1200 | 12.09808 | 10.08192 | 23.20359 |
| 17040.59 | 107.7231 | 1300 | 12.97723 | 9.982485 | 23.18911 |
| 17235.11 | 82.78996 | 1400 | 14.26961 | 10.19225 | 23.1591 |
| 17455.58 | 83.68256 | 1500 | 16.09474 | 10.72987 | 23.13083 |
| 17690.57 | 99.51293 | 1600 | 17.83577 | 11.14789 | 23.11675 |
| 17895.3 | 83.79567 | 1700 | 19.57164 | 11.51276 | 23.11149 |
| 18095.49 | 64.2345 | 1800 | 21.2515 | 11.80594 | 23.11226 |
| 18350.49 | 98.15424 | 1900 | 22.93319 | 12.07042 | 23.11764 |

Figure 7:
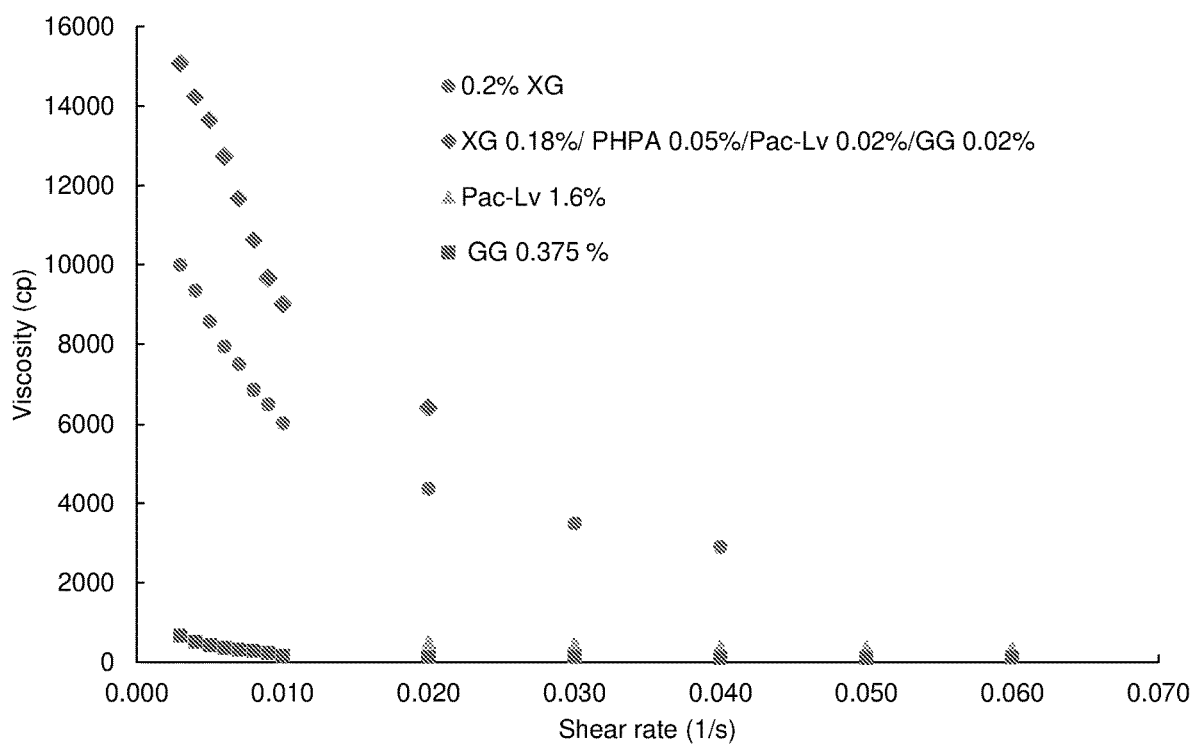
FIG. 7—is a graph of the results of rheology testing (low shear rate range) of a drilling fluid according to an embodiment of the present invention (0.18% XG/0.05% PHPA/0.02% Pac-LV/0.02% GG) compared to the individual components of the drilling fluid alone.

As can be seen from FIG. 7, the XG/PHPA/Pac-LV/GG formulation maintained superior low end rheology compared to xanthan gum, guar gum and Pac-LV alone. That is, at any given low end shear rate, the viscosity of the XG/PHPA/Pac-LV/GG formulation was higher than a fluid comprising XG, GG, or Pac-LV alone.

Figure 8:
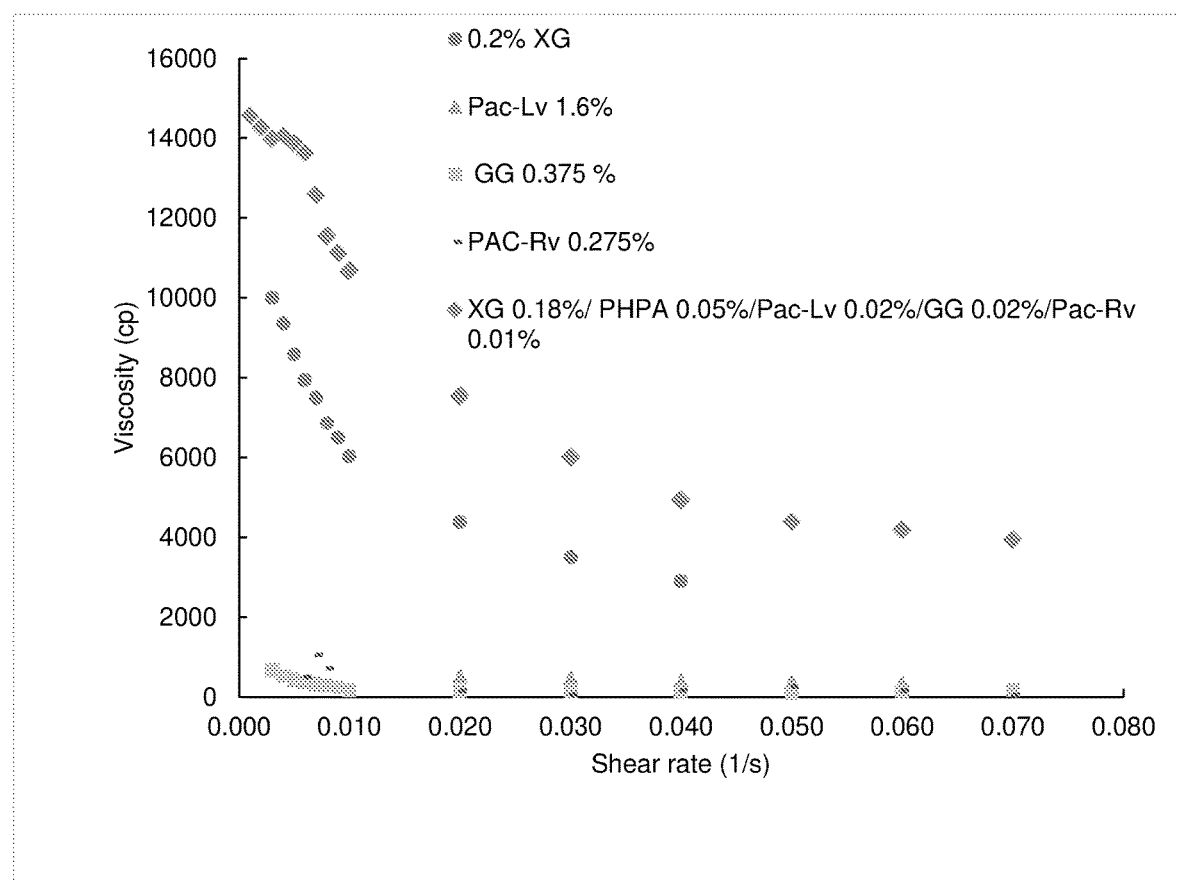
FIG. 8—is a graph of the results of rheology testing (low shear rate range) of a drilling fluid according to an embodiment of the present invention (0.18% XG/0.05% PHPA/0.02% Pac-LV/0.02% GG/0.01% Pac-RV) compared to the individual components of the drilling fluid alone.
Figure 9:
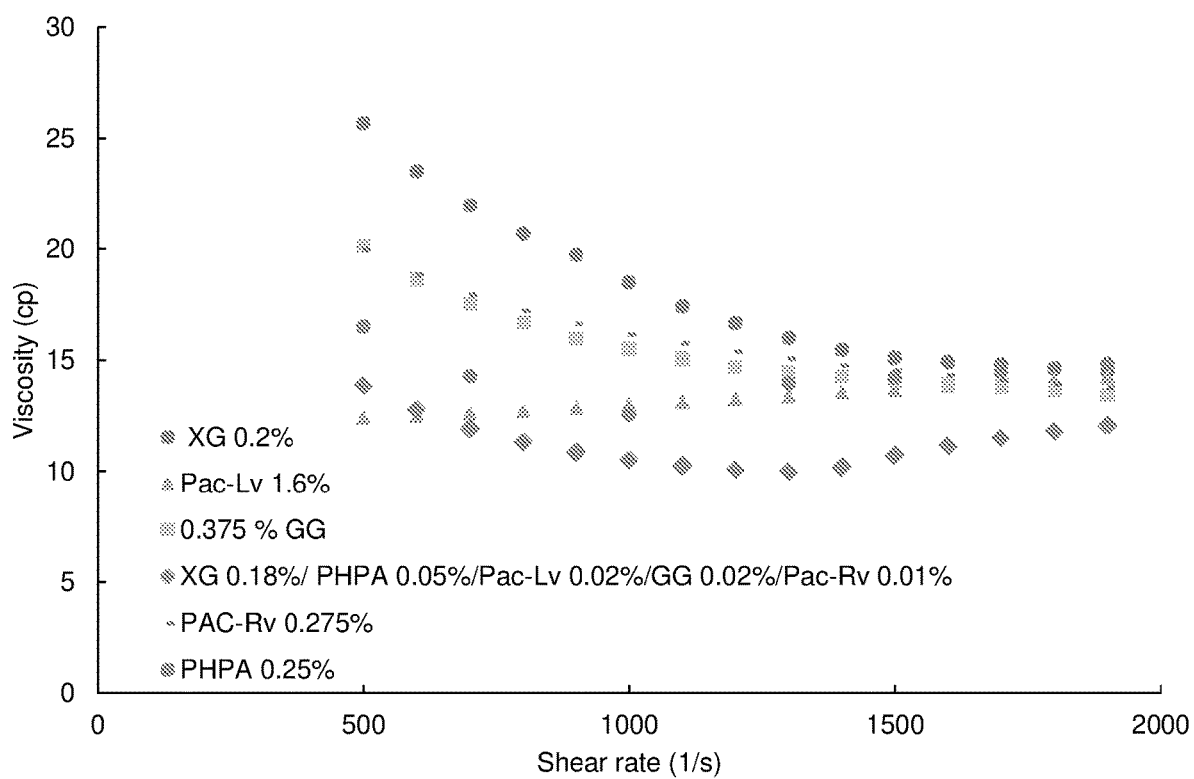
FIG. 9—is a graph of the results of rheology testing (high shear rate range) of a drilling fluid according to an embodiment of the present invention (0.18% XG/0.05% PHPA/0.02% Pac-LV/0.02% GG/0.01% Pac-RV) compared to the individual components of the drilling fluid alone.

As can be seen from FIG. 8, the XG/PHPA/Pac-LV/GG/Pac-RV formulation also maintained superior low end rheology compared to xanthan gum, guar gum, Pac-LV, and Pac-RV alone. Specifically, at any given low end shear rate, the viscosity of the XG/PHPA/Pac-LV/GG/Pac-RV formulation was higher than a fluid comprising individual components alone. FIG. 9 shows the results of rheology testing of the XG/PHPA/Pac-LV/GG/Pac-RV formulation at high shear rates. As can be seen from the Figure, the XG/PHPA/Pac-LV/GG/Pac-RV formulation also maintained superior high end rheology compared to a fluid comprising xanthan gum, guar gum, Pac-LV, Pac-RV alone or PHPA alone. Indeed, other than the XG/PHPA/Pac-LV/GG/Pac-RV formulation, none of the fluids containing individual components alone could achieve a viscosity of about 12 cp or lower at shear rates of about 1000 1/s or more.

These results establish that a drilling fluid formulation comprising at least the minimal xanthan gum/PHPA/Pac-LV polymers imparts an unexpected and superior low end and high end rheology to the fluid.

To test whether this minimal polymer combination could also be useful for controlling fluid and cutting loss when encountering fracture formations during drilling, the particulate bentonite was added and further rheology testing conducted. The results are shown in Tables 10 to 12 and in FIGS. 10 and 11.

TABLE 10

Rheology testing of Bentonite alone (3.0% w/w)

| t in s | t_seg in s | Á in 1/s | , in Pa | f in mPas | T in ° C. |
|---|---|---|---|---|---|
| 2759.667 | 88.65638 | 0.059999 | 0.302202 | 5036.596 | 25.4459 |
| 2976.018 | 100.4159 | 0.069999 | 0.258874 | 3698.353 | 25.45198 |
| 3176.5 | 96.34338 | 0.079998 | 0.227519 | 2844.065 | 25.45019 |
| 3389.741 | 103.4935 | 0.089994 | 0.229294 | 2547.494 | 25.44753 |
| 3591.528 | 100.8685 | 0.099993 | 0.241364 | 2413.977 | 25.45023 |
| 3787.88 | 92.27296 | 0.2 | 0.218864 | 1094.112 | 25.448 |
| 3993.046 | 92.27798 | 0.3 | 0.226243 | 754.2156 | 25.44809 |
| 4214.994 | 109.007 | 0.4 | 0.219184 | 547.9867 | 25.44823 |
| 4411.48 | 100.4166 | 0.5 | 0.210305 | 420.5192 | 25.45299 |
| 4616.278 | 100.4176 | 0.6 | 0.204479 | 340.855 | 25.45225 |
| 4819.581 | 98.61782 | 0.7 | 0.199788 | 285.4218 | 25.45402 |
| 5025.24 | 99.51061 | 0.8 | 0.193246 | 241.5475 | 25.45352 |
| 5064.14 | 138.4046 | 0.8 | 0.191452 | 239.3151 | 25.45366 |
| 5229.309 | 98.60707 | 0.9 | 0.18842 | 209.3602 | 25.4521 |
| 5370.094 | 34.23525 | 1 | 0.182482 | 182.4776 | 25.45494 |
| 5450.78 | 30.01381 | 2 | 0.228145 | 114.069 | 25.45075 |
| 5543.1 | 37.25047 | 3 | 0.262053 | 87.34493 | 25.4498 |
| 5630.338 | 38.68289 | 3.999993 | 0.291118 | 72.7736 | 25.45154 |
| 5712.333 | 33.44292 | 5 | 0.31122 | 62.24362 | 25.45424 |
| 5800.712 | 37.00773 | 6 | 0.330791 | 55.1285 | 25.45098 |
| 5881.728 | 32.99755 | 7.000011 | 0.344422 | 49.20672 | 25.44794 |
| 5969.594 | 36.04563 | 8 | 0.365438 | 45.67606 | 25.44844 |
| 6054.988 | 35.8212 | 9 | 0.399919 | 44.42845 | 25.45261 |
| 6136.152 | 32.27639 | 10 | 0.456825 | 45.68216 | 25.45462 |
| 6309.098 | 34.68687 | 30 | 3.282656 | 109.419 | 25.45172 |
| 6396.608 | 36.1968 | 40 | 3.239843 | 80.99667 | 25.44908 |
| 6478.213 | 32.57903 | 50 | 3.170579 | 63.41306 | 25.4471 |
| 6567.261 | 36.49662 | 60 | 3.164389 | 52.73943 | 25.45083 |
| 6650.146 | 34.08522 | 70 | 3.18752 | 45.53608 | 25.4483 |
| 6736.659 | 34.93996 | 80 | 3.191096 | 39.88892 | 25.45509 |
| 6821.159 | 34.53729 | 90 | 3.213988 | 35.71141 | 25.44947 |
| 6903.068 | 31.22054 | 100 | 3.312679 | 33.12679 | 25.44311 |
| 6989.2 | 31.50562 | 200 | 4.462711 | 22.31347 | 25.44937 |
| 7081.277 | 38.90861 | 300 | 5.317292 | 17.72467 | 25.44737 |
| 7162.189 | 34.84067 | 400 | 5.957622 | 14.89421 | 25.44915 |
| 7251.593 | 38.75979 | 500 | 6.62235 | 13.24493 | 25.44779 |
| 7333.738 | 35.52513 | 600 | 7.45625 | 12.42725 | 25.45038 |
| 7417.678 | 33.32997 | 700 | 8.352839 | 11.93293 | 25.45144 |
| 7501.068 | 31.25751 | 800 | 9.001768 | 11.25258 | 25.44826 |
| 7586.068 | 30.92012 | 900 | 9.652579 | 10.72479 | 25.44705 |
| 7670.061 | 29.56285 | 1000 | 10.31995 | 10.31995 | 25.44655 |
| 7761.153 | 35.29178 | 1100 | 10.99288 | 9.993761 | 25.44865 |
| 7843.207 | 32.12546 | 1200 | 11.73755 | 9.781315 | 25.44337 |
| 7927.218 | 30.46182 | 1300 | 12.5203 | 9.63102 | 25.4431 |
| 8017.091 | 35.14006 | 1400 | 13.37488 | 9.553421 | 25.44713 |
| 8097.184 | 29.71315 | 1500 | 14.74694 | 9.831209 | 25.44714 |
| 8187.551 | 34.6868 | 1600 | 16.40993 | 10.25612 | 25.45279 |
| 8270.19 | 31.82415 | 1700 | 18.23571 | 10.72668 | 25.44364 |
| 8361.653 | 38.00374 | 1800 | 19.96476 | 11.09143 | 25.44898 |
| 8439.16 | 29.8642 | 1900 | 21.62679 | 11.38191 | 25.44221 |

TABLE 11

Rheology testing of 0.3% XG/
0.05% PHPA/0.02% Pac-LV/1.2% Bentonite

| t in s | t_seg in s | Á in 1/s | , in Pa | f in mPas |
|---|---|---|---|---|
| 497.298 | 166.5977 | 0.005 | 0.52 | 104104.41 |
| 883.2299 | 229.1649 | 0.007 | 0.67 | 95278.44 |
| 1161.105 | 183.1783 | 0.010 | 0.79 | 79045.70 |
| 1473.262 | 171.8743 | 0.030 | 1.18 | 39424.54 |
| 1794.57 | 168.8575 | 0.050 | 1.40 | 27925.04 |
| 2116.492 | 166.5975 | 0.070 | 1.53 | 21918.17 |
| 2455.202 | 180.9342 | 0.100 | 1.67 | 16653.76 |
| 2724.159 | 126.022 | 0.500 | 2.50 | 5002.01 |
| 3085.539 | 161.3157 | 1 | 2.85 | 2850.78 |
| 3416.076 | 168.1712 | 2 | 3.27 | 1635.80 |
| 3764.935 | 192.9804 | 5 | 3.94 | 788.67 |
| 4068.624 | 173.4179 | 10 | 4.56 | 456.06 |
| 4413.222 | 193.7286 | 30 | 5.81 | 193.76 |
| 4708.762 | 165.0898 | 50 | 6.60 | 132.09 |
| 5053.512 | 186.1951 | 200 | 10.14 | 50.72 |
| 5390.051 | 199.0091 | 500 | 13.68 | 27.36 |
| 5696.957 | 182.425 | 700 | 16.14 | 23.06 |
| 5982.621 | 143.9863 | 1000 | 19.65 | 19.65 |
| 6323.965 | 161.3212 | 1500 | 25.41 | 16.94 |
| 6663.049 | 176.3982 | 1900 | 30.56 | 16.09 |

TABLE 12

Rheology testing of 0.3% XG/
0.05% PHPA/0.02% Pac-LV/2.0% Bentonite

| t in s | t_seg in s | Á in 1/s | , in Pa | f in mPas |
|---|---|---|---|---|
| 493.5 | 147.7512 | 0.003 | 0.52 | 172307.23 |
| 816.9511 | 146.2436 | 0.004 | 0.80 | 200685.19 |
| 1126.014 | 130.4267 | 0.005 | 1.06 | 211506.25 |
| 1471.018 | 150.7969 | 0.006 | 1.28 | 213158.56 |
| 1788.734 | 143.9881 | 0.007 | 1.43 | 203720.97 |
| 2152.341 | 179.4121 | 0.008 | 1.53 | 191437.36 |
| 2459.043 | 162.1312 | 0.009 | 1.60 | 178226.09 |
| 2759.494 | 137.1994 | 0.010 | 1.67 | 166686.52 |
| 3114.159 | 167.3529 | 1.7 | 4.37 | 2567.80 |
| 3412.922 | 140.9674 | 3.4 | 4.70 | 1381.68 |
| 3750.903 | 154.6025 | 170 | 11.31 | 66.55 |
| 4083.364 | 162.0737 | 340 | 14.90 | 43.84 |
| 4412.109 | 165.8419 | 510 | 16.45 | 32.26 |
| 4727.639 | 156.8378 | 1020 | 23.43 | 22.98 |
| 5044.325 | 148.5117 | 1900 | 35.79 | 18.84 |

Figure 10:
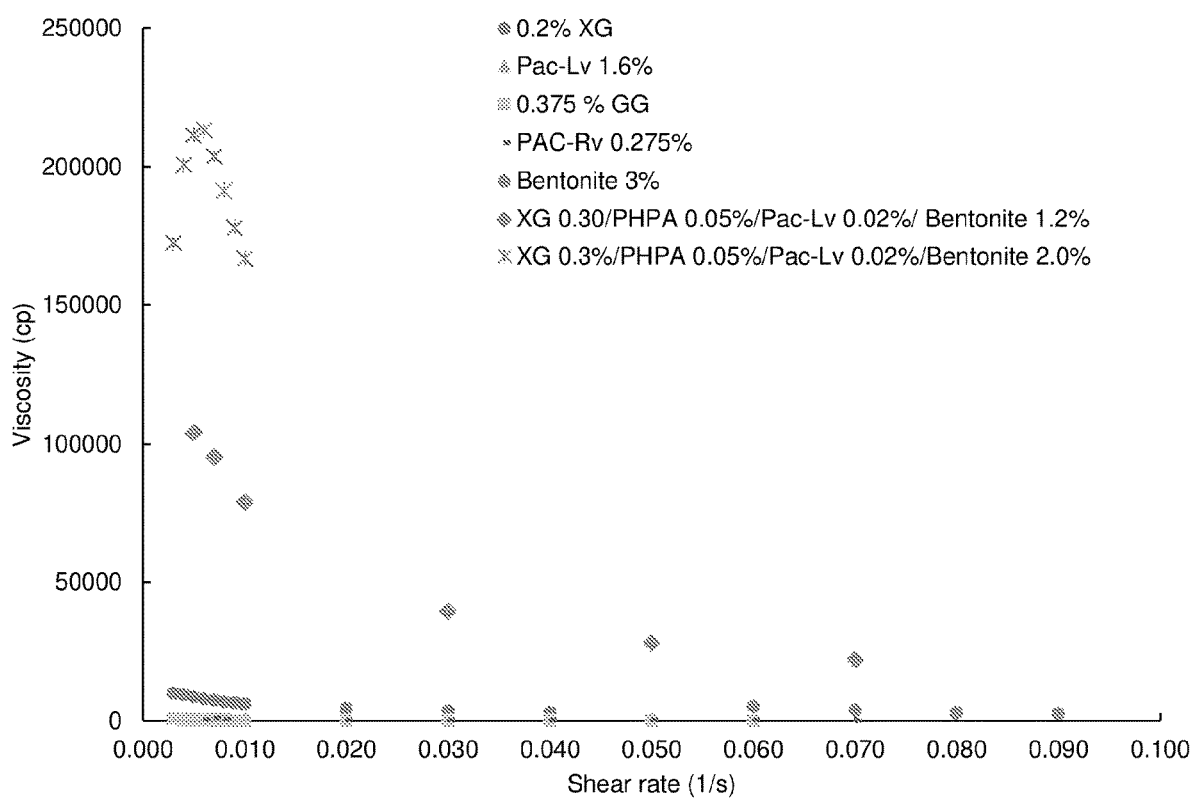
FIG. 10—is a graph of the results of rheology testing (low shear rate range) of a drilling fluid according to an embodiment of the present invention (0.3% XG/0.05% PHPA/ 0.02% Pac-LV/1.2% or 2.0% bentonite) compared to the individual components of the drilling fluid alone.
Figure 11:
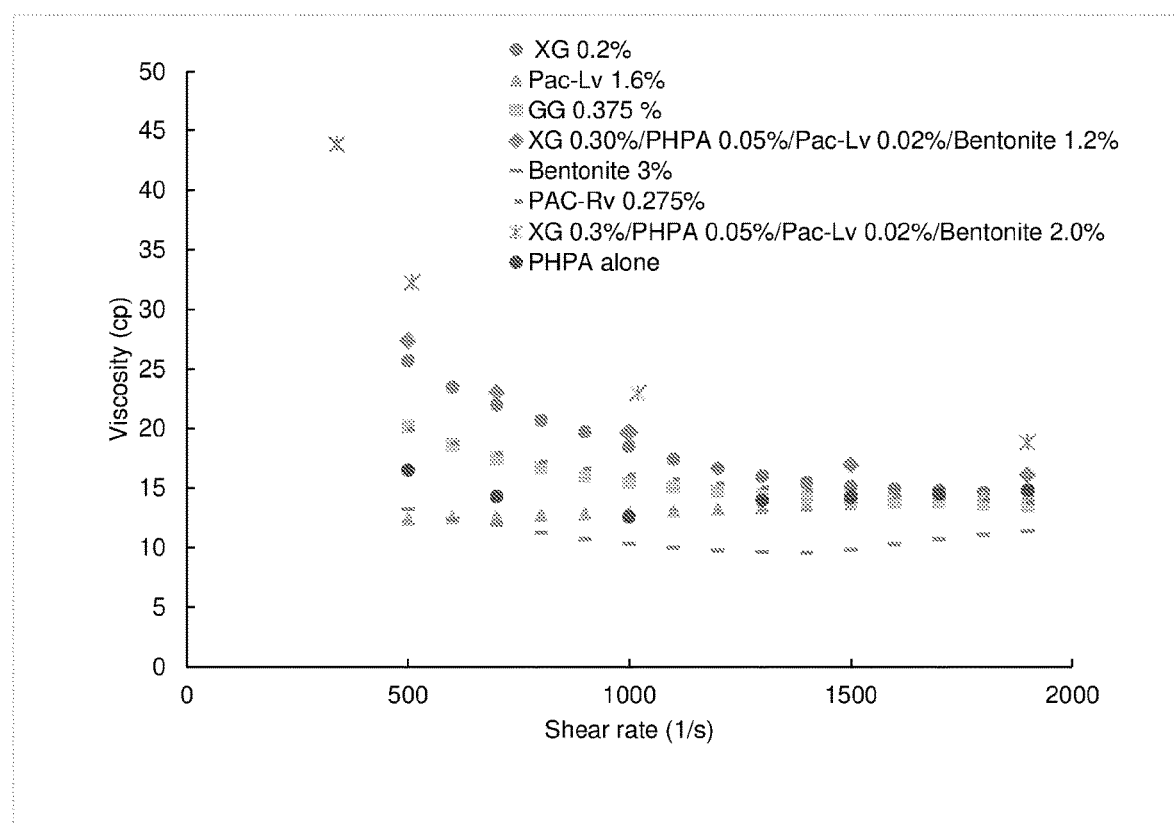
FIG. 11—is a graph of the results of rheology testing (high shear rate range) of a drilling fluid according to an embodiment of the present invention (0.3% XG/0.05% PHPA/0.02% Pac-LV/1.2% or 2.0% bentonite) compared to the individual components of the drilling fluid alone.

As can be seen from FIG. 10, the low end rheology of both the XG/PHPA/Pac-LV/Bentonite formulations was far superior to that of XG, Pac-LV, GG, Pac-RV or bentonite alone. Indeed, at shear rates of 0.01 1/s or less, the viscosity of the XG/PHPA/Pac-LV/Bentonite formulations was about 80000 cp or higher. A formulation comprising XG alone was the next best performing fluid; however, the viscosity of this fluid was only about 6000 cp at a shear rate of 0.01 1/s. FIG. 11 also establishes that both of the XG/PHPA/Pac-LV/Bentonite formulations maintained comparable high end rheology to fluids comprising XG, Pac-LV, GG, PHPA, Pac-RV or bentonite alone. These results confirm that a drilling fluid comprising XG/PHPA/Pac-LV has ideal properties for controlling fluid and cutting loss when encountering fracture formations during drilling when it is combined with a particulate component (such as bentonite).

The rheology properties of the drilling fluid comprising the minimal xanthan gum/PHPA/Pac-LV polymers was then compared to the rheology properties of commercially available drilling fluids. The results are presented in Tables 13 to 15 and FIG. 12.

TABLE 13

Rheology testing of Spectrocap-low end rheology

| t in s | t_seg in s | Á in 1/s | SS, in Pa | f in mPas | T in ° C. |
|---|---|---|---|---|---|
| 359.0471 | 321.1176 | 0.001 | 0.00576 | 5760.029 | 22.74735 |
| 763.2167 | 330.1583 | 0.003 | 0.015078 | 5026.417 | 22.71833 |
| 1064.186 | 237.9069 | 0.005 | 0.024109 | 4822.108 | 22.69931 |
| 1417.169 | 201.7322 | 0.007 | 0.029799 | 4257.065 | 22.66565 |
| 1790.797 | 182.7294 | 0.009999 | 0.037301 | 3730.266 | 22.64119 |
| 2192.218 | 189.2127 | 0.03 | 0.069844 | 2328.209 | 22.627 |
| 2580.758 | 244.2333 | 0.049996 | 0.082225 | 1644.576 | 22.6003 |
| 2926.804 | 254.0339 | 0.069997 | 0.089925 | 1284.696 | 22.57857 |
| 3140.899 | 134.7686 | 0.09999 | 0.119101 | 1190.768 | 22.57535 |
| 3365.716 | 149.2567 | 0.3 | 0.183881 | 612.8627 | 22.56955 |
| 3537.485 | 107.2335 | 0.5 | 0.231559 | 463.1706 | 22.55654 |
| 3738.634 | 87.74985 | 0.7 | 0.262 | 374.3164 | 22.54093 |
| 3961.325 | 101.3151 | 1 | 0.300032 | 300.0535 | 22.52561 |
| 4165.068 | 90.91603 | 3 | 0.436589 | 145.5384 | 22.52 |
| 4391.211 | 103.1255 | 5 | 0.528714 | 105.7526 | 22.51677 |
| 4593.303 | 90.92644 | 7 | 0.604227 | 86.31455 | 22.50886 |
| 4821.184 | 104.4857 | 10 | 0.696482 | 69.64965 | 22.49474 |

TABLE 14

Rheology testing of CR650-low end rheology

| t in s | t_seg in s | Á in 1/s | SS, in Pa | f in mPas | T in ° C. |
|---|---|---|---|---|---|
| 426.2053 | 343.7263 | 0.001 | 0.008256 | 8256.368 | 21.93053 |
| 745.8175 | 268.6563 | 0.003 | 0.018967 | 6322.704 | 21.93713 |
| 1084.03 | 209.8645 | 0.005 | 0.026083 | 5216.961 | 21.93178 |
| 1500.902 | 233.3805 | 0.007004 | 0.0325 | 4642.046 | 21.91244 |
| 1877.807 | 217.1108 | 0.009999 | 0.041187 | 4118.854 | 21.91386 |

TABLE 14-continued

Rheology testing of CR650-low end rheology

| t in s | t_seg in s | Á in 1/s | SS, in Pa | f in mPas | T in ° C. |
|---|---|---|---|---|---|
| 2277.245 | 223.1302 | 0.029999 | 0.070507 | 2348.99 | 21.91245 |
| 2622 | 233.6873 | 0.049998 | 0.081652 | 1633.663 | 21.89673 |
| 2943.926 | 220.1148 | 0.069998 | 0.09299 | 1328.961 | 21.89074 |
| 3161.376 | 104.9423 | 0.099995 | 0.112917 | 1129.017 | 21.89735 |
| 3365.324 | 93.63118 | 0.3 | 0.270882 | 902.9397 | 21.90559 |
| 3574.846 | 88.25933 | 0.5 | 0.320683 | 641.3433 | 21.90231 |
| 3809.622 | 107.6515 | 0.7 | 0.35745 | 510.6405 | 21.89667 |
| 4013.664 | 95.55291 | 1 | 0.400091 | 400.0573 | 21.89136 |
| 4225.7 | 92.76638 | 3 | 0.565375 | 188.4725 | 21.89338 |
| 4437.494 | 88.6554 | 5 | 0.672414 | 134.4908 | 21.90322 |
| 4660.515 | 96.79767 | 7 | 0.755427 | 107.9194 | 21.90583 |
| 4875.154 | 96.34115 | 10 | 0.8595 | 85.95019 | 21.90279 |

TABLE 15

Rheology testing of Corewell-low end rheology

| t in s | t_seg in s | Á in 1/s | SS, in Pa | f in mPas | T in ° C. |
|---|---|---|---|---|---|
| 380.4846 | 312.9846 | 0.001 | 0.00641 | 6409.692 | 22.65231 |
| 782.1339 | 310.2679 | 0.003 | 0.015354 | 5118.571 | 22.63804 |
| 1168.056 | 291.2845 | 0.005 | 0.023642 | 4728.831 | 22.6231 |
| 1525.263 | 244.2368 | 0.007 | 0.031059 | 4437.333 | 22.60053 |
| 2006.515 | 322.0182 | 0.01 | 0.040748 | 4074.909 | 22.58545 |
| 2301.816 | 213.3316 | 0.03 | 0.0782 | 2606.776 | 22.57421 |
| 2664.342 | 229.9184 | 0.050007 | 0.094729 | 1894.447 | 22.55211 |
| 2972.75 | 193.7359 | 0.069998 | 0.107234 | 1532.531 | 22.54219 |
| 3239.138 | 116.2515 | 0.099994 | 0.141936 | 1419.277 | 22.54553 |
| 3456.885 | 109.9146 | 0.3 | 0.231692 | 772.5788 | 22.53654 |
| 3663.474 | 92.27832 | 0.5 | 0.293 | 585.9568 | 22.52516 |
| 3913.695 | 118.5198 | 0.7 | 0.340126 | 485.7411 | 22.51779 |
| 4114.667 | 95.44382 | 1 | 0.395676 | 395.7049 | 22.51824 |
| 4321.568 | 77.80147 | 3 | 0.606389 | 202.1126 | 22.51558 |
| 4527.99 | 59.71327 | 5 | 0.747327 | 149.4723 | 22.51208 |
| 4771.294 | 79.15696 | 7 | 0.851824 | 121.6961 | 22.50255 |
| 4992.5 | 76.44786 | 10 | 0.97896 | 97.89492 | 22.49294 |

Figure 12:
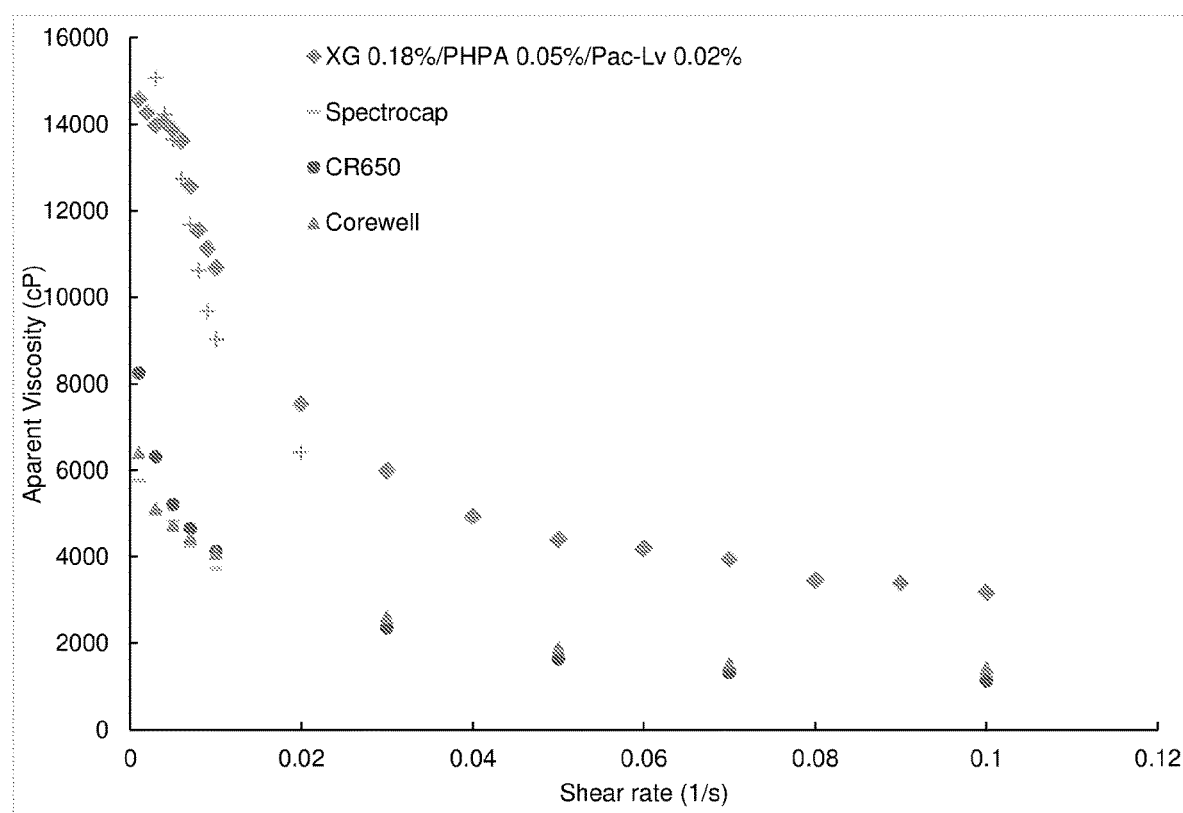
FIG. 12—is a graph of the results of rheology testing (low shear rate range) of drilling fluids according to embodiments of the present invention (0.18% XG/0.05% PHPA/0.02% Pac-LV or 0.18% XG/0.05% PHPA/0.02% Pac-LV/0.02% GG) compared to commercially available drilling fluids (Spectrocap, CR650 and Corewell).

As can be seen from FIG. 12, the XG/PHPA/Pac-LV and XG/PHPA/Pac-LV/GG formulations demonstrated superior low end rheology compared to three commercially used drilling fluids. Specifically, at any given low end shear rate, the viscosity of the XG/PHPA/Pac-LV and XG/PHPA/Pac-LV/GG formulations was higher than to commercial products.

Example 2

Field Trials of Drilling Fluid Formulations

Figure 13:
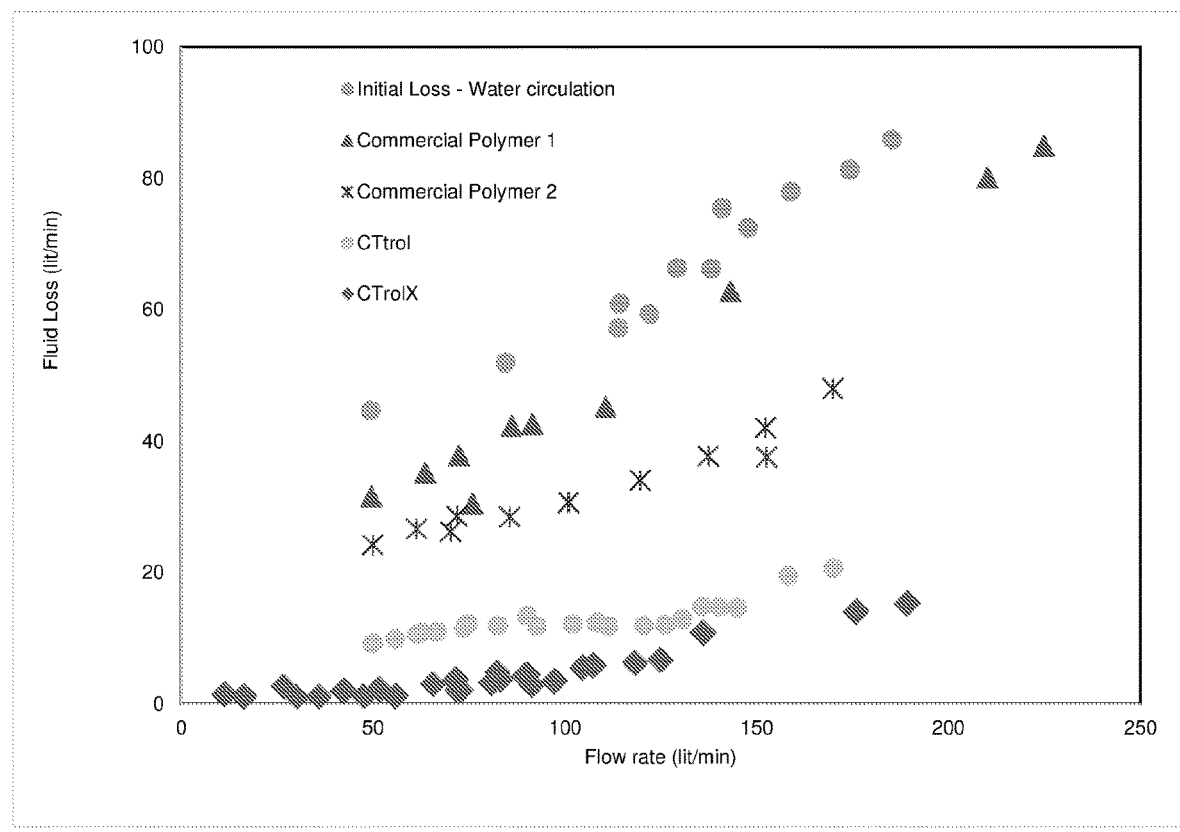
FIG. 13—is a graph showing the performance of two drilling fluids according to certain embodiments of the present invention (CTroI and CTroIX) in a first field trial compared to the performance of a drilling fluid composition comprising a single commercial polymer (Pac-RV) alone.

Various drilling fluid formulations, some of which are described in Example 1 above, were tested in the field during fluid loss conditions. FIG. 13 shows the results of a field trial of CTroI (0.18% w/w Xanthan Gum+0.05% w/w PHPA+0.02% w/w Pac-LV+0.02% w/w Guar Gum+0.01% w/w Pac-RV) and CTroIX (0.3% w/w Xanthan Gum+0.02% w/w Pac-LV+0.02% w/w Guar Gum+0.01% w/w Pac-RV+1.2% Bentonite+4.8% w/w Fibre) in the Brukunga pyrite mine located in South Australia, Australia.

The borehole was initially undergoing a significant fluid loss in the range of 50 to 90 percent of the circulating flow rate. After characterising the fluid loss using water, two commercial polymer fluids were circulated in the borehole (Commercial Polymer 1—Pac-RV at 0.2% w/w; Commercial Polymer 2—Pac-RV at 0.3% w/w), resulting in fluid loss reduction. However, when CTroI or CTroIX drilling fluid was subsequently used, the fluid loss decreased even further due to the superior shear thinning properties of CTroI and CTroIX. Specifically, the fluid loss dropped to a range of 9 to 15 percent of the circulating flow rate. Furthermore, when CTroIX was used, fluid loss was reduced even further (i.e. to less than 3 to 5 percent of the circulating fluid).

Figure 14:
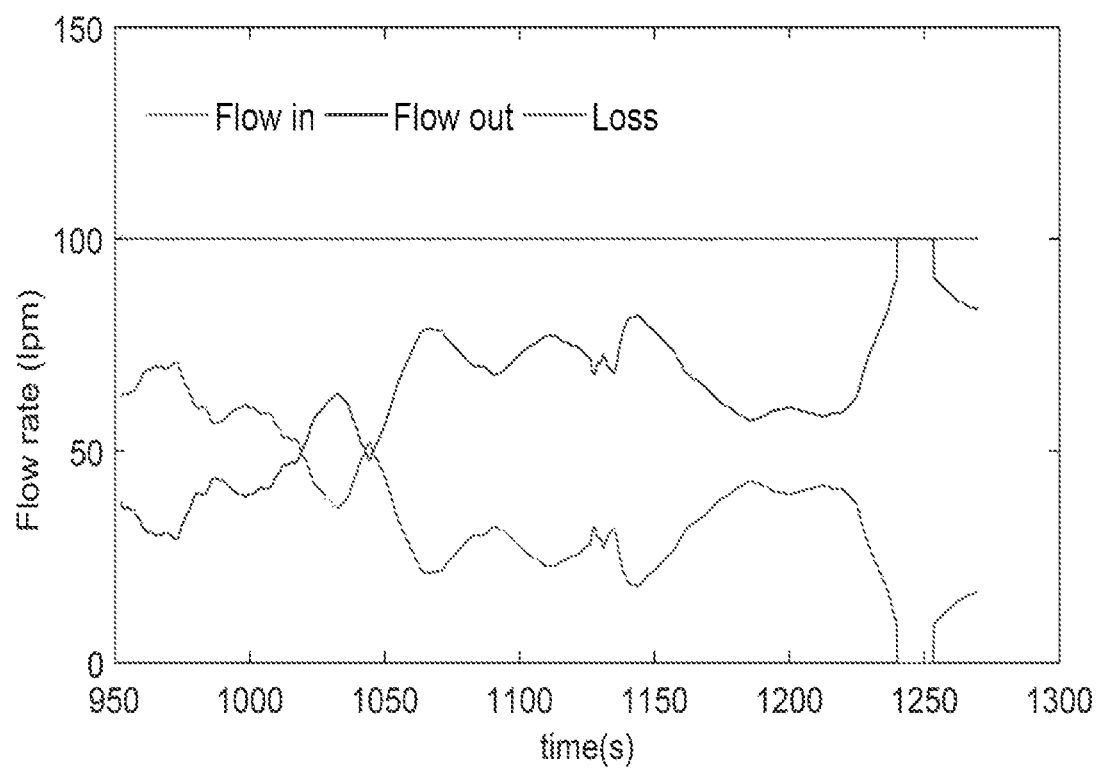
FIG. 14—is a graph tracking the progress of fluid loss during drilling in a second field trial.

A separate field trial was performed at the Brukunga site during drilling of another borehole. The borehole was created using a drilling rig made of downhole motors which are sensitive to drilling fluids comprising solid particles. The borehole intersected a network of fractures at a depth of 125 metres, and therefore suddenly led to a complete loss of drilling fluid during drilling (see FIG. 14).

Figure 15:
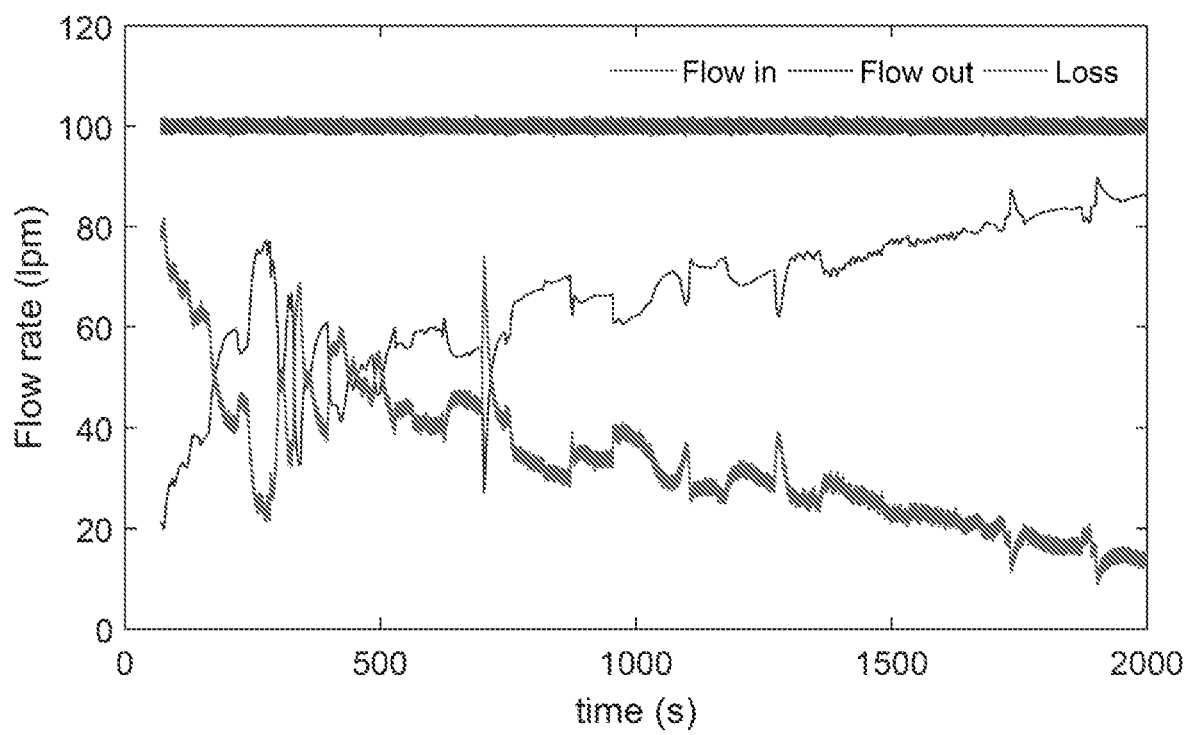
FIG. 15—is a graph showing an improvement of fluid return during the second field trial drilling following injection of CTroIX during drilling.
Figure 16:
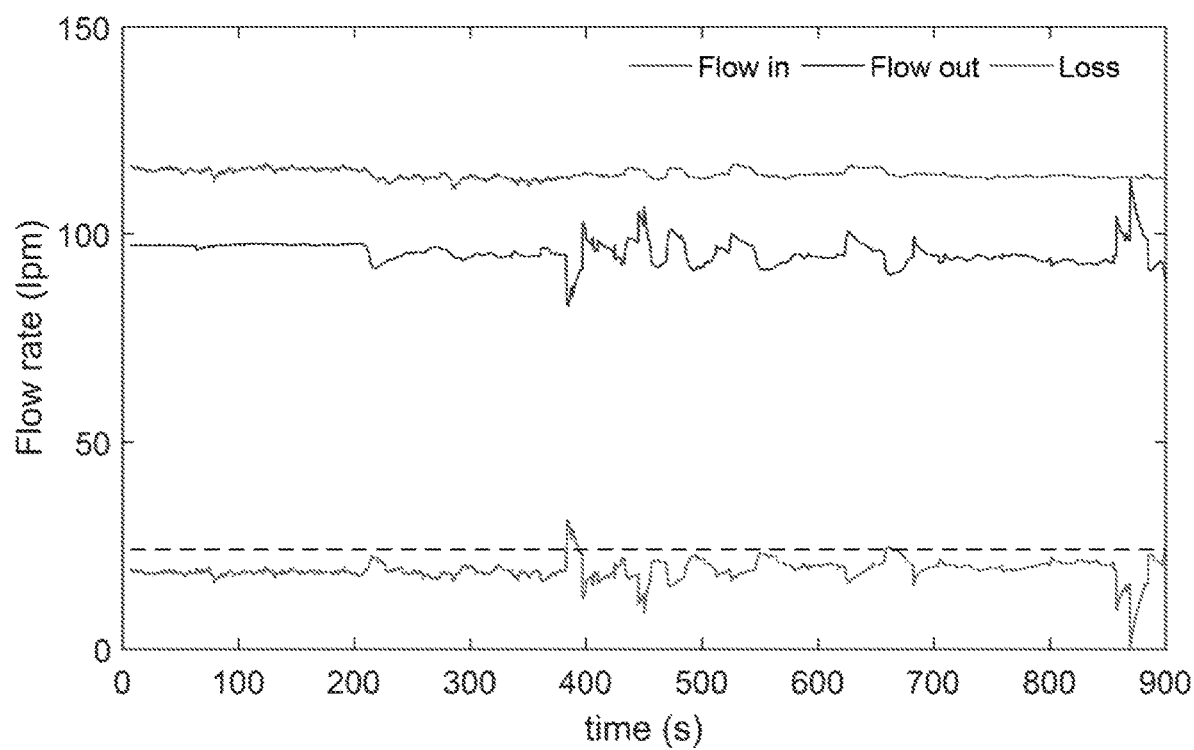
FIG. 16—is a graph showing sustained drilling fluid return 25 minutes after the loss zone was treated with CTroIX.

In order to remedy this, the CTroIX formulation (modified to also include 0.05% w/w PHPA) and was injected into the annulus of the drilling rig and the drilling continued. As shown in FIG. 15, this resulted in the gradual improvement of fluid return. Once the return was established, the drilling was continued with a minimum amount of fluid loss thereafter (as shown in FIG. 16).

Figure 17:
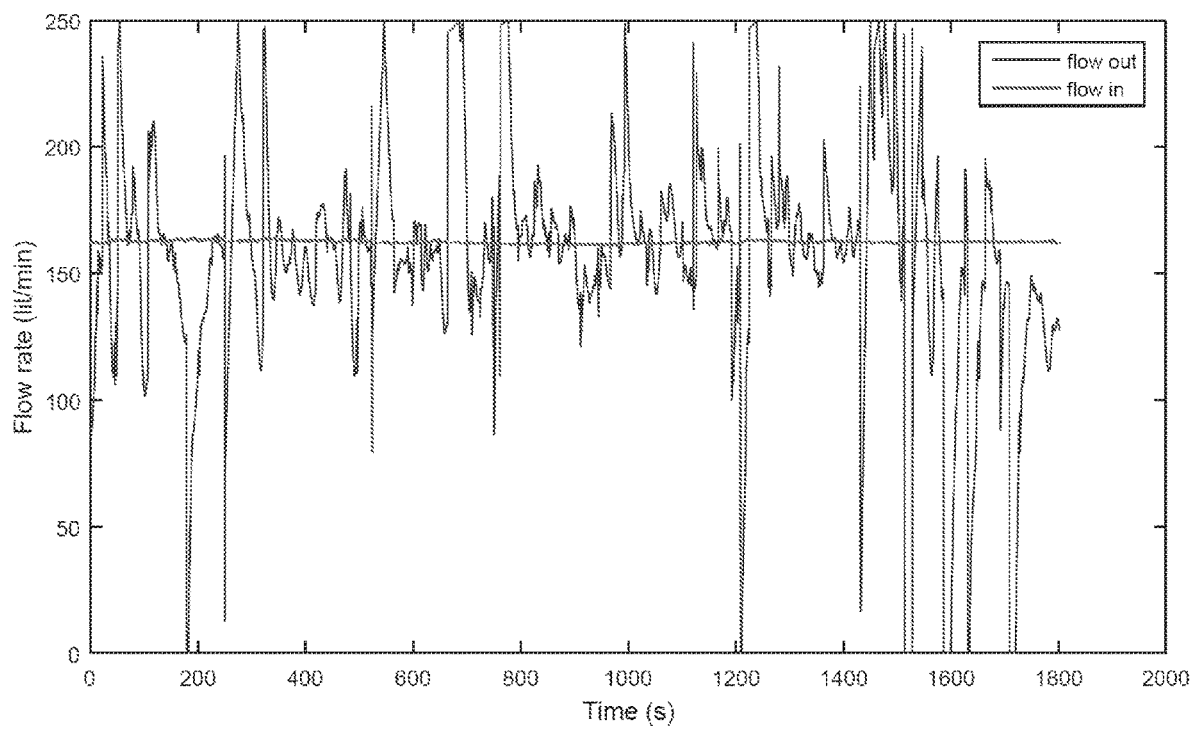
FIG. 17—is a graph showing the ability of a drilling fluid composition according to an embodiment of the present invention (0.18% XG/0.05% PHPA/0.02% Pac-LV/0.02% GG/0.01% Pac-RV/4.0% KCl) to control drilling fluid loss during drilling unconsolidated formations in a third field trial.
Figure 18:
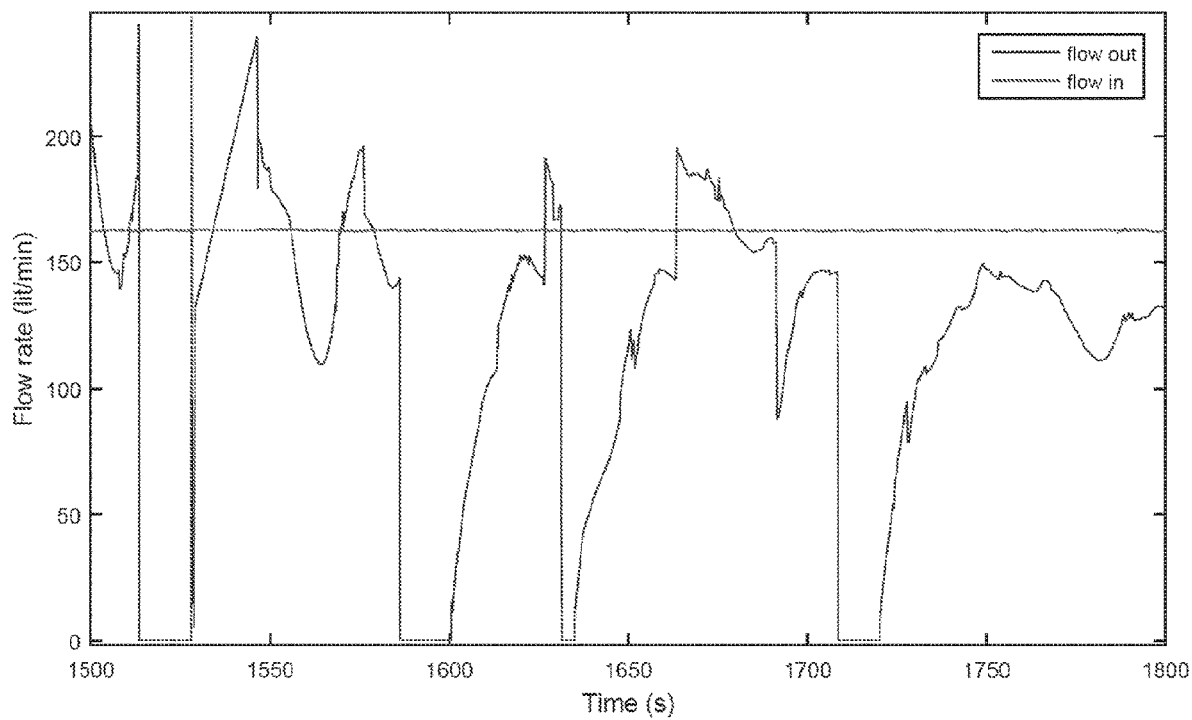
FIG. 18—is a graph of the results of the third field trial showing repeated events of exposing virgin rock, complete drilling fluid loss occurrence and resuming the return of fluid imparted by the drilling fluid composition according to FIG. 17 (data from FIG. 17).

A third field trial was conducted in Victoria, Australia using the same drilling rig as the second trial referred to above. In this trial, a drilling fluid comprising 0.18% w/w Xanthan Gum+0.05% w/w PHPA+0.02% w/w Pac-LV+0.02% w/w Guar Gum+0.01% w/w Pac-RV+4.0% w/w KCl was used to drill through a 135 metre interval of unconsolidated ground. During the drilling, as the drill bit was exposing new formations, significant fluid loss was noticed as shown in FIG. 17. However, as the drilling fluid invaded into the formations, the fluid effectively sealed the unconsolidated ground, and therefore minimised drilling fluid loss. FIG. 18Error! Reference source not found. shows a number of cycles of exposing new formations, occurrence of significant fluid loss, and sealing the loss zones within a minute as the drilling fluid invaded into the formation.

As demonstrated herein, a series of experiments has been performed to obtain a blend of polymers which can provide extended shear thinning properties, i.e. having high viscosities at low shear rates and low viscosities at high shear rates. A formulation comprising the minimal polymer components xanthan gum/PHPA/Pac-LV was obtained. This formulation was further blended with additional components and tested in drilling field trials. Two blends were tested, CTroI and CTroIX. CTroI was shown to be a preventative drilling fluid system used while drilling. CTroI can seal unconsolidated formations and has resistance against fluid loss. The field trials showed that CTroI can control fluid loss within a few minutes of invasion into very unconsolidated and permeable formations. While drilling fractured formations, if the aperture of the fracture, and therefore conductivity, will be large, then fluid loss will be high. This is where CTroIX was shown to be useful. As CTroIX is a remedial solution, it would likely only be required to be injected into the annulus of the drilling machinery. Indeed, the Brukunga field trials showed that CTroIX is effective in controlling fluid loss control in broken and fractured formations.

Example 3

Graphite as a Lost Circulation Material

The following modelling experiment was carried out to test the effectiveness of including graphite (as a lost circulation material) in preventing drilling fluid loss upon encountering a fracture formation. The experiments used a specifically engineered fluid loss simulator which measured the initial and final permeability of actual formations by converting flow rates through the sands at set inlet pressures. Also, benchmarking of fluid loss was performed to define the drilling fluid loss through different formation sizes.

The experiments were conducted using a base polymer fluid (0.2% w/w xanthan gum), and a base test drilling fluid (0.18% w/w xanthan gum/0.02% w/w Pac-LV/0.02% w/w guar gum/0.05% w/w PHPA) into which graphite was added. The graphite had a particle size distribution (D50) of 454 μm using a Malvern Mastersizer 3000 (Malvern Panalytical Ltd, United Kingdom) and SG of 1.9-2.3. The concentrations of graphite tested were 0, 1, 2, 3, 4, 6 or 10% w/w. The sand sizes used for the testing included 6.4 mm, 3.2 mm, 2.0 mm, 1.0 mm, supercut and superfine. To benchmark fluid loss, standard bentonite of concentration 12 g/350 cc was used.

Figure 19:
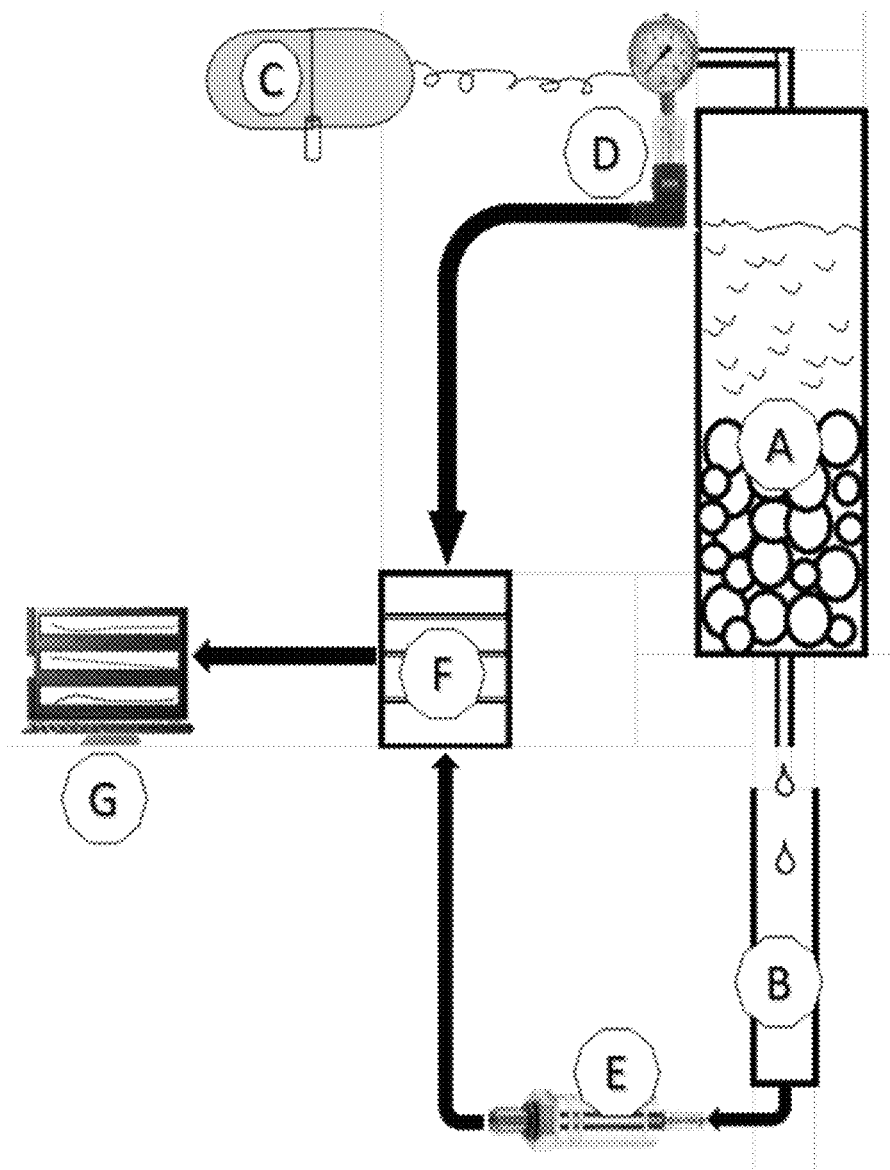
FIG. 19—is a schematic of the Fluid Loss Simulator (FSL) used in Example 3. A: transparent tube with sand and fluid; B: graduated receiving cylinder; C: air compressor; D: inlet pressure sensor (Wika); E: outlet pressure sensor (1 Bar); F: DAQ; and G: computer with data acquisition software (CATMAN).

All fluid loss experiments were conducted using a Fluid Loss Simulator (FLS). Model setup is shown FIG. 19. The FLS was built to overcome the limitations of conventional fluid loss experimental equipment—Permeability Plugging Apparatus (PPA) and API filter press. Limitations such as inability to visually analyse procedure in PPA, and measuring filtrate loss using filter paper in API filter press are overcome. Also, formations are simulated using actual sands rather than tapered discs/slots.

Figure 20:
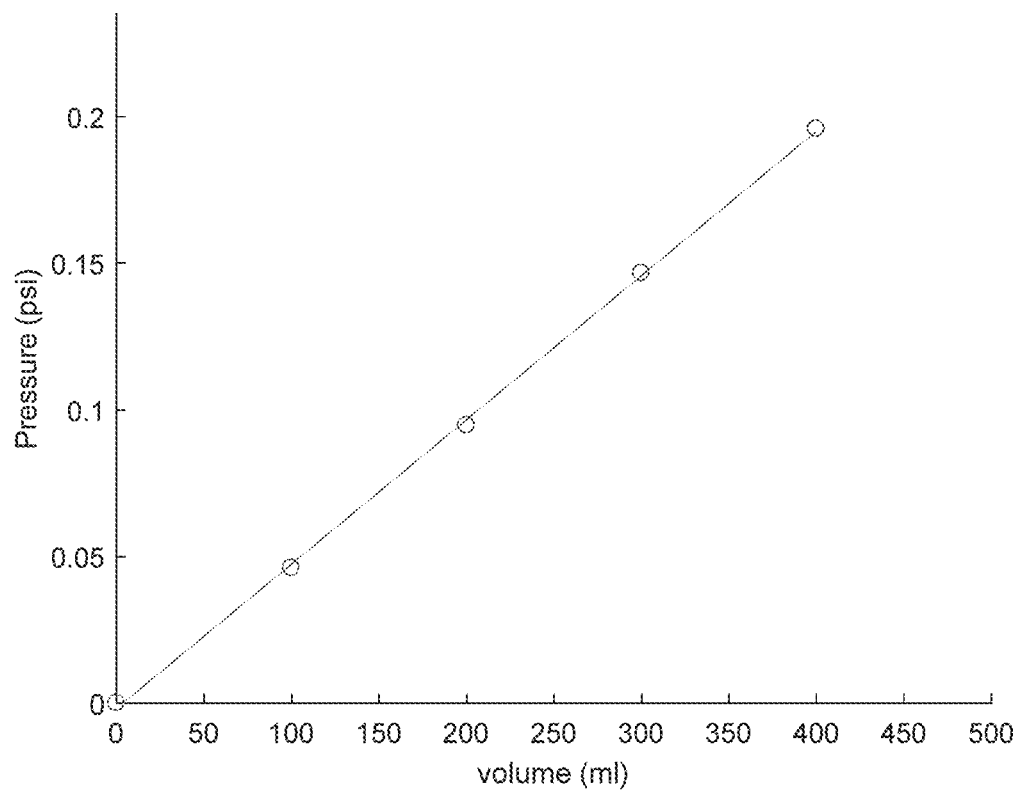
FIG. 20—is a graph showing a characteristic calibration plot of the FLS used in Example 3.

The FLS consists of an inlet pressure cap with a wika sensor (D) connected to an air compressor (C) to supply the required pressure into the graduated acrylic tube cell body (A) filled with sand to simulate formation as well as fluid (drilling mud). The hose connected to the bottom of the tube is linked to a receiving cylinder (B) at the bottom which is connected to a 1 Bar pressure sensor (E) to read the pressure of fluid being received by the cylinder as the fluid flows through the formation. Both pressure sensors are connected to a DAQ and then a computer with a Data Acquisition software installed. Calibration of equipment is done after every experiment by pouring back 400 mL of fluid into the receiving cylinder in 4 steps of 100 mL which is then recorded as pressure per volume. A characteristic calibration plot is shown in FIG. 20. Sands are placed in the tube up to 300 mm and then completely saturated with water, while test fluids are poured 250 mm from the top of the sand to the 550 mm mark. The bottom valve helps to control flow into the receiving cylinder.

Benchmarking Fluid Loss: 12 g/350 cc of API Bentonite was mixed for 15 minutes until homogenous. Initial sand permeability was tested using the FLS by running water through 6.4 mm, 3.2 mm, 1.0 mm, supercut and superfine sands under pressure. Evaluation of Graphite Bridging and Sealing Capacity: Base fluids were first mixed for 15 minutes to ensure complete hydration of polymer. Graphite was then added to the base fluids and again mixed vigorously before being pushed into the sand. The final permeability of the formation was derived by testing water flow through the sand after graphite had been pushed into the sand. Graphite concentrations analysed here were 0%, 1%, 3% and 6% with the two different polymer based drilling fluids as indicated above.

Benchmarking Fluid Loss. In order to characterize mud loss, using the FLS, initial formation permeability was first determined and the bentonite was flown through to give final permeability. It was evident that a smaller sand size is indicative of a more compact formation resulting in a higher percentage reduction in permeability to about 99.8% of its original in superfine sand. This could be as a result of an obvious mud cake formed on the surface of the superfine sand. This evident mud filter cake was not observed in the larger sized sand (e.g. 6.4 mm) which had a total fluid with a 150 cc/sec flow rate. The experiment on the 3.2 mm sand showed an anomaly where final permeability with bentonite flowing through the sand was higher than initial with water flowing. This was later found to be as a result of different inlet pressures with initial 7 psi being almost twice the final—3.48 psi. It could therefore be said that keeping the pressure differential constant is significant when determining permeability using the fluid loss simulator.

Evaluation of Graphite Bridging and Sealing Capacity. To evaluate the bridging and sealing capacity of graphite, the fluid loss simulator used the 6.4 mm sand to simulate severe fluid loss in highly unconsolidated formations. Two experiments each were performed with 1%, 3% and 6% graphite concentrations. During every experiment, sand initial permeability experiments were performed with water at different pressures. These initial permeability results as well as the final permeability results after treating fluid loss with different concentrations of graphite and different base fluids are shown in Table 16.

TABLE 16

Summary of Graphite Performance

| | Base Fluid | XG | XG + Pac-LV + GG + PHPA |
|---|---|---|---|
| Initial Permeability | 0% Graphite | | 2713.992 |
| | 1% Graphite | 5862.966 | 1200.098 |
| | 3% Graphite | 6902.786 | 2713 |
| | 6% Graphite | 2708.123 | 2836.294 |

TABLE 16-continued

Summary of Graphite Performance

|  |  | Base Fluid | XG | XG + Pac-LV + GG + PHPA |
|---|---|---|---|---|
| Final Permeability | 0% Graphite |  |  | 2109.162 |
|  | 1% Graphite |  | 6.707 | 2.427 |
|  | 3% Graphite |  | 2.06 | 0.2075 |
|  | 6% Graphite |  | 0.2091 | 0.01104 |

Data in Table 17 and plotted in FIG. 20 shows the percentage reduction in permeability as a result of increasing the concentration of graphite in the drilling fluids tested.

TABLE 17

Permeability Reduction of Graphite in 6.4 mm Sand

| Base Fluid | XG | XG + Pac-LV + GG + PHPA |
|---|---|---|
| 1% Graphite | 99.81% | 99.81% |
| 3% Graphite | 99.85% | 99.99% |
| 6% Graphite | 99.99% | 100.01% |

It can be seen that by adding 1% graphite to base fluid, the highly unconsolidated 6.4 mm sand, which had earlier experienced total fluid loss, had its permeability reduced to upwards of 99.8% with both base fluids, and completely plugging the formation reducing permeability at 6% graphite concentration. Visual analysis after treating with graphite showed that graphite particles invaded the pore spaces, bridging the pore throat and reducing the permeability.

The invention claimed is:

1. A borehole drilling fluid comprising:
   (i) about 0.18% w/w xanthan gum;
   (ii) about 0.05% w/w low molecular weight partially-hydrolysed polyacrylamide (PHPA), wherein the PHPA has a molecular weight in the range of about 10000 Da to 10000000 Da; and
   (iii) about 0.02% w/w low viscosity polyanionic cellulose (Pac-LV),
   wherein the drilling fluid exhibits an increase in viscosity under low shear rates, and exhibits a decrease in viscosity under high shear rates,
   wherein the drilling fluid is substantially free of solid particles, and
   wherein the drilling fluid is substantially free of alkali metal halide.

2. The borehole drilling fluid of claim 1, wherein: (i) when the shear rate of the drilling fluid is less than about 0.01 1/s, the viscosity of the drilling fluid is about 10,000 cp or higher as measured at about 23° C. to about 25° C.; or (ii) when the shear rate of the drilling fluid is about 0.01 1/s, the viscosity of the drilling fluid is about 6,100 cp or higher as measured at about 23° C. to about 25° C.

3. The borehole drilling fluid of claim 1, wherein when the shear rate of the drilling fluid is about 1000 1/s or more, the viscosity of the drilling fluid is about 12 cp or lower as measured at about 23° C. to about 25° C.

4. The borehole drilling fluid of claim 1, wherein the drilling fluid further comprises one or more of guar gum, and regular viscosity polyanionic cellulose (Pac-RV).

5. The borehole drilling fluid of claim 4, wherein the drilling fluid comprises up to about 0.1% w/w guar gum, and/or up to about 0.1% w/w Pac-RV.

6. The borehole drilling fluid of claim 4, wherein the drilling fluid comprises about 0.02% w/w guar gum, and/or about 0.01% w/w Pac-RV.

7. The borehole drilling fluid of claim 4, wherein the drilling fluid comprises: (i) about 0.18% w/w xanthan gum, about 0.05% w/w PHPA, about 0.02% w/w Pac-LV, and about 0.02% guar gum; or (ii) about 0.18% w/w xanthan gum, about 0.05% w/w PHPA, about 0.02% w/w Pac-LV, about 0.02% w/w guar gum, and about 0.01% w/w Pac-RV.

8. A method of reducing borehole drilling fluid loss and cutting loss during borehole drilling, the method comprising conducting the borehole drilling using the borehole drilling fluid of claim 1.

9. The method of claim 8, wherein: (i) when the shear rate of the drilling fluid is less than about 0.01 1/s, the viscosity of the drilling fluid is about 10,000 cp or higher as measured at about 23° C. to about 25° C.; or (ii) when the shear rate of the drilling fluid is about 0.01 1/s, the viscosity of the drilling fluid is about 6,100 cp or higher as measured at about 23° C. to about 25° C.; and/or (iii) when the shear rate of the drilling fluid is about 1000 1/s or more, the viscosity of the drilling fluid is about 12 cp or lower as measured at about 23° C. to about 25° C.

10. The method of claim 8, wherein the drilling fluid comprises: (i) about 0.18% w/w xanthan gum, about 0.05% w/w PHPA, about 0.02% w/w Pac-LV, and about 0.02% guar gum; or (ii) about 0.18% w/w xanthan gum, about 0.05% w/w PHPA, about 0.02% w/w Pac-LV, about 0.02% w/w guar gum, and about 0.01% w/w Pac-RV.

* * * * *